United States Patent
Nelson et al.

(10) Patent No.: US 11,185,809 B2
(45) Date of Patent: *Nov. 30, 2021

(54) AIR FILTER ARRANGEMENTS; ASSEMBLIES; AND, METHODS

(71) Applicant: Donaldson Company, Inc., Minneapolis, MN (US)

(72) Inventors: Benny K. Nelson, Bloomington, MN (US); John Kuhn, Richfield, MN (US); Donald Larson, Brooklyn Park, MN (US); David Nelson, Coon Rapids, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,928

(22) Filed: Feb. 20, 2020

(65) Prior Publication Data

US 2020/0289972 A1    Sep. 17, 2020

Related U.S. Application Data

(63) Continuation of application No. 15/918,664, filed on Mar. 12, 2018, now Pat. No. 10,569,212, which is a (Continued)

(51) Int. Cl.
   *B01D 46/52* (2006.01)
   *B01D 46/00* (2006.01)
   (Continued)

(52) U.S. Cl.
   CPC ....... *B01D 46/526* (2013.01); *B01D 46/0004* (2013.01); *B01D 46/0005* (2013.01);
   (Continued)

(58) Field of Classification Search
   CPC ............ B01D 46/0002; B01D 46/0004; B01D 46/0005; B01D 46/0013; B01D 46/525;
   (Continued)

(56) References Cited

U.S. PATENT DOCUMENTS 4,242,115 A   12/1980   Harold et al.
4,410,427 A   10/1983   Wydeven
(Continued)

FOREIGN PATENT DOCUMENTS

CN   101282775   8/2008
DE   202008017059   5/2010
(Continued)

OTHER PUBLICATIONS

Search Report and Written Opinion corresponding to PCT/US2008/083416 dated Feb. 19, 2009.
(Continued)

*Primary Examiner* — Robert Clemente
(74) *Attorney, Agent, or Firm* — Merchant & Gould P.C.

(57) ABSTRACT

Air cleaner assemblies and components therefor are described. An example first or main filter cartridge is described which includes a media pack comprising fluted material secured to facing sheets. The media pack defines opposite inlet and outlet flow faces, with flutes extending in a direction therebetween. The cartridge defines a closed end, spaced from, but in overlap with, the outlet end face of the media pack.

18 Claims, 59 Drawing Sheets

Related U.S. Application Data continuation of application No. 15/075,319, filed on Mar. 21, 2016, now Pat. No. 9,943,797, which is a continuation of application No. 14/195,092, filed on Mar. 3, 2014, now Pat. No. 9,289,712, which is a continuation of application No. 13/544,033, filed on Jul. 9, 2012, now Pat. No. 8,663,355, which is a continuation of application No. 12/291,893, filed on Nov. 14, 2008, now Pat. No. 8,216,334.

(60) Provisional application No. 61/003,215, filed on Nov. 15, 2007, provisional application No. 61/130,790, filed on Jun. 2, 2008.

(51) Int. Cl.
*B01D 46/10* (2006.01)
*B01D 46/24* (2006.01)

(52) U.S. Cl.
CPC ......... *B01D 46/0023* (2013.01); *B01D 46/10* (2013.01); *B01D 46/2414* (2013.01); *B01D 2271/027* (2013.01); *Y10T 156/10* (2015.01)

(58) Field of Classification Search
CPC .............. B01D 46/526; B01D 2271/02; B01D 2271/027
See application file for complete search history.

(56) References Cited

U.S. PATENT DOCUMENTS

| | | |
|---|---|---|
| 4,418,662 A | 12/1983 | Engler |
| 4,476,021 A | 10/1984 | Souza |
| 4,589,983 A | 5/1986 | Wydevan |
| 4,746,340 A | 5/1988 | Durre et al. |
| 4,925,561 A | 5/1990 | Ishii et al. |
| 5,049,326 A | 9/1991 | Matsumoto et al. |
| D326,706 S | 6/1992 | Karlsson |
| 5,222,488 A | 6/1993 | Forsgren |
| 5,562,825 A | 10/1996 | Yamada et al. |
| 5,613,992 A | 3/1997 | Engel |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,800,581 A | 9/1998 | Gelink |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| D417,268 S | 11/1999 | Gillingham et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar et al. |
| 6,221,122 B1 | 4/2001 | Gieseke et al. |
| 6,235,195 B1 | 5/2001 | Tokar |
| D444,219 S | 6/2001 | Gieseke et al. |
| D447,549 S | 9/2001 | Gieseke et al. |
| 6,293,984 B1 | 9/2001 | Oda et al. |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,350,296 B1 | 2/2002 | Warner |
| 6,368,374 B1 | 4/2002 | Tokar et al. |
| D460,169 S | 7/2002 | Anderson et al. |
| D461,003 S | 7/2002 | Gieseke et al. |
| 6,416,605 B1 | 7/2002 | Golden |
| D464,129 S | 10/2002 | Xu et al. |
| 6,517,598 B2 | 2/2003 | Anderson et al. |
| D471,623 S | 3/2003 | Gieseke et al. |
| D473,637 S | 4/2003 | Golden |
| 6,572,667 B1 | 6/2003 | Greif et al. |
| D477,659 S | 7/2003 | Gieseke et al. |
| 6,610,126 B2 | 8/2003 | Xu et al. |
| D481,101 S | 10/2003 | Gieseke et al. |
| 6,652,614 B2 | 11/2003 | Gieseke et al. |
| D483,459 S | 12/2003 | Dewit et al. |
| D484,584 S | 12/2003 | Anderson et al. |
| 6,673,136 B2 | 1/2004 | Gillingham et al. |
| 6,736,874 B2 | 5/2004 | Rieger et al. |
| 6,743,317 B2 | 6/2004 | Wydeven |
| D497,202 S | 10/2004 | Stavos et al. |
| 6,852,141 B2 | 2/2005 | Bishop et al. |
| D506,539 S | 6/2005 | Bishop et al. |
| 6,966,940 B2 | 11/2005 | Krisko et al. |
| 7,004,986 B2 | 2/2006 | Kopec et al. |
| 7,008,467 B2 | 3/2006 | Krisko et al. |
| D520,619 S | 5/2006 | Kuempel et al. |
| 7,070,642 B2 | 7/2006 | Scott et al. |
| 7,094,269 B2 | 8/2006 | Yang |
| 7,186,282 B2 | 3/2007 | Su |
| 7,282,075 B2 | 10/2007 | Spone et al. |
| 7,329,326 B2 | 2/2008 | Wagner et al. |
| 7,351,270 B2 | 4/2008 | Olson et al. |
| 7,364,601 B2 | 4/2008 | Xu et al. |
| 7,396,375 B2 | 7/2008 | Kuempel et al. |
| 7,396,376 B2 | 7/2008 | Schrage et al. |
| 7,488,365 B2 | 2/2009 | Golden et al. |
| 7,501,004 B2 | 3/2009 | Tschech et al. |
| 7,520,913 B2 | 4/2009 | Mills et al. |
| 7,524,349 B2 | 4/2009 | Schrage et al. |
| 7,537,631 B2 | 5/2009 | Scott et al. |
| 7,569,090 B2 | 8/2009 | Nelson |
| D600,790 S | 9/2009 | Nelson et al. |
| 7,625,419 B2 | 12/2009 | Nelson et al. |
| 7,655,074 B2 | 2/2010 | Nepsund et al. |
| 7,670,402 B2 | 3/2010 | Miller |
| 7,674,308 B2 | 3/2010 | Krisko et al. |
| 7,682,416 B2 | 3/2010 | Engelland et al. |
| 7,708,796 B2 | 5/2010 | Rieger et al. |
| 7,713,321 B2 | 5/2010 | Kuempel et al. |
| 7,753,982 B2 | 7/2010 | Merritt |
| D635,233 S | 3/2011 | Nelson |
| 7,905,936 B2 | 3/2011 | Olson et al. |
| 7,967,886 B2 | 6/2011 | Schrage et al. |
| 7,972,404 B2 | 7/2011 | Kuempel et al. |
| 7,997,425 B2 | 8/2011 | Golden et al. |
| 8,016,903 B2 | 9/2011 | Nelson et al. |
| 8,034,145 B2 | 10/2011 | Boehrs et al. |
| 8,038,756 B2 | 10/2011 | Iddings et al. |
| 8,048,187 B2 | 11/2011 | Merritt et al. |
| 8,048,188 B2 | 11/2011 | Engelland et al. |
| 8,066,791 B2 | 11/2011 | Baseotto et al. |
| 8,128,724 B2 | 3/2012 | Mills et al. |
| 8,163,057 B2 | 4/2012 | Blossey et al. |
| 8,177,872 B2 | 5/2012 | Nelson et al. |
| 8,182,570 B2 | 5/2012 | Rieger |
| 8,216,334 B2 | 7/2012 | Nelson et al. |
| 8,277,532 B2 | 10/2012 | Reichter et al. |
| 8,357,219 B2 | 1/2013 | Boehrs et al. |
| 8,475,556 B2 | 7/2013 | Kori et al. |
| 8,506,668 B2 | 8/2013 | Swanson et al. |
| 8,663,355 B2 | 3/2014 | Nelson et al. |
| 8,747,512 B2 | 6/2014 | Mills et al. |
| 8,758,470 B2 | 6/2014 | Blossey et al. |
| 8,864,866 B2 | 10/2014 | Osendorf et al. |
| 8,888,882 B2 | 11/2014 | Ackermann et al. |
| 9,192,885 B2 | 11/2015 | Blossey et al. |
| 9,289,710 B2 | 3/2016 | Hasenfratz et al. |
| 9,289,712 B2 | 3/2016 | Nelson et al. |
| 9,500,164 B2 | 11/2016 | Ryon et al. |
| 9,586,167 B2 | 3/2017 | Schmid et al. |
| 9,610,529 B2 | 4/2017 | Mills et al. |
| 9,943,797 B2 | 4/2018 | Nelson et al. |
| 10,359,011 B2 | 7/2019 | Dewit et al. |
| 10,569,212 B2 | 2/2020 | Nelson |
| 2002/0096247 A1 | 7/2002 | Wydeven et al. |

(56) References Cited

U.S. PATENT DOCUMENTS

| | | |
|---|---|---|
| 2002/0104490 A1 | 8/2002 | Itakura et al. |
| 2002/0158006 A1 | 10/2002 | Thomas |
| 2004/0187689 A1 | 9/2004 | Sporre et al. |
| 2005/0130508 A1 | 5/2005 | Yeh |
| 2006/0174598 A1 | 8/2006 | Mills et al. |
| 2006/0288676 A1 | 12/2006 | Geyer, III |
| 2007/0039296 A1 | 2/2007 | Schrage et al. |
| 2007/0235384 A1 | 10/2007 | Oku et al. |
| 2008/0168903 A1 | 7/2008 | Lane |
| 2008/0190082 A1 | 8/2008 | Scott et al. |
| 2008/0282890 A1 | 11/2008 | Rocklitz et al. |
| 2008/0307759 A1 | 12/2008 | Reichter et al. |
| 2009/0049814 A1 | 2/2009 | Baseotto et al. |
| 2009/0064646 A1 | 3/2009 | Reichter et al. |
| 2009/0094951 A1 | 4/2009 | Baseotto et al. |
| 2009/0100813 A1 | 4/2009 | Iddings et al. |
| 2009/0127211 A1 | 5/2009 | Rocklitz et al. |
| 2009/0151311 A1 | 6/2009 | Reichter et al. |
| 2009/0211450 A1 | 8/2009 | Mosset et al. |
| 2009/0217632 A1 | 9/2009 | Coulonvaux et al. |
| 2009/0301045 A1 | 12/2009 | Nelson et al. |
| 2010/0032365 A1 | 2/2010 | Moe et al. |
| 2010/0043366 A1 | 2/2010 | Boehrs et al. |
| 2010/0044295 A1 | 2/2010 | Campbell |
| 2010/0146917 A1 | 6/2010 | Coulonvaux et al. |
| 2010/0146919 A1 | 6/2010 | Nelson |
| 2010/0146920 A1 | 6/2010 | Iddings et al. |
| 2010/0154736 A1 | 6/2010 | Ohzono |
| 2010/0293906 A1 | 11/2010 | Flagstad et al. |
| 2011/0173937 A1 | 7/2011 | Nelson |
| 2011/0232244 A1 | 9/2011 | Schrage et al. |
| 2012/0031060 A1 | 2/2012 | Iddings et al. |
| 2012/0067017 A1 | 3/2012 | Baseotto et al. |
| 2014/0039237 A1 | 2/2014 | Li |
| 2015/0013542 A1 | 1/2015 | Jasemfratz et al. |
| 2016/0061159 A1 | 3/2016 | Ryon et al. |
| 2016/0108866 A1 | 4/2016 | Dewit et al. |
| 2016/0177891 A1 | 6/2016 | Yadav et al. |
| 2018/0207566 A1 | 7/2018 | Stanhope et al. |

FOREIGN PATENT DOCUMENTS

| | | |
|---|---|---|
| EP | 0164956 | 12/1985 |
| EP | 1286750 | 4/2007 |
| EP | 1862209 | 9/2010 |
| EP | 1216743 | 3/2011 |
| EP | 2024631 | 3/2011 |
| EP | 1852637 | 7/2012 |
| EP | 2355916 | 8/2013 |
| EP | 2175960 | 1/2014 |
| EP | 2620203 | 6/2014 |
| EP | 2029257 | 11/2014 |
| GB | 2222964 | 3/1990 |
| JP | 2001-524870 | 12/2001 |
| JP | 2002-235618 | 8/2002 |
| JP | 2003-534497 | 11/2003 |
| JP | 2008-513193 | 5/2008 |
| JP | 2009-062948 | 3/2009 |
| JP | 2009-526648 | 7/2009 |
| JP | 4514235 | 7/2010 |
| JP | 4621406 | 1/2011 |
| JP | 4956557 | 6/2012 |
| JP | 2012-521882 | 9/2012 |
| JP | 5690054 | 3/2015 |
| KR | 100559420 | 3/2006 |
| RU | 2132283 | 6/1999 |
| RU | 2417819 | 5/2011 |
| WO | WO 2004/007054 | 1/2004 |
| WO | WO 2004/082795 | 9/2004 |
| WO | WO 2005/063361 | 7/2005 |
| WO | WO 2005/077487 | 8/2005 |
| WO | WO 2007/022171 | 2/2007 |
| WO | WO 2007/044677 A1 | 4/2007 |
| WO | WO 2009/014982 | 1/2009 |
| WO | WO 2009/014986 | 1/2009 |
| WO | WO 2009/014988 | 1/2009 |
| WO | WO 2009/064894 | 5/2009 |
| WO | WO 2014/190206 | 5/2009 |
| WO | WO 2012/116314 | 8/2012 |
| WO | WO 2013/050271 | 4/2013 |

OTHER PUBLICATIONS

Pending claims of U.S. Appl. No. 16/456,494 dated Mar. 17, 2020.
Pending claims of U.S. Appl. No. 16/404,040 dated Mar. 17, 2020.

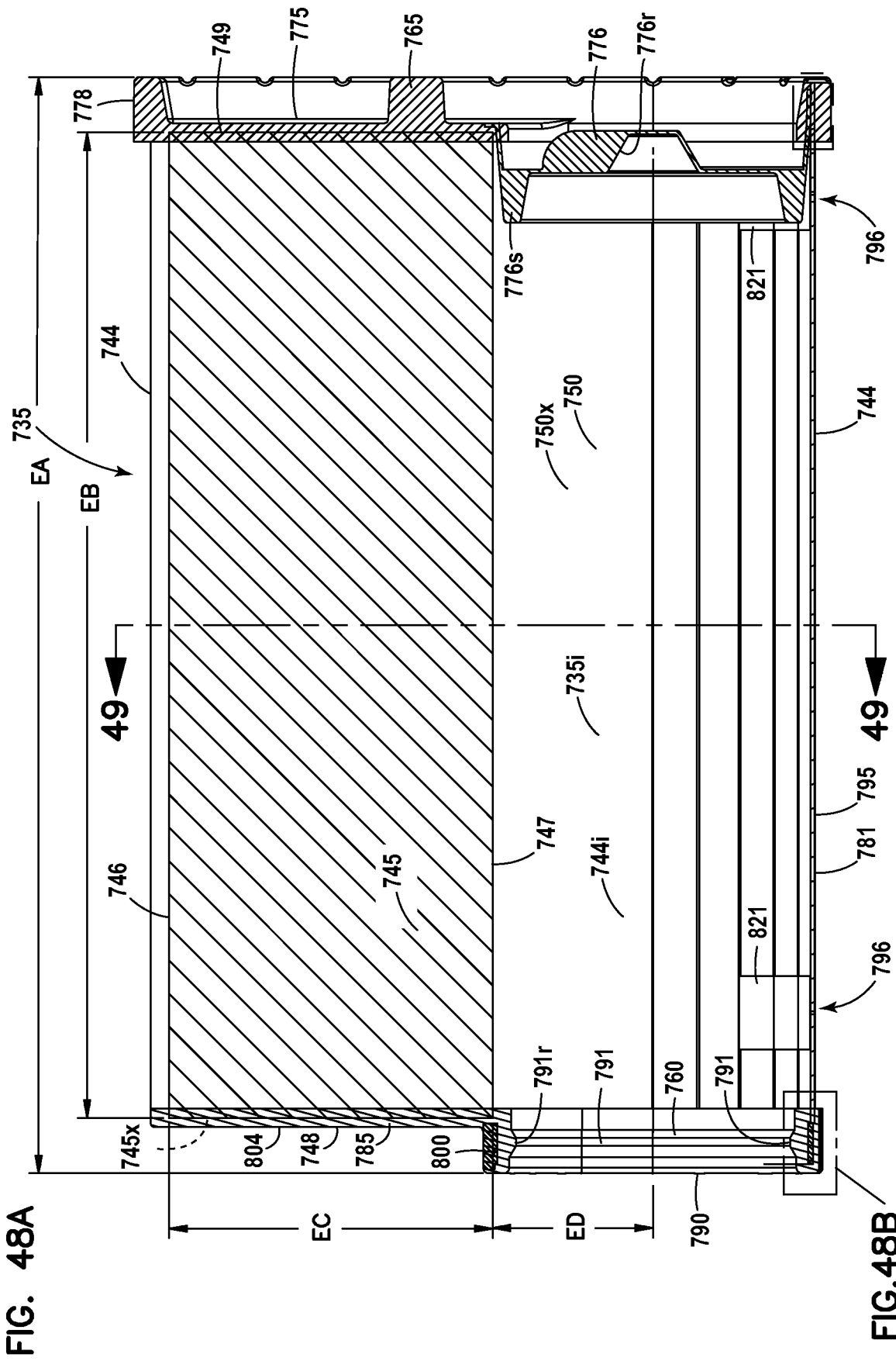

AIR FILTER ARRANGEMENTS; ASSEMBLIES; AND, METHODS

CROSS-REFERENCE TO RELATED APPLICATIONS

The present application is a continuing application of U.S. Ser. No. 15/918,664, filed Mar. 12, 2018, now U.S. Pat. No. 10,569,212. U.S. Ser. No. 15/918,664 is a continuation of Ser. No. 15/075,319, filed Mar. 21, 2016, now U.S. Pat. No. 9,943,797. U.S. Ser. No. 15/075,319 is a continuation of Ser. No. 14/195,092, filed Mar. 3, 2014, now U.S. Pat. No. 9,289,712. U.S. Ser. No. 14/195,092 is a continuation application of U.S. Ser. No. 13/544,033, filed Jul. 9, 2012, now U.S. Pat. No. 8,663,355. U.S. Ser. No. 13/544,033 is a continuation of U.S. Ser. No. 12/291,893, filed Nov. 14, 2008, and now U.S. Pat. No. 8,216,334. The present application also includes the disclosure of, with edits, U.S. provisional application 61/003,215, filed Nov. 15, 2007 and 61/130,790, filed Jun. 2, 2008 A claim of priority is made to each of the above referenced applications to the extent appropriate. Also, the complete disclosures of the above referenced applications are incorporated herein by reference.

FIELD OF THE DISCLOSURE

The present disclosure relates to filter arrangements for use in filtering air. The disclosure particularly relates to filter arrangement with media packs that use z-filter media as characterized herein. More specifically, the disclosure relates to such media packs and their inclusion in serviceable air filter cartridge arrangements, typically for use in air cleaners (air cleaner assemblies). Air cleaner arrangements and methods of assembly and use are also described.

BACKGROUND

Air streams can carry contaminant material therein. In many instances, it is desired to filter some or all of the contaminant material from the air stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the air. A variety of air filter arrangements have been developed for contaminant collection. Improvements are sought.

SUMMARY

According to the present disclosure, air cleaner assemblies (arrangements) and components therefor are described. As an example, a first air filter cartridge, usable as a service component in the air cleaner assembly, is described. The first air filter cartridge generally comprises a media pack positioned in a filter cartridge housing; typically the media pack is non-removably positioned in the filter cartridge housing.

The media pack is typically a z-filter media pack and has an inlet flow face and an opposite outlet flow face. The media pack is positioned in a shell or shell member of the filter cartridge housing with the outlet flow face directed toward a closed end of the shell; the shell having first and second side sections and a closed end section. The example shells depicted, have either a d/b-shape or a u-shape. In either case, the shell typically has open sides, closed in the filter cartridge housing by a opposite first and second end members.

The first end member is positioned over a first side of the media pack and shell. The first end member generally: includes a air flow outlet arrangement therethrough, in flow communication with a clean air volume defined between the closed end of the shell and the outlet flow face of the media pack; and, closes a first side of the media pack.

The second end member is positioned opposite the first end member, and closes a second side of the shell and the media pack, opposite the first side. The second end member is typically closed to passage of air therethrough.

The resulting filter cartridge can be provided with a housing seal arrangement around the air flow outlet arrangement. In an example, the housing seal arrangement comprises a radial seal arrangement molded-in-place as part of the first embodiment; a specific example being an inwardly directed radial seal arrangement, although alternatives are possible.

Also, in certain described embodiments, the second member includes a peripheral housing seal member thereon, oriented to engage, and seal to, an interior side wall of an air cleaner housing.

An air cleaner assembly is configured to operably receive the filter cartridge therein. An example air cleaner housing includes an inlet arrangement (or inlet), a housing body, and an air flow outlet arrangement (or outlet) oriented through the housing in a direction of air flow generally orthogonal to an air flow direction into the inlet end. The housing can include a flange around the outlet arrangement through the housing. The flange can be positioned for sealing engagement with a housing seal arrangement on the filter cartridge, oriented in association with an air flow outlet of the filter cartridge.

An optional secondary or safety filter cartridge can be positioned sealed to the housing, and projecting into the clean air volume of the first filter cartridge.

In an improved arrangement as characterized herein, the shell closed end section includes a drain aperture arrangement therein, to allow for drainage of water from a downstream end of the filter cartridge. In an example embodiment, interiorly of the shell, filter media is positioned over the aperture arrangement, since the aperture arrangement is through the shell at the clean air side of the filter cartridge. Thus, the filter media closes the shell at this location.

A variety of specific features are described and shown.

It is noted that there is no requirement that the assembly or components include all of the individual features characterized herein, in order to obtain some advantage according to the present disclosure.

BRIEF DESCRIPTION OF THE DRAWINGS

Drawings from U.S. 61/003,215, Filed Nov. 15, 2007

New Drawings Added to Previous U.S. 61/003,215

Figure 32:
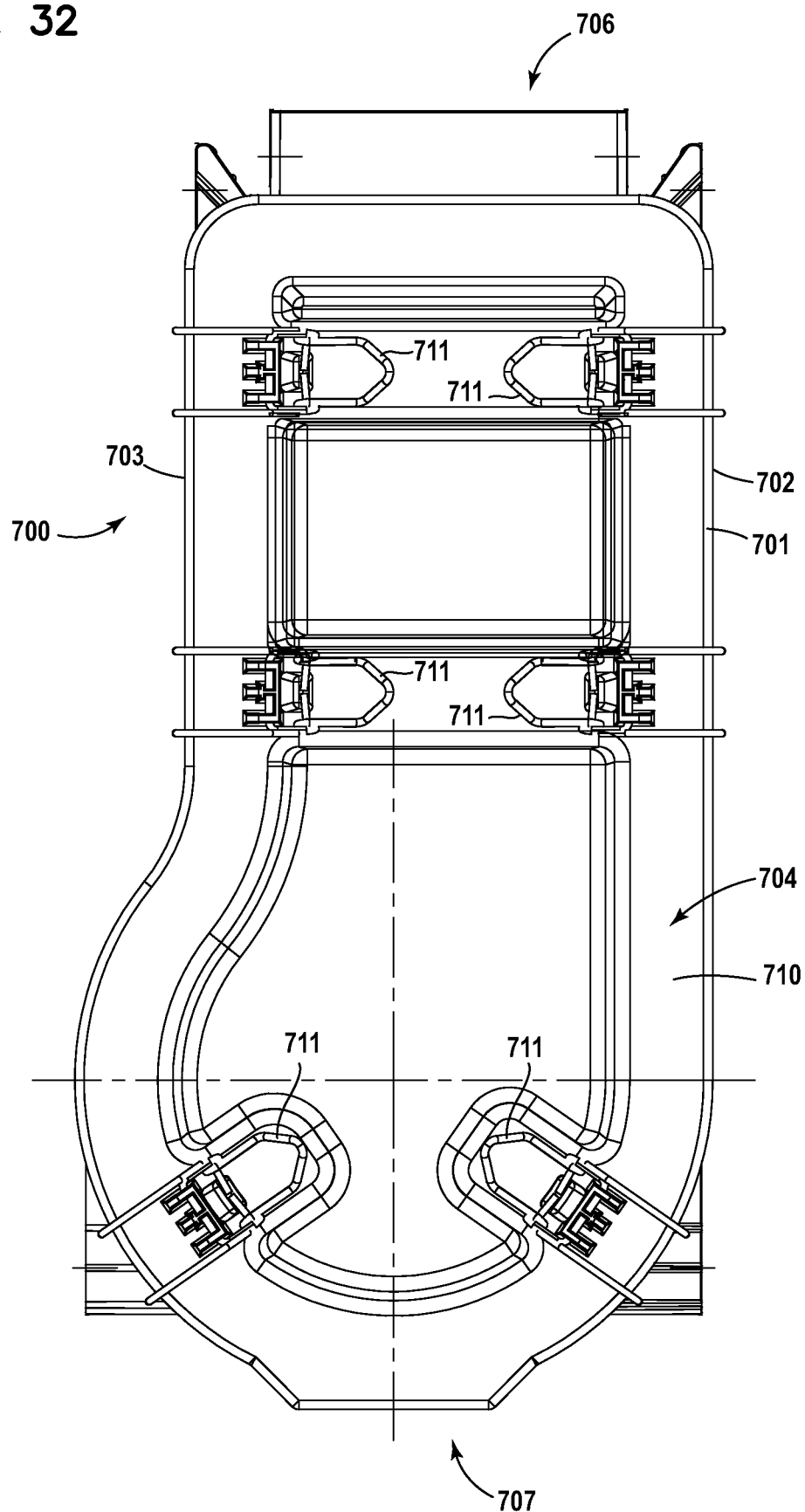

FIG. 32 is a schematic access end elevational view of a third embodiment of an air cleaner assembly according to the present disclosure.

Figure 33:
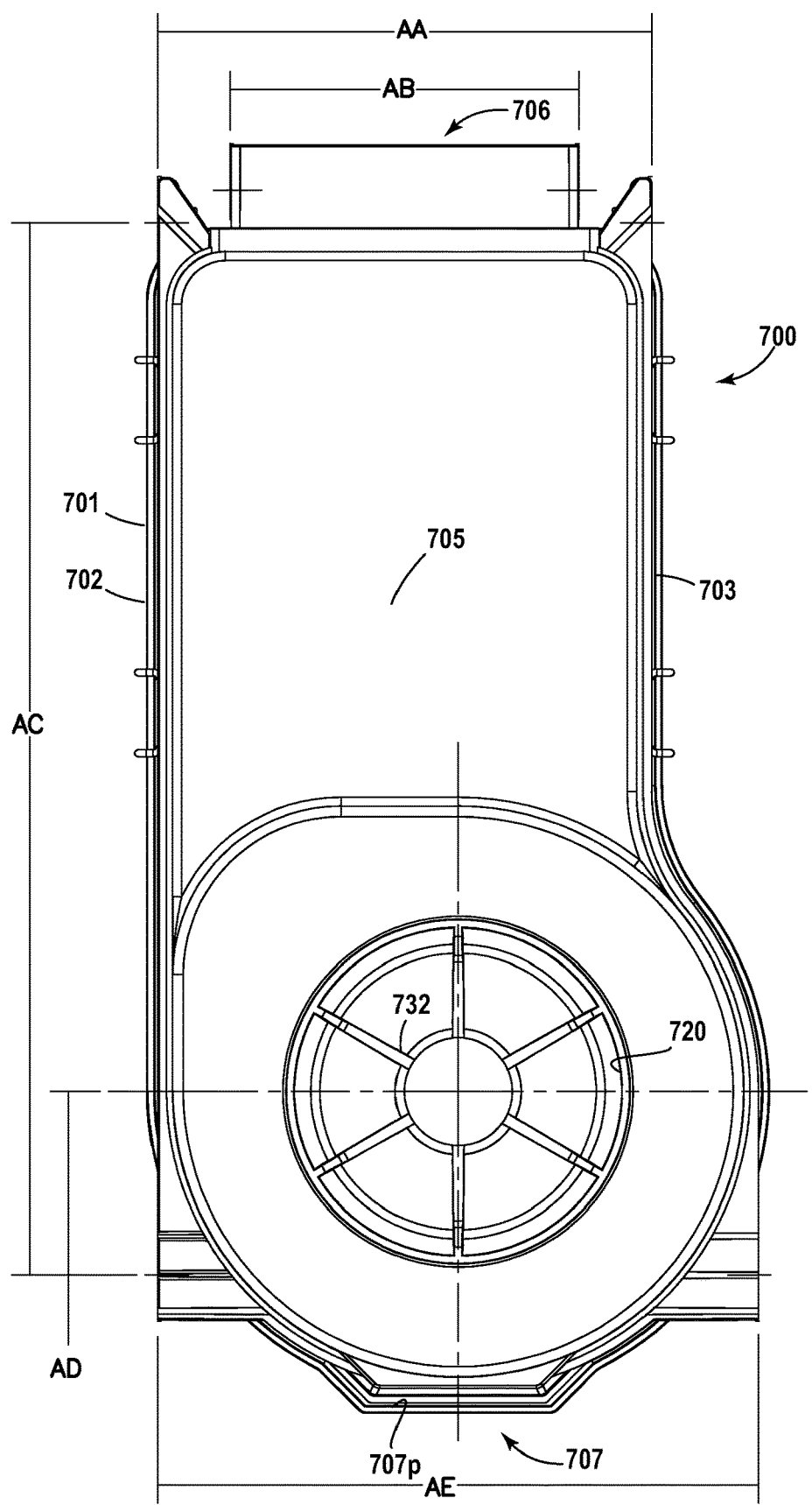

FIG. 33 is a schematic outlet end elevational view of the air cleaner assembly of FIG. 32.

Figure 34:
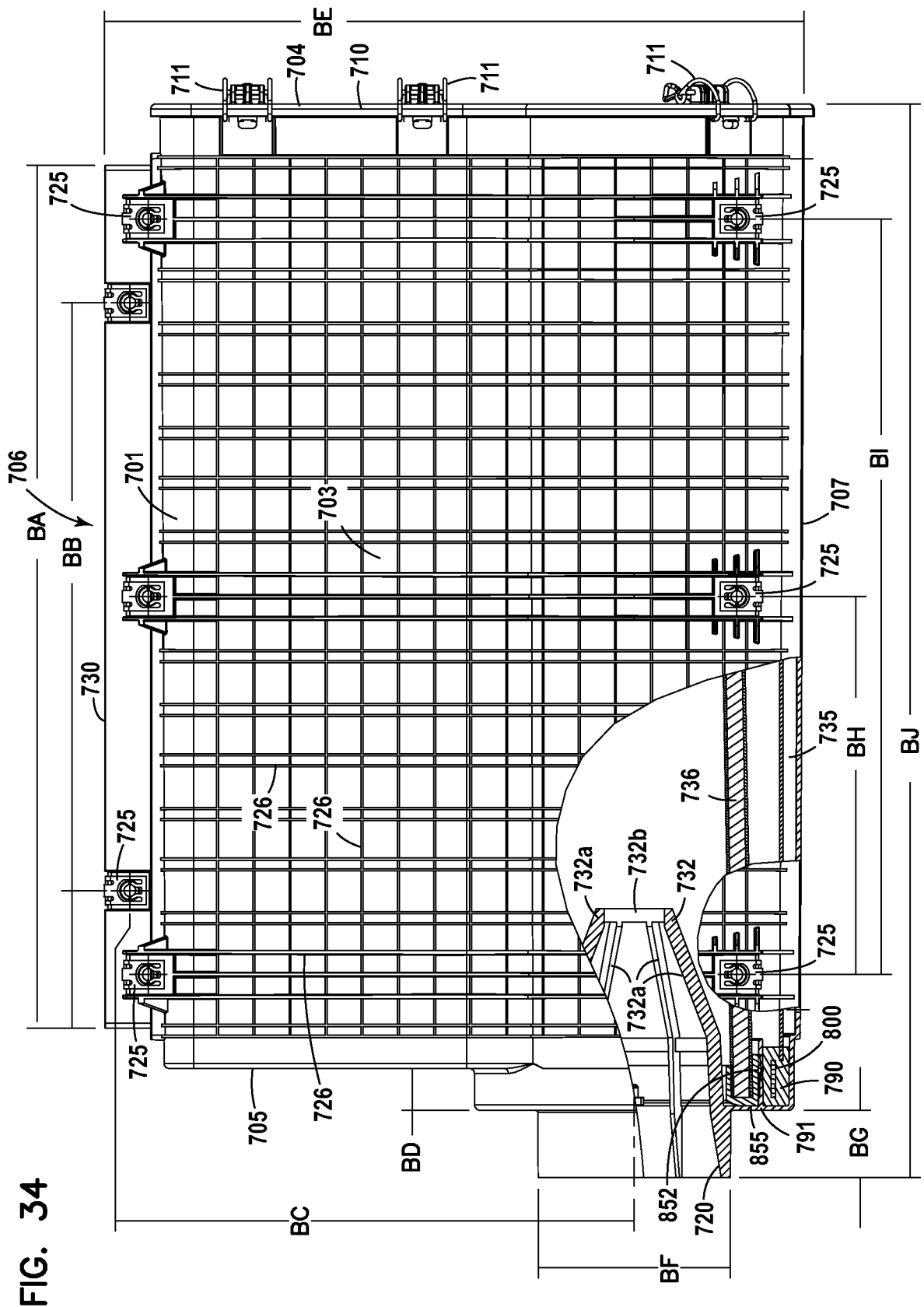

FIG. 34 is a schematic side elevational view of the air cleaner assembly of FIGS. 32 and 33, with portions broken away to show internal detail.

Figure 35:
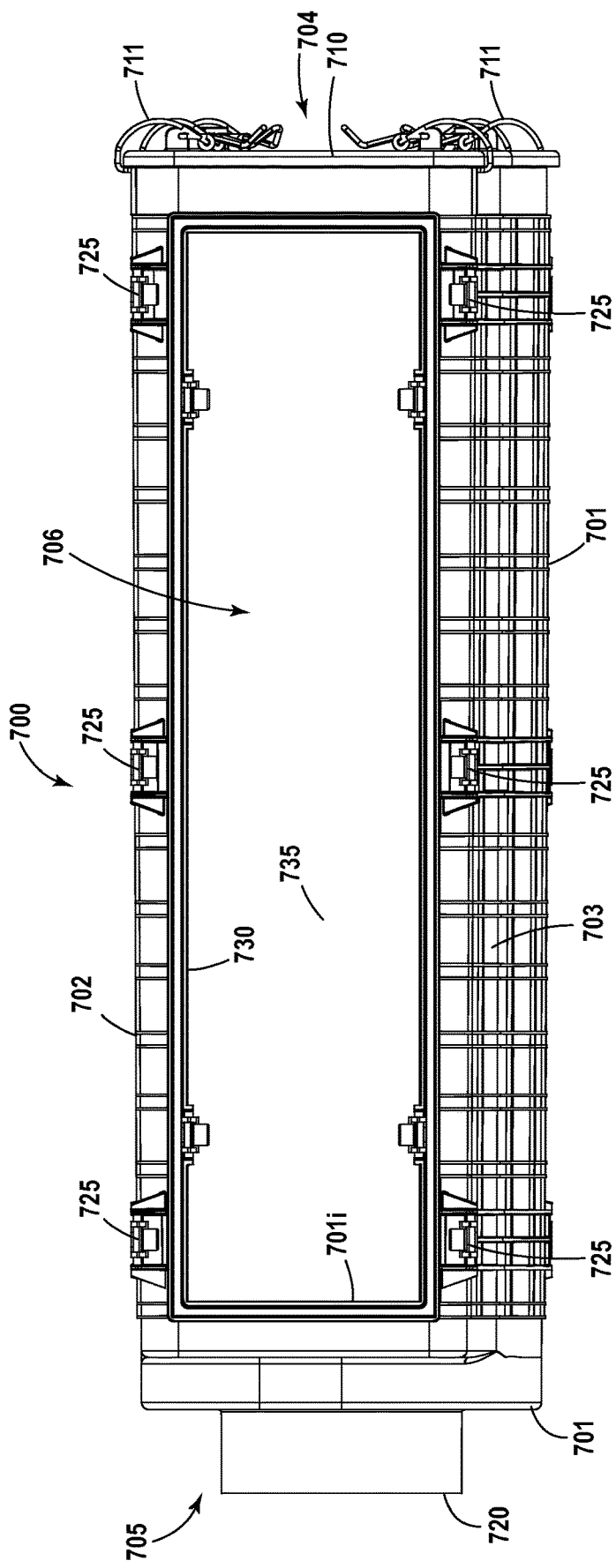

FIG. 35 is a schematic top access end plan view of the air cleaner assembly of FIGS. 32-34.

Figure 36:
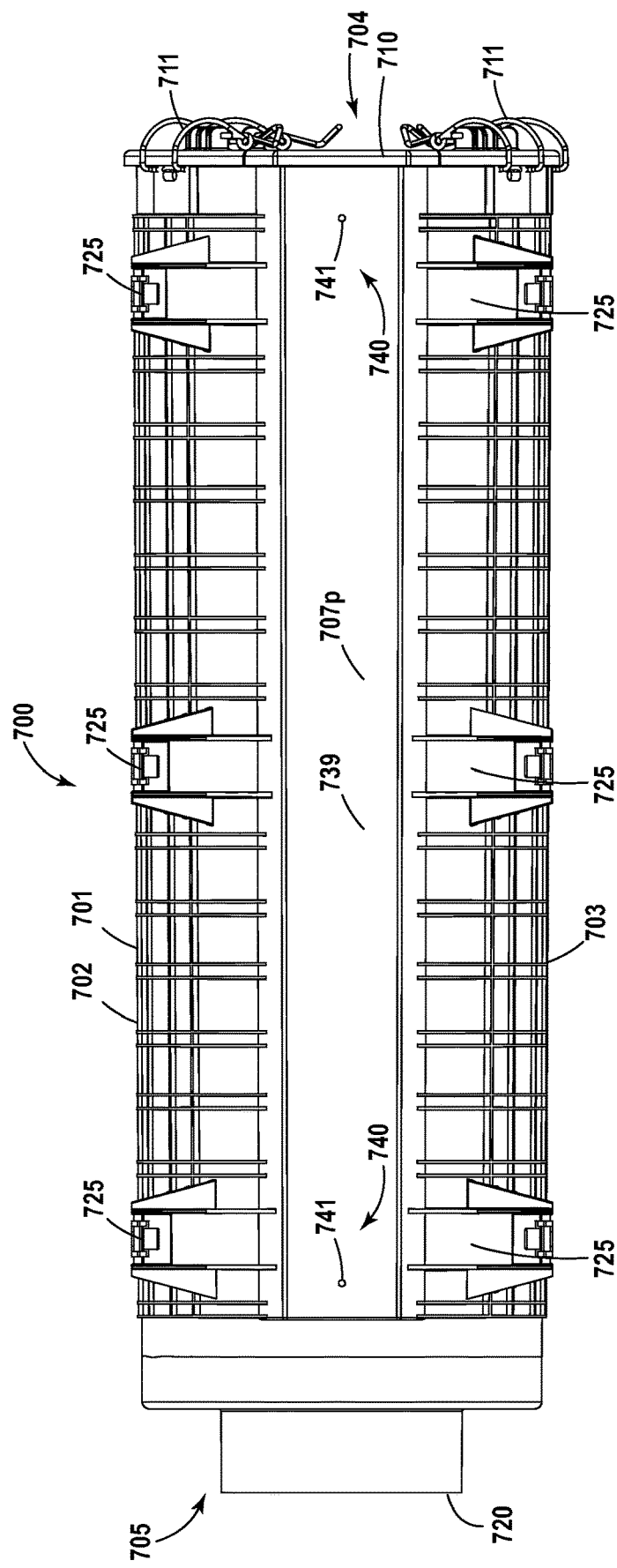

FIG. 36 is a schematic bottom end plan view of the air cleaner assembly of FIGS. 32-35.

Figure 37:
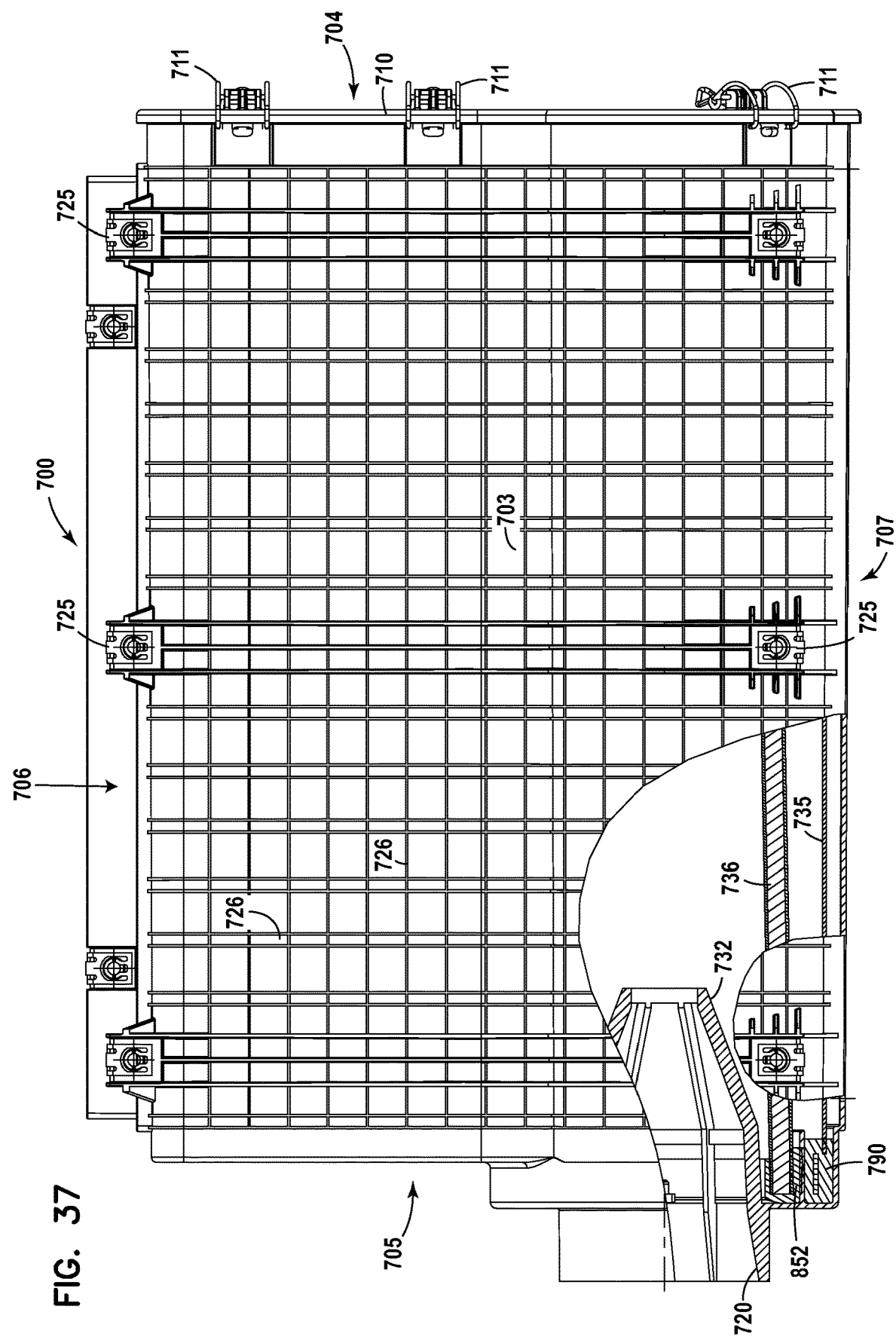

FIG. 37 is a second side elevational view corresponding to FIG. 34.

Figure 38:
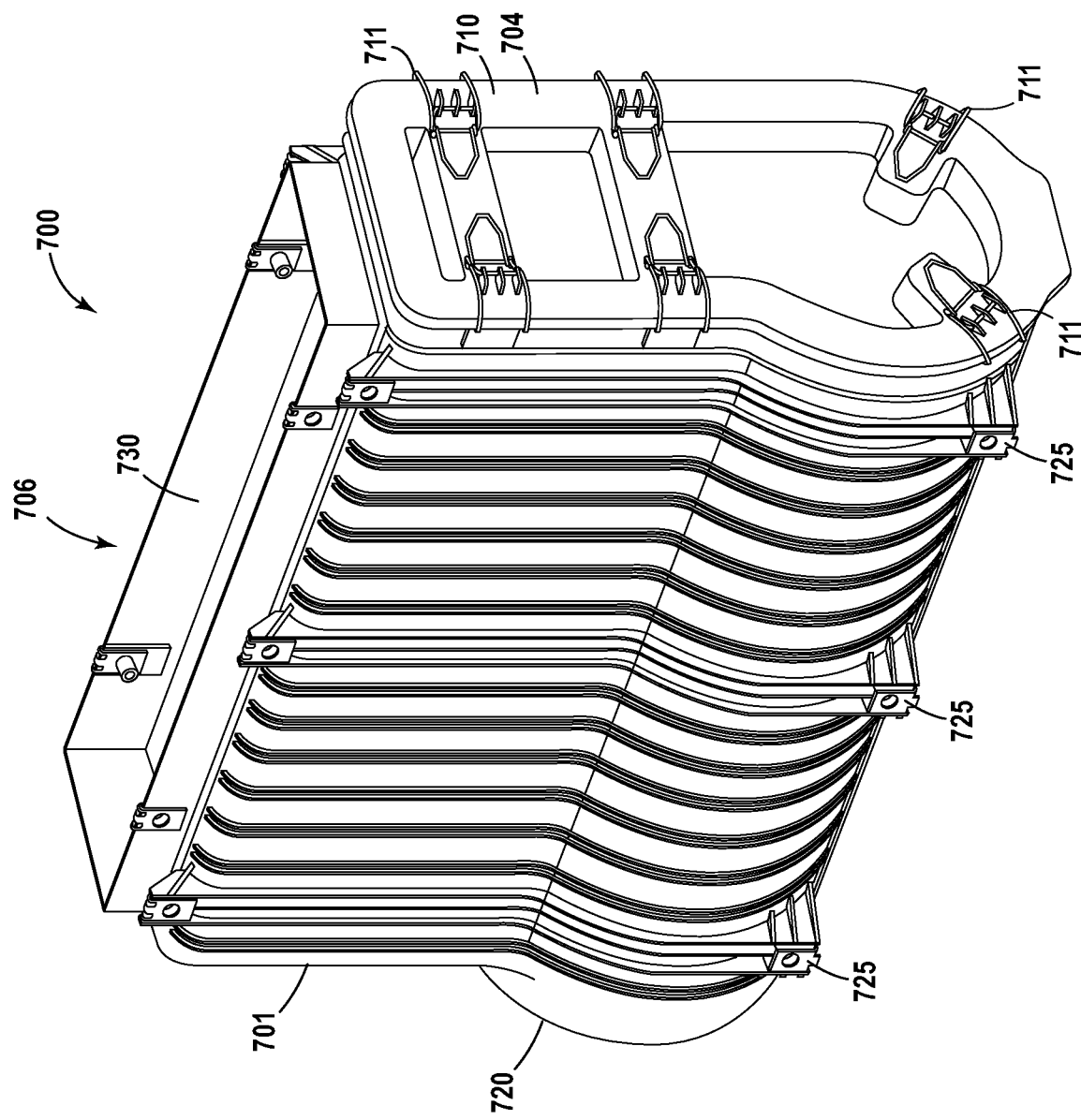

FIG. 38 is a schematic top end perspective view of an air cleaner assembly according to FIGS. 32-37.

Figure 39:
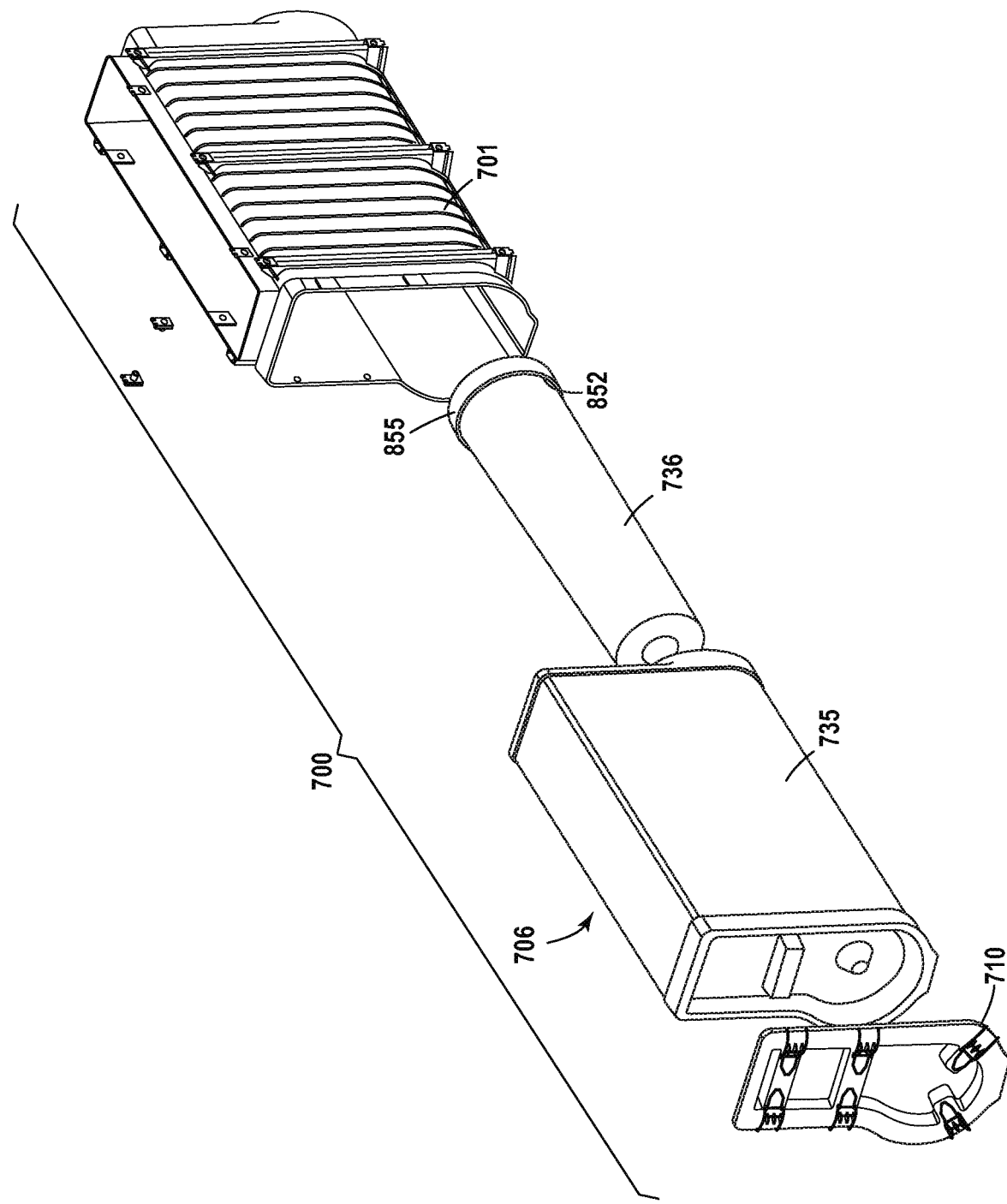

FIG. 39 is a schematic, exploded perspective view of the air cleaner assembly of FIG. 38.

Figure 40:
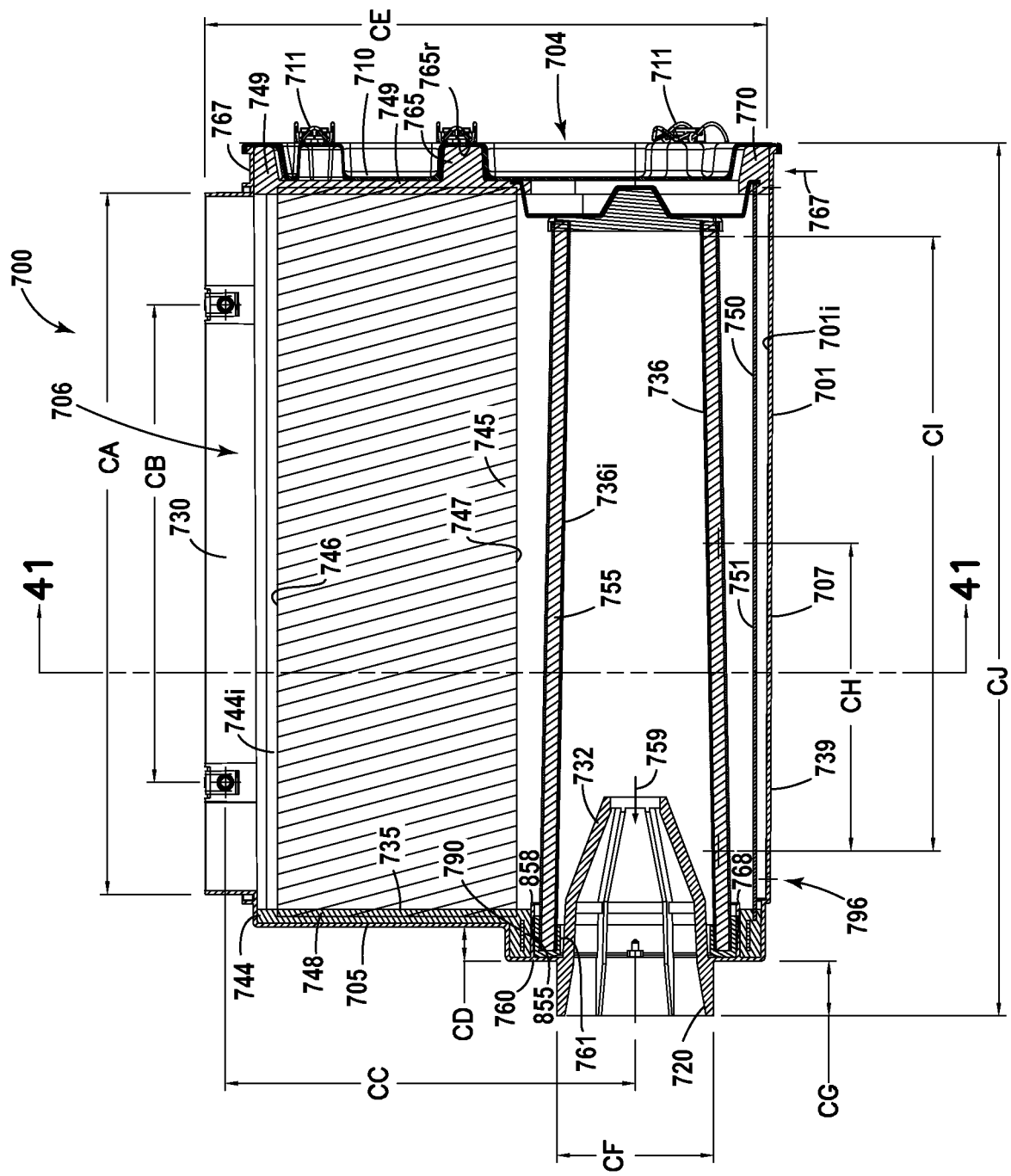

FIG. 40 is schematic cross-sectional view of the air cleaner assembly of FIGS. 32-39.

Figure 41:
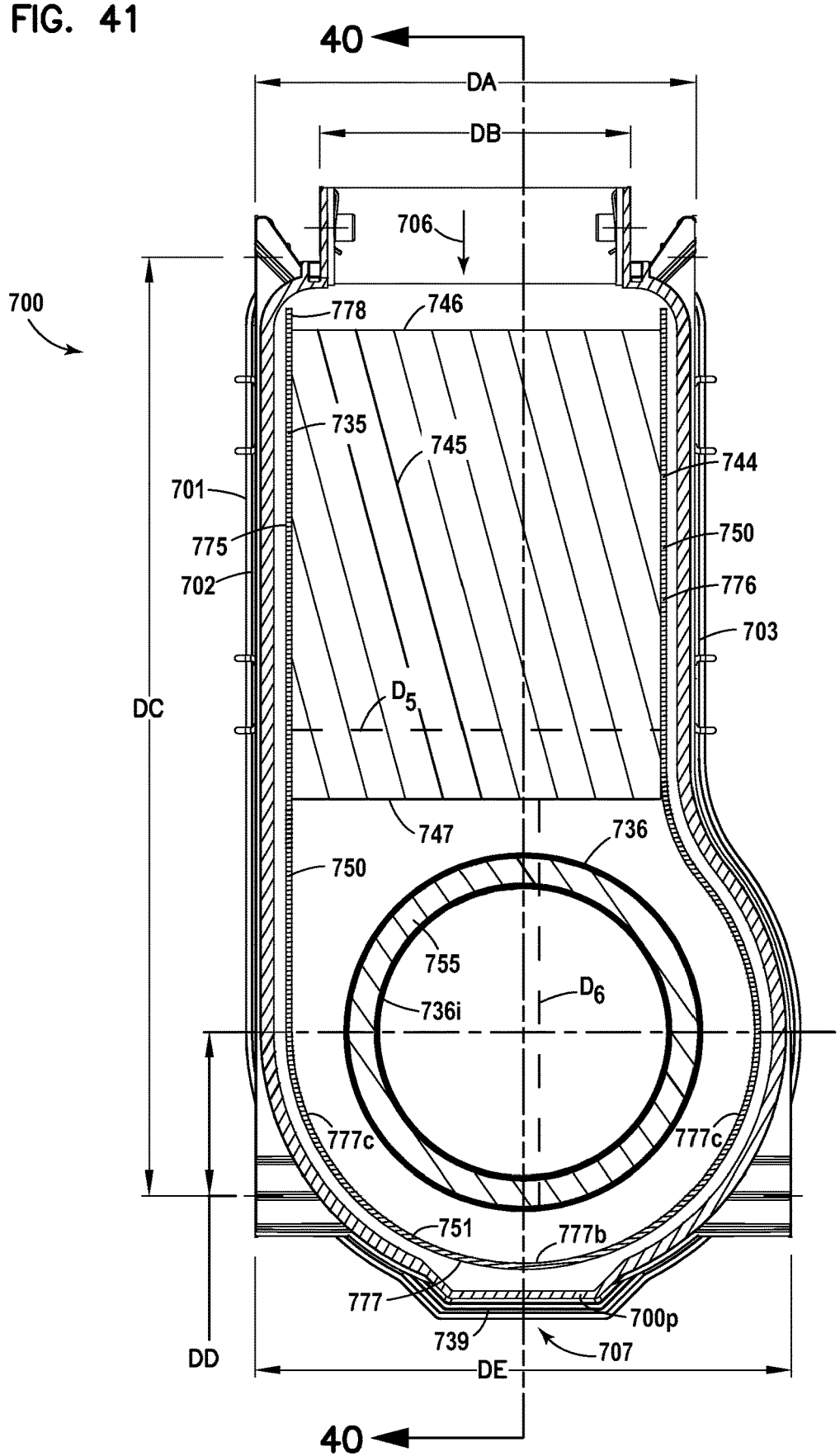

FIG. 41 is a schematic cross-sectional view taken generally along line 41-41, FIG. 40; in FIG. 41, a cross-sectional line 40-40, indicating the view of FIG. 40.

Figure 42:
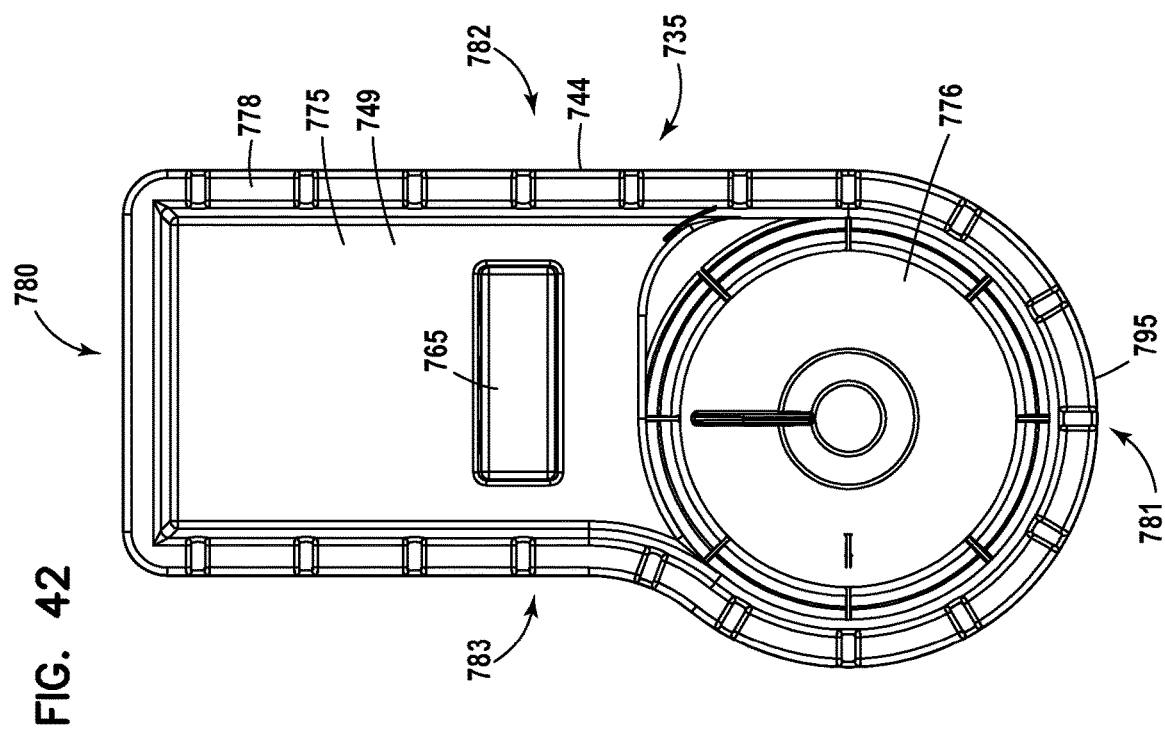

FIG. 42 is a schematic closed end elevational view of the filter cartridge usable in the air cleaner assembly of FIGS. 32-41.

Figure 43:
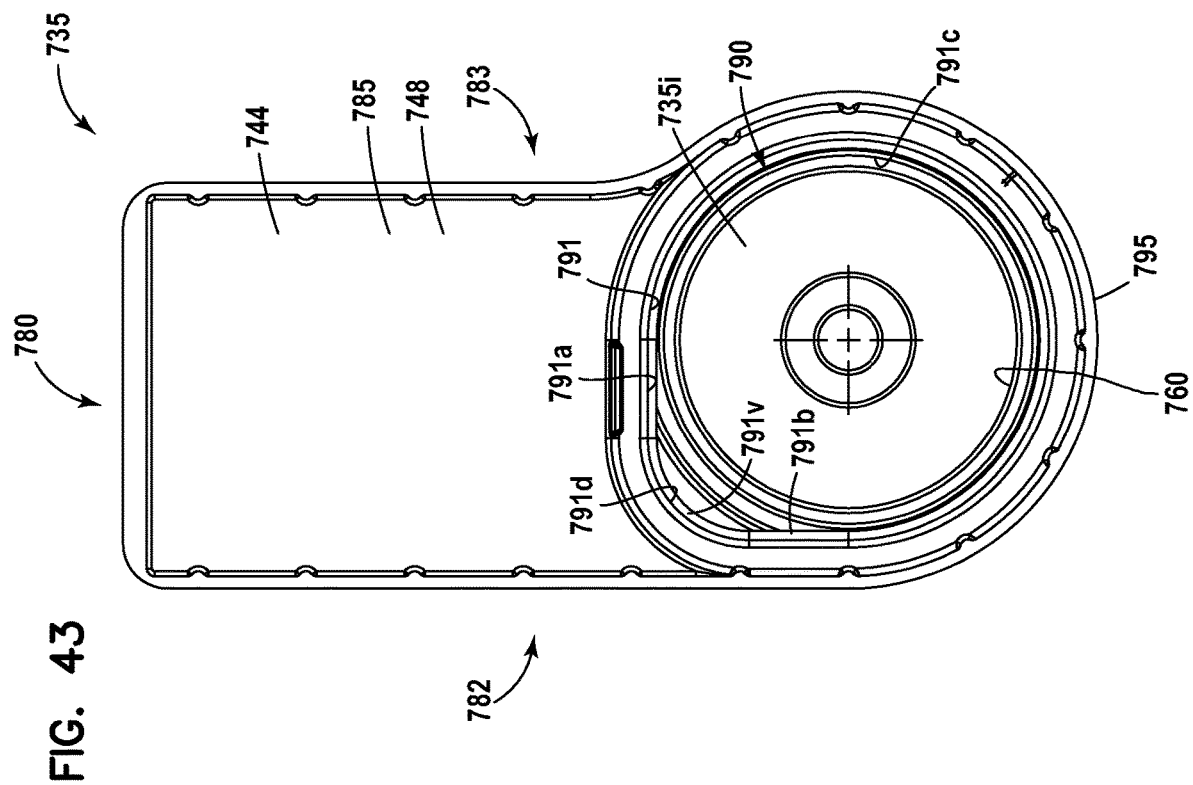

FIG. 43 is a schematic open end elevational view of the cartridge of FIG. 42; FIG. 43 being directed toward an opposite end to that of FIG. 42.

Figure 44:
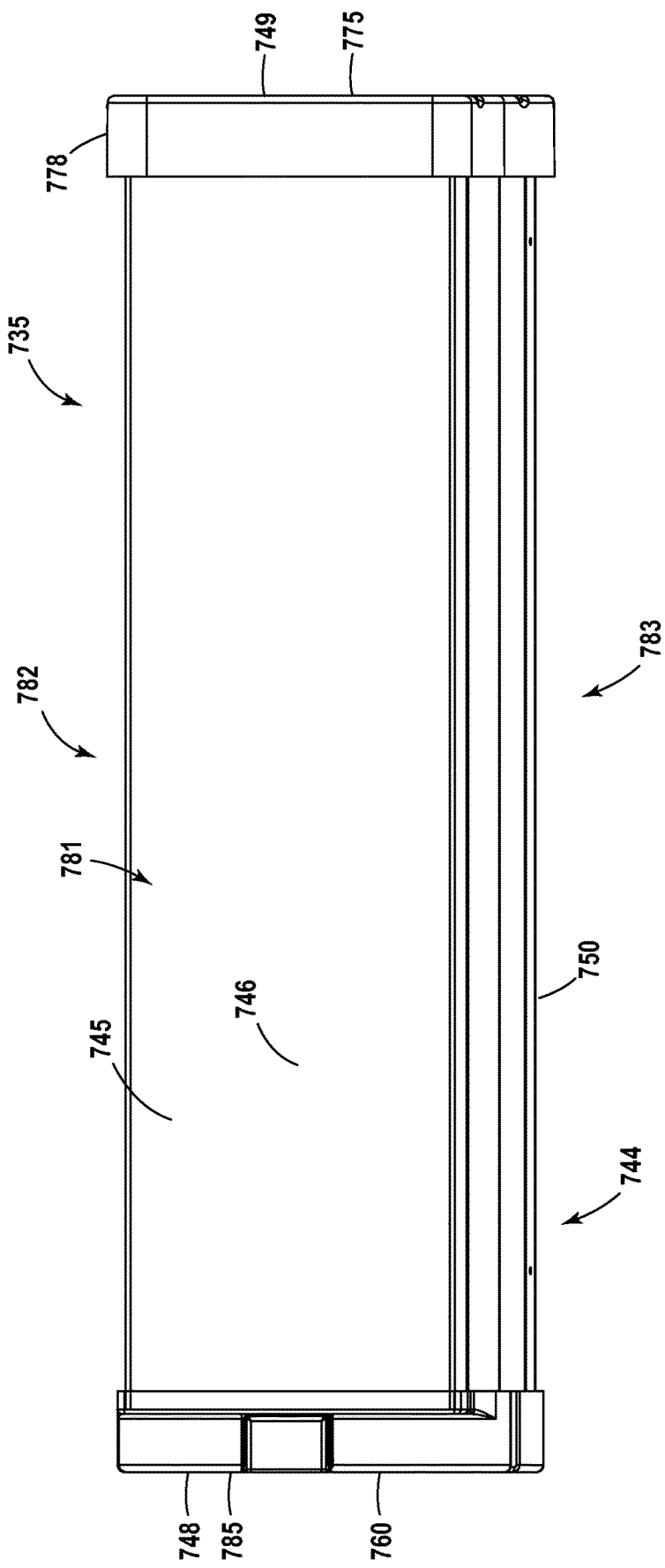

FIG. 44 is schematic top plan view of the filter cartridge of FIGS. 42 and 43.

Figure 45:
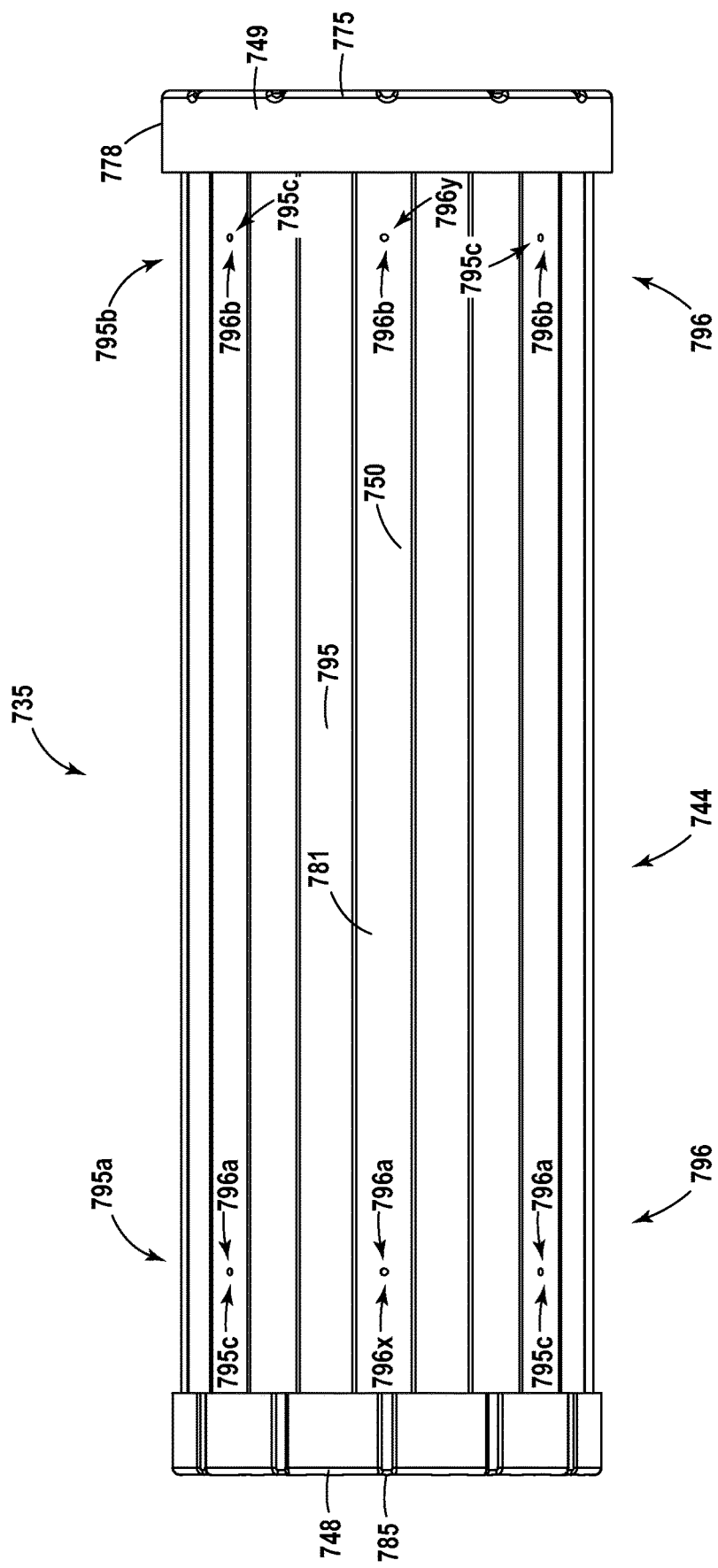

FIG. 45 is a schematic bottom plan view of the filter cartridge of FIGS. 42-44.

Figure 46:
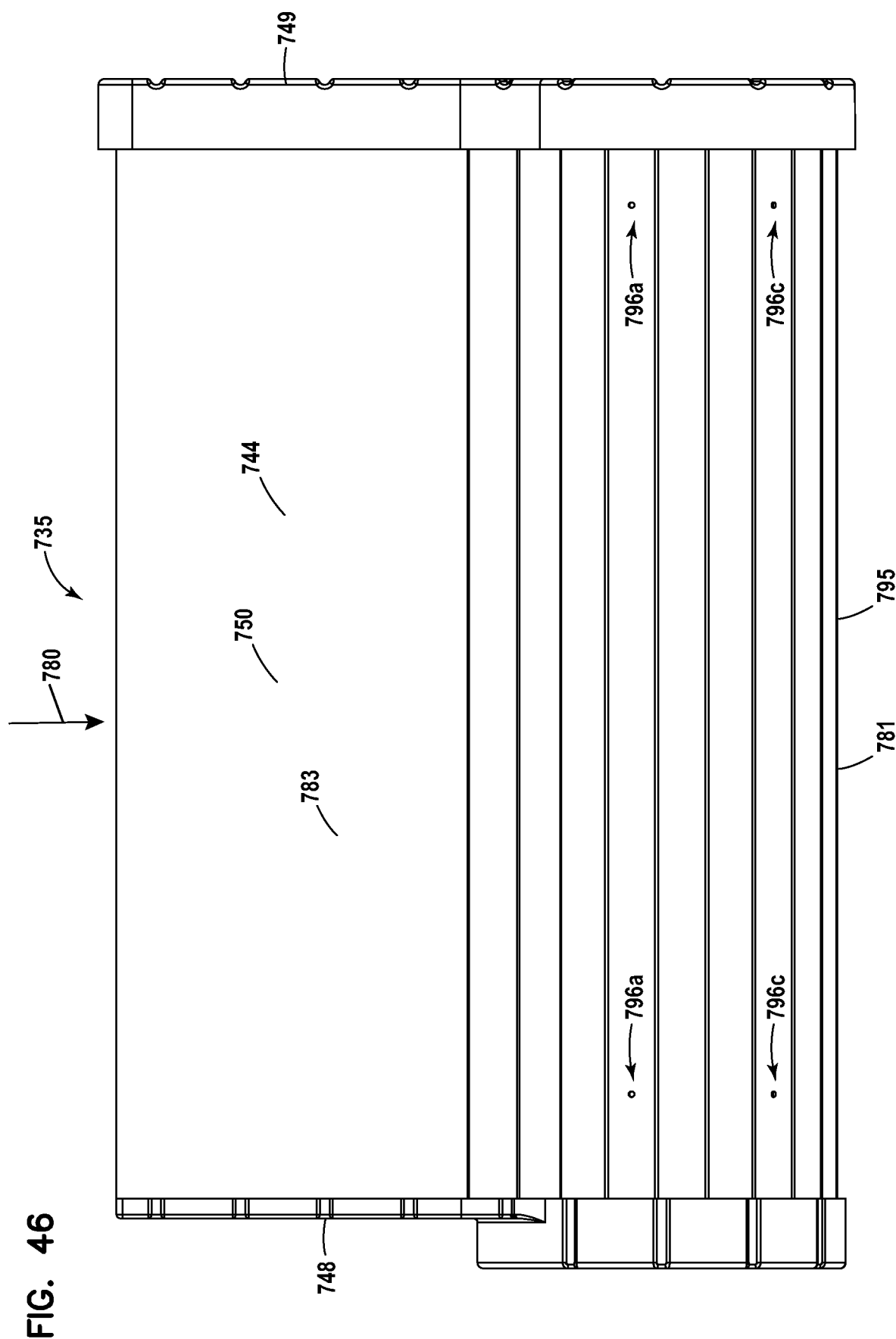

FIG. 46 is a schematic side elevational view of the filter cartridge of FIGS. 42-45.

Figure 47:
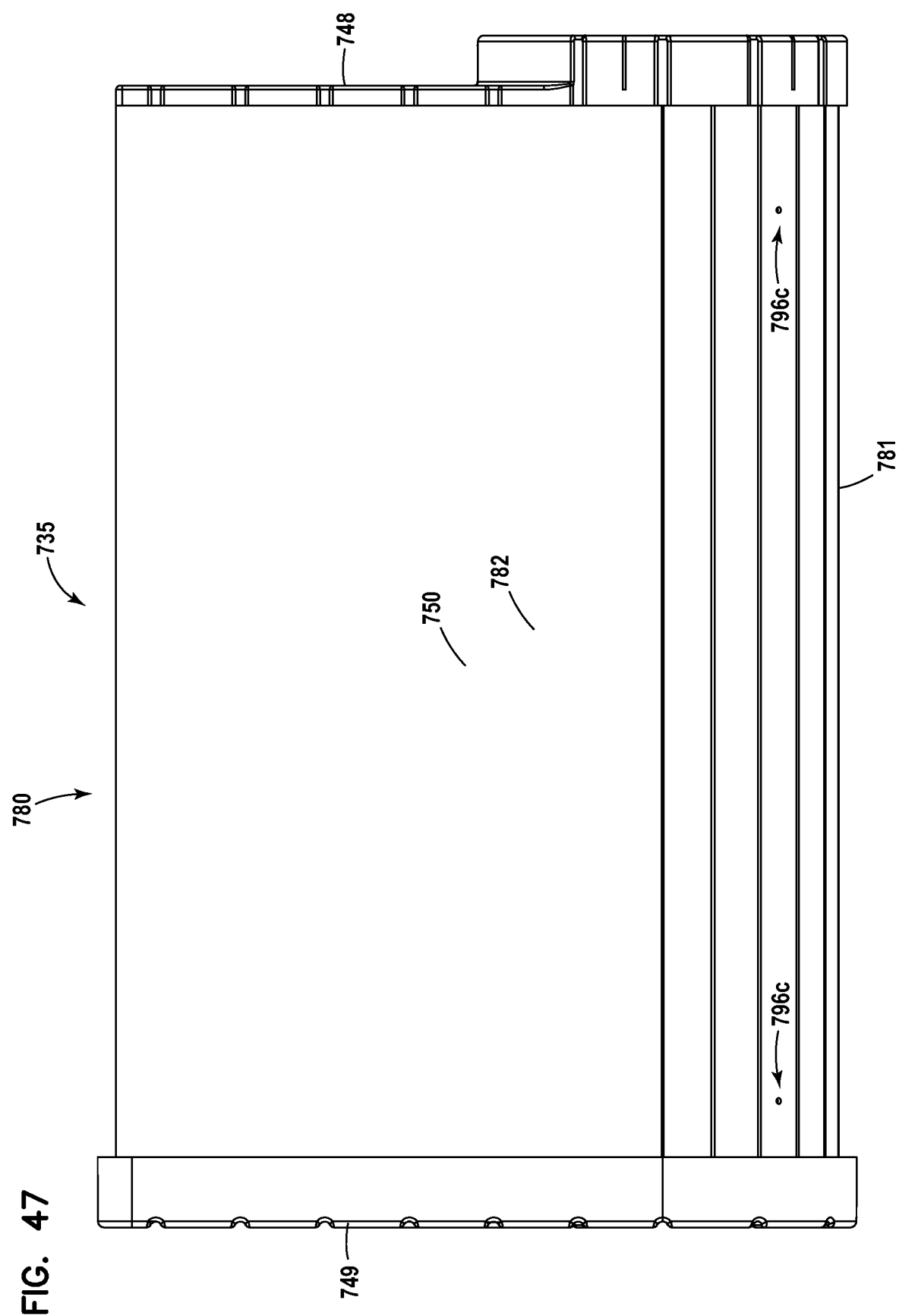

FIG. 47 is a second schematic side elevational view of the filter cartridge of FIG. 46, directed toward an opposite side from the view of FIG. 46.

FIG. 48A is a schematic cross-sectional view of the filter cartridge depicted in FIGS. 42-47.

Figure 48B:
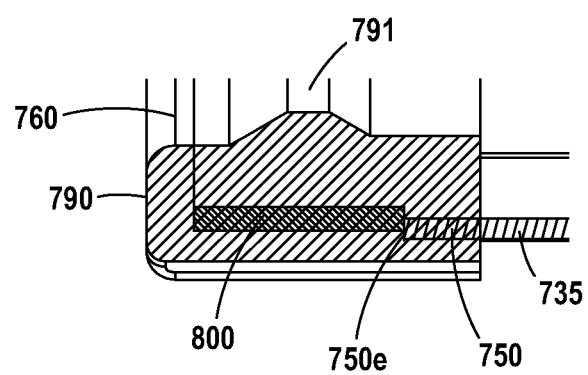

FIG. 48B is a schematic enlarged fragmentary view of a selected portion of FIG. 48A.

Figure 49:
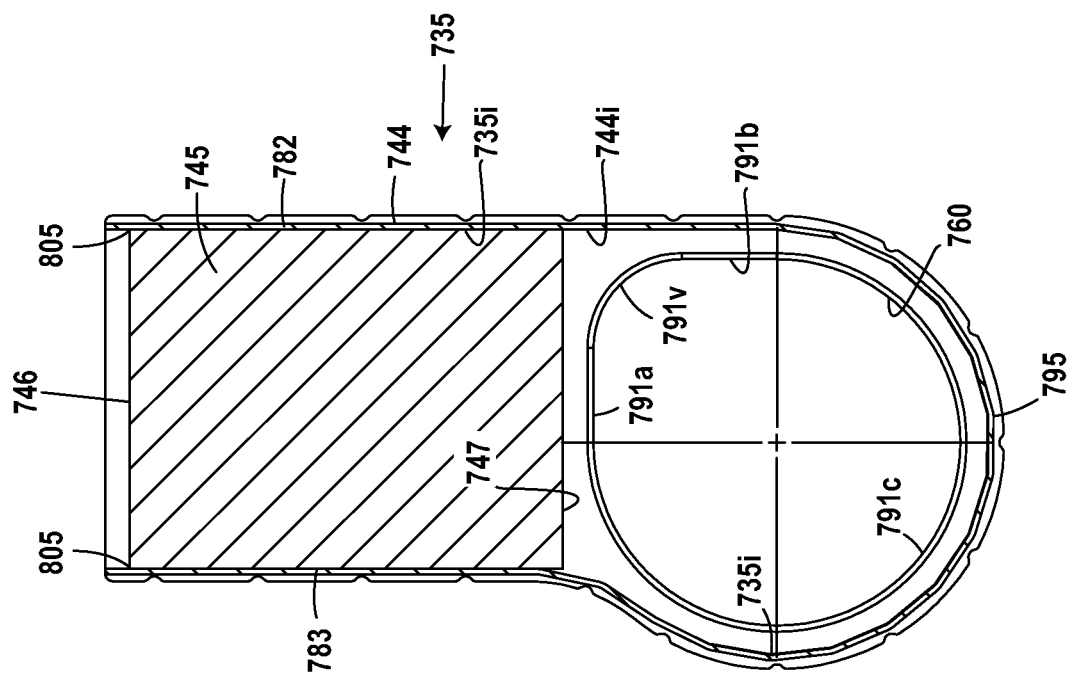

FIG. 49 is a schematic cross-sectional view taken generally along line 49-49, FIG. 48.

Figure 50:
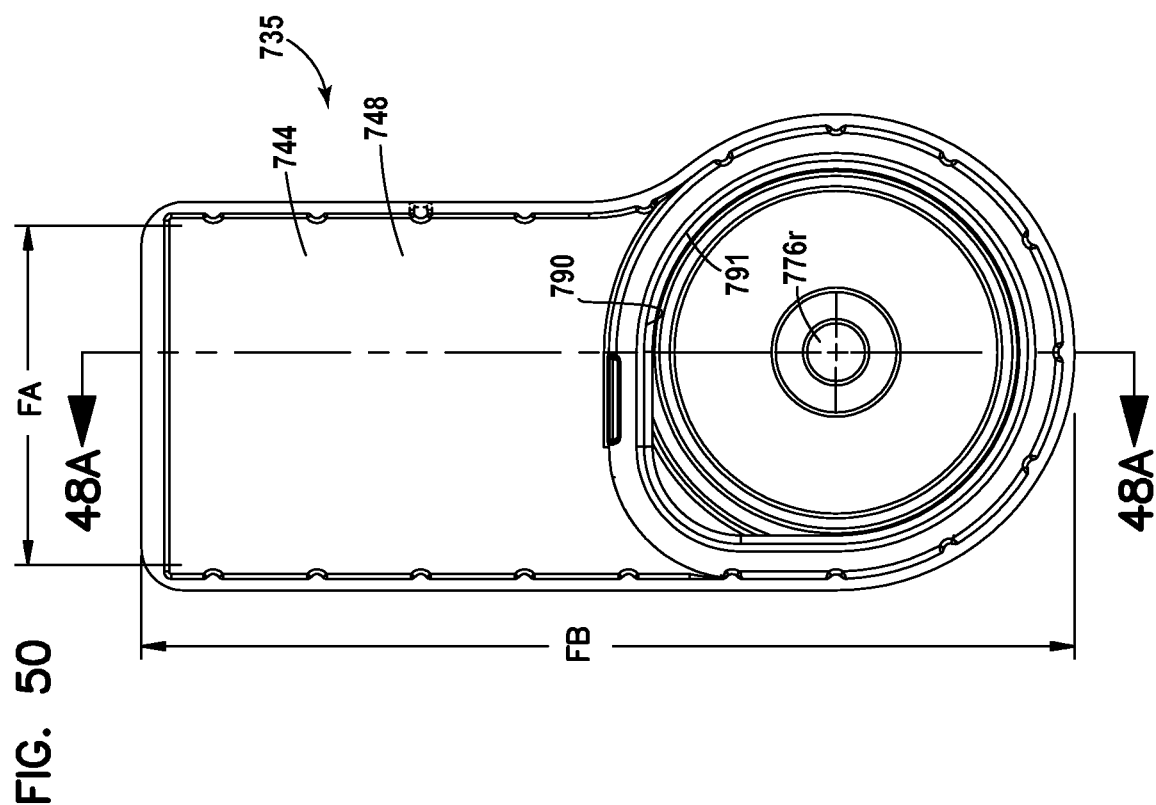

FIG. 50 is a schematic open end elevational view of the filter cartridge of FIG. 46, line 48A-48A indicating the cross-sectional view of FIG. 48A.

Figure 51:
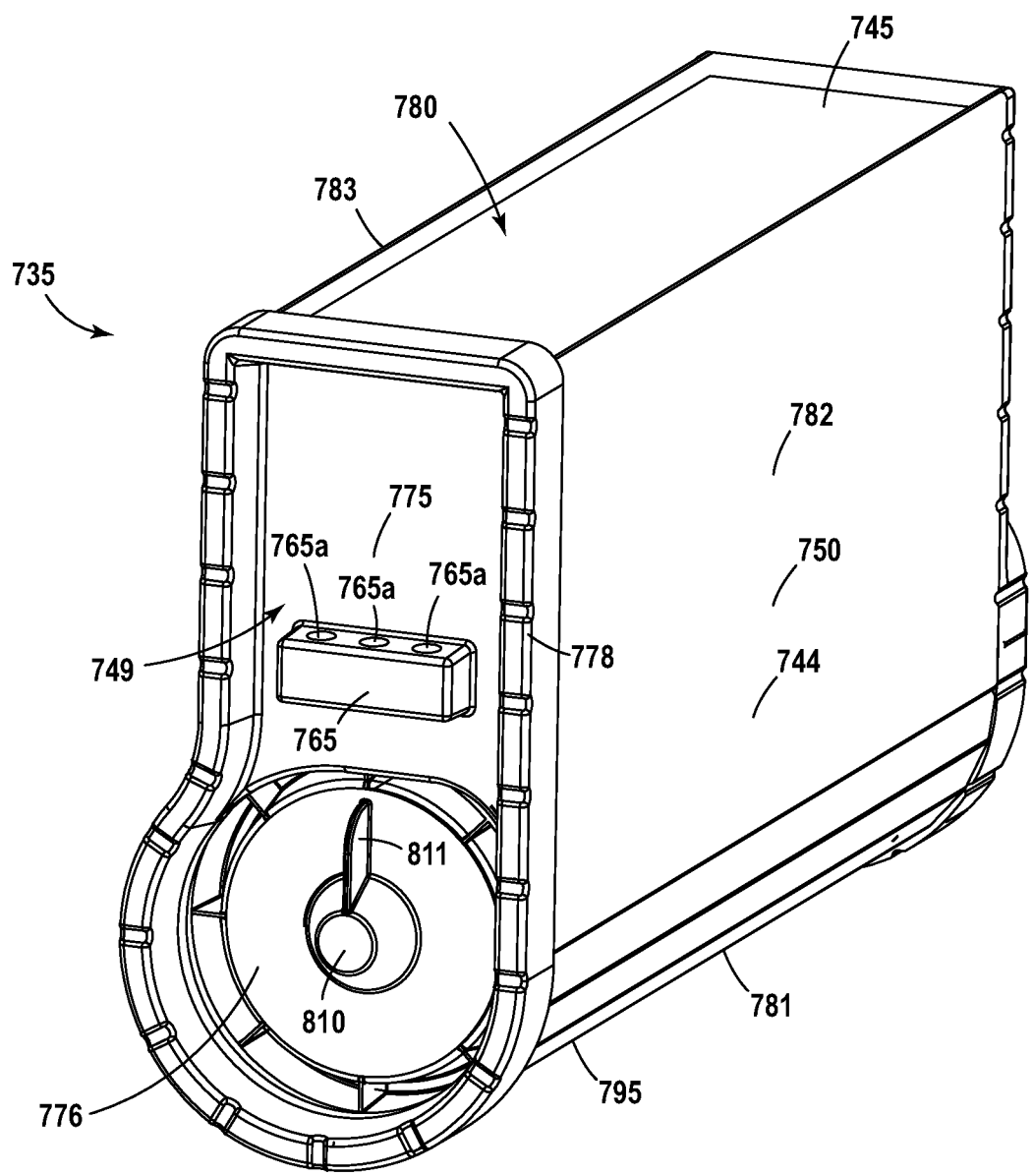

FIG. 51 is a schematic top perspective view of the filter cartridge of FIGS. 42-47; FIG. 51 being generally directed toward an closed end of the filter cartridge.

Figure 52:
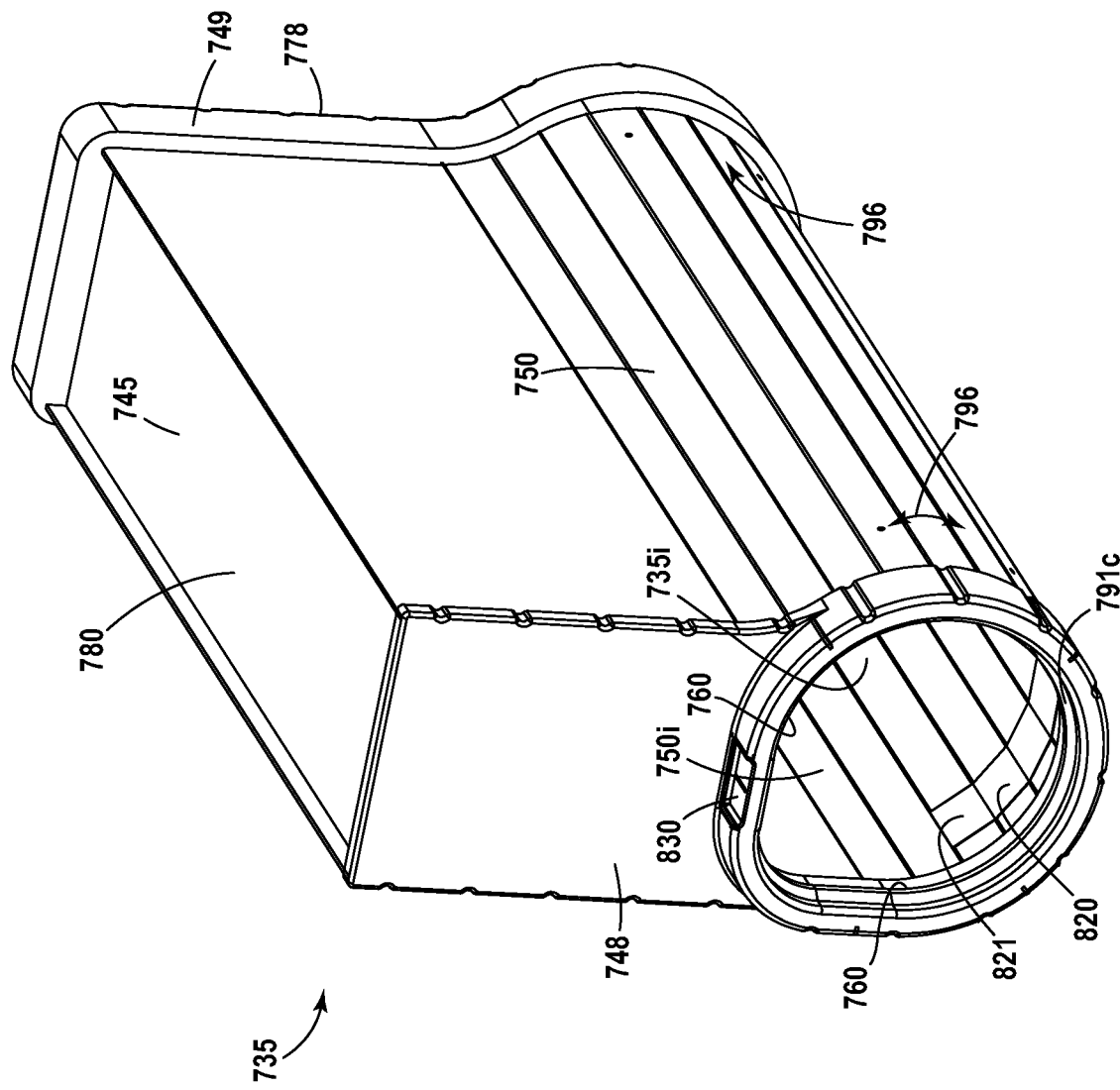

FIG. 52 is a schematic top perspective view of the filter cartridge of FIG. 51, the view of FIG. 52 being directed toward an outlet end.

Figure 53:
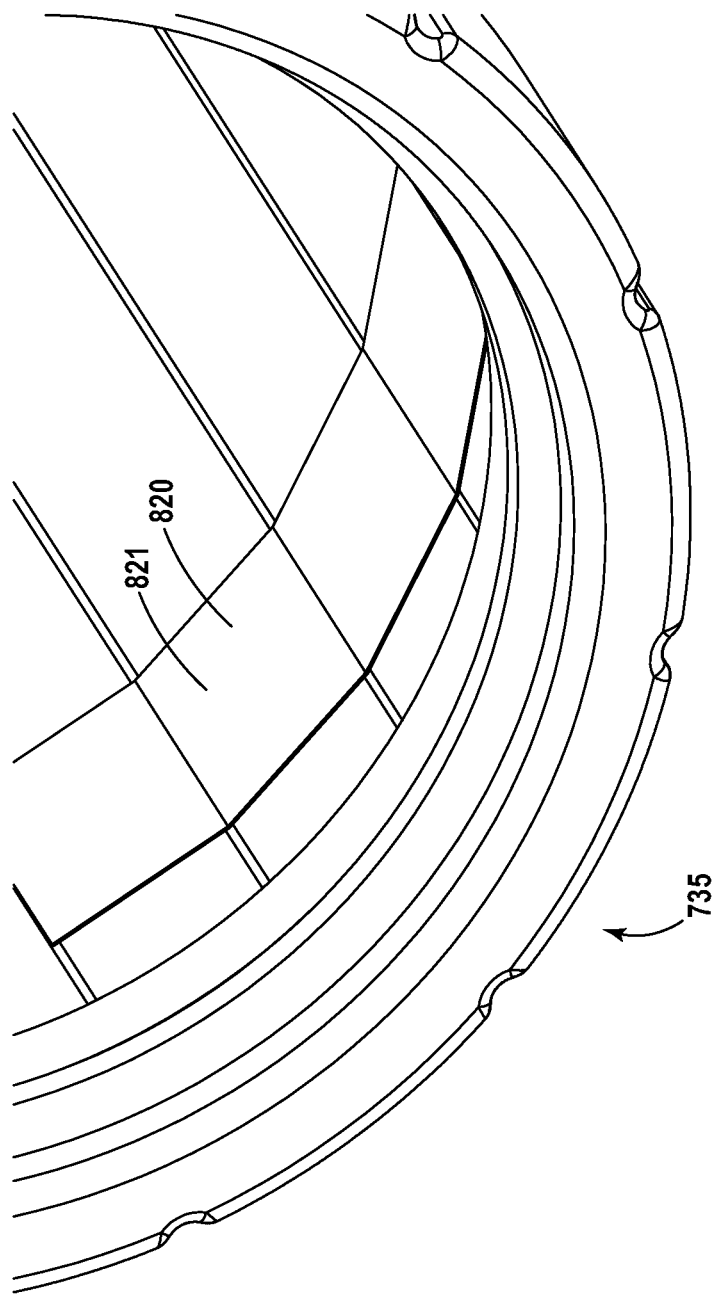

FIG. 53 is a schematic enlarged fragmentary view of the selected portion of FIG. 52.

Figure 54:
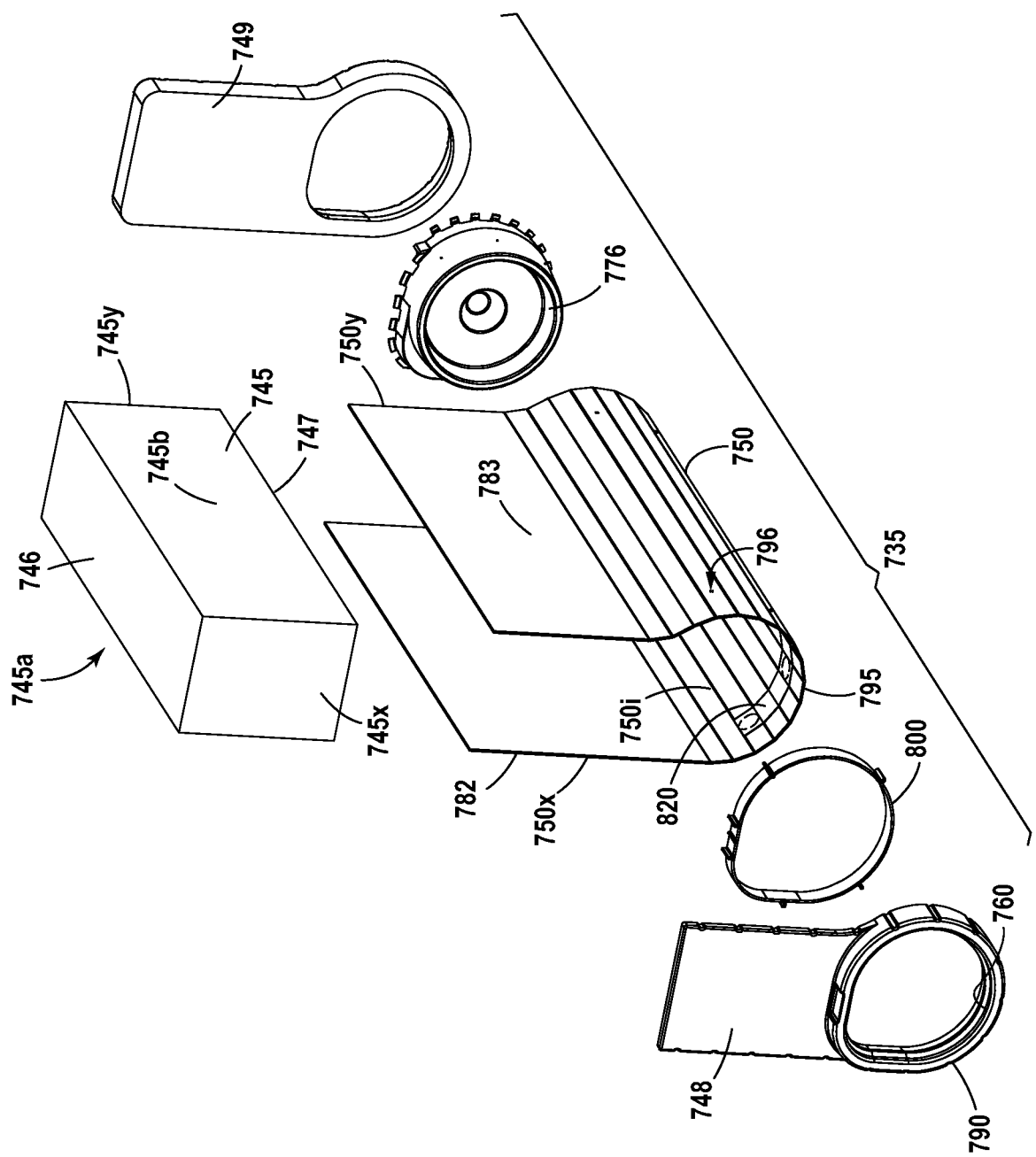

FIG. 54 is a schematic exploded view of the filter cartridge of FIG. 52; in FIG. 54 a perspective view is provided generally from the same orientation as FIG. 52.

Figure 55:
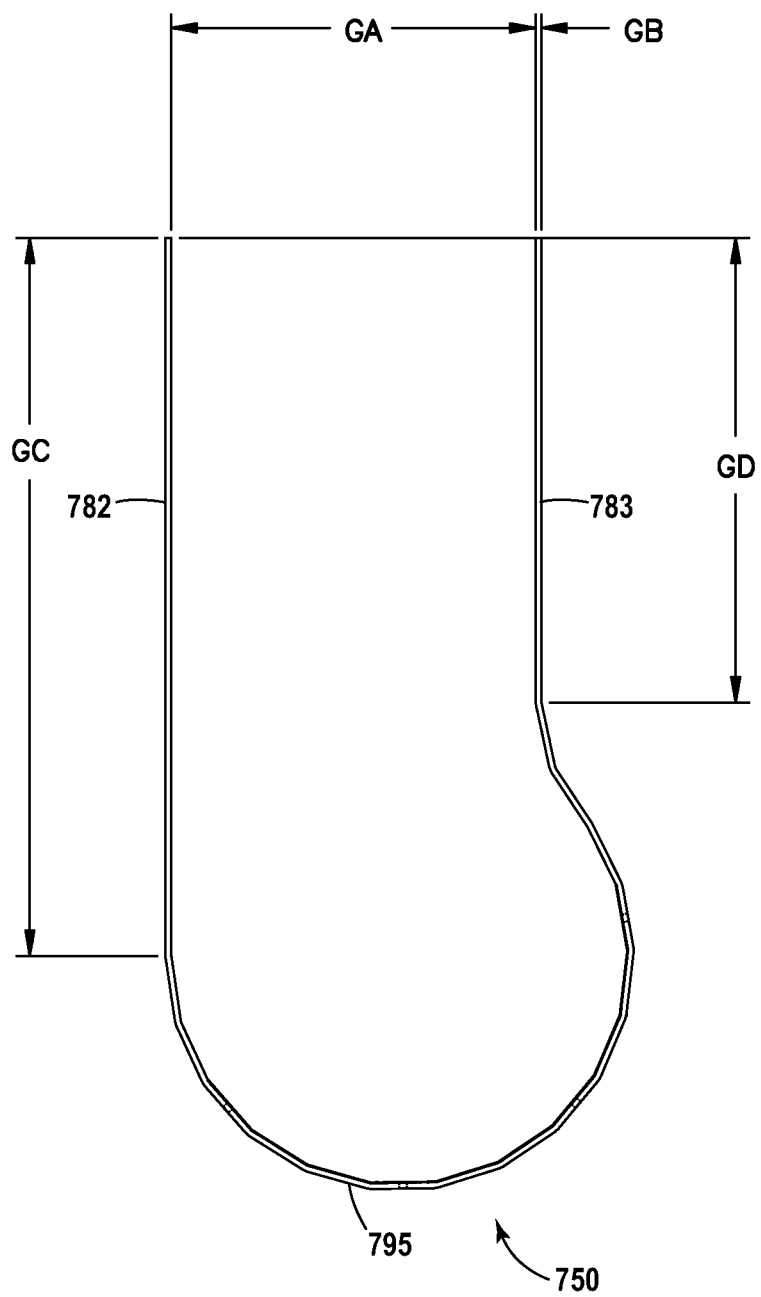

FIG. 55 is a schematic end elevational view of a shell component of FIG. 54.

Figure 56:
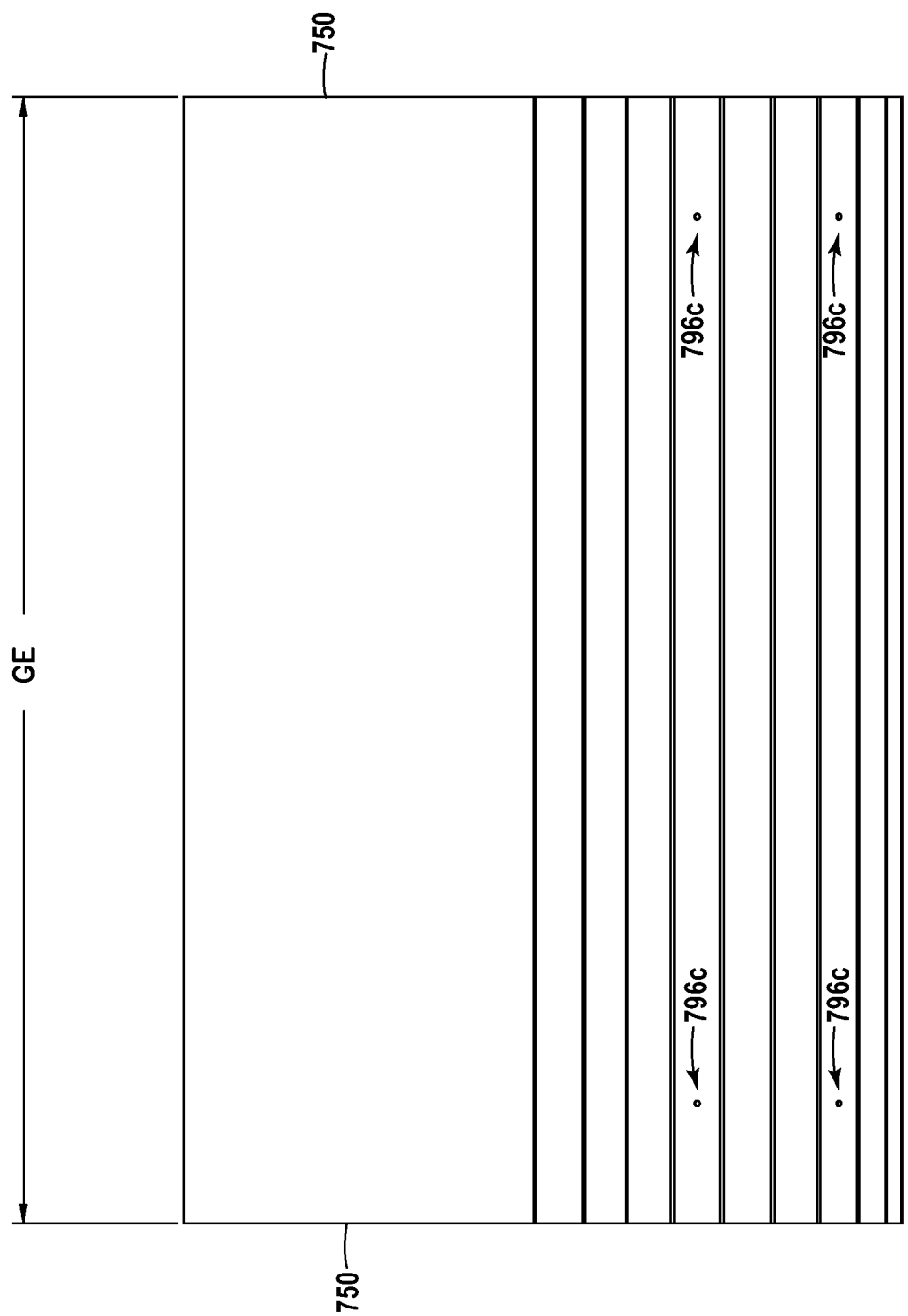

FIG. 56 is a schematic side elevational view of the shell component of FIG. 55.

Figure 57:
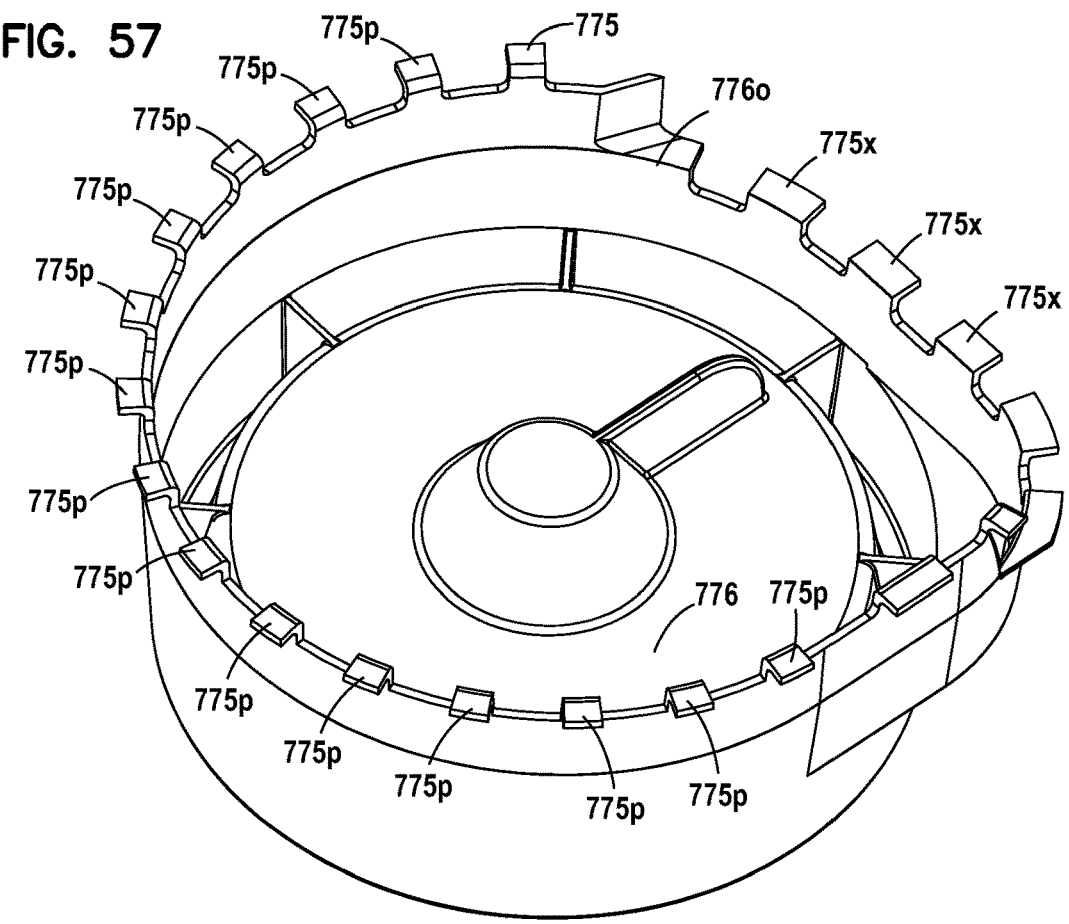

FIG. 57 is a schematic perspective view a pre-form, end cover, component of FIG. 54.

Figure 58:
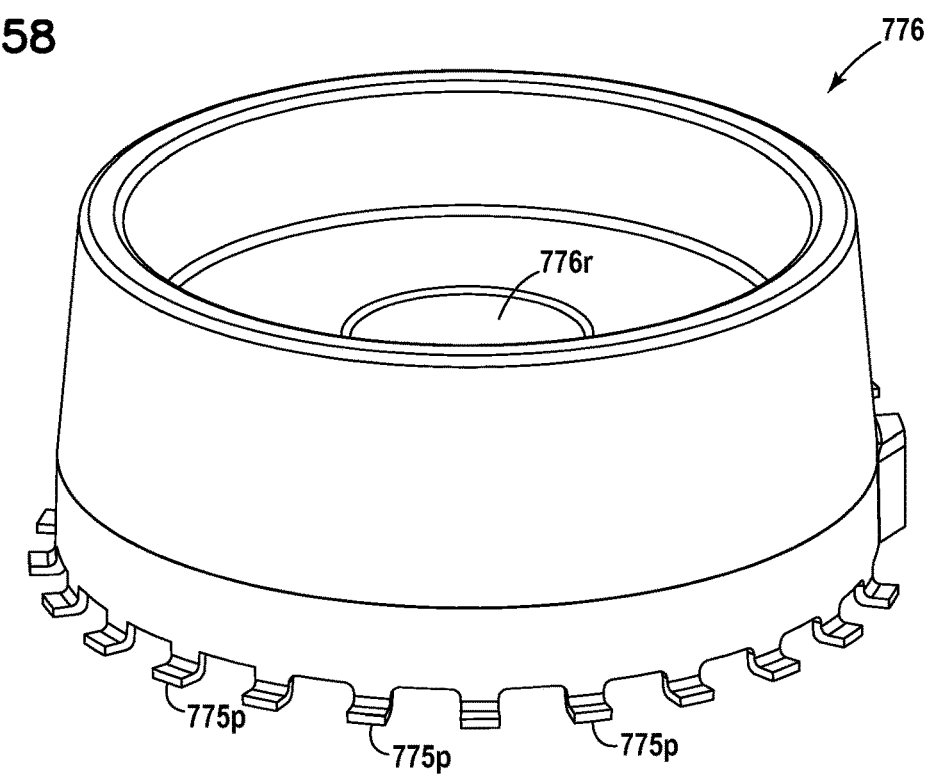

FIG. 58 is a schematic inside perspective view of the end cover component of FIG. 57.

Figure 59:
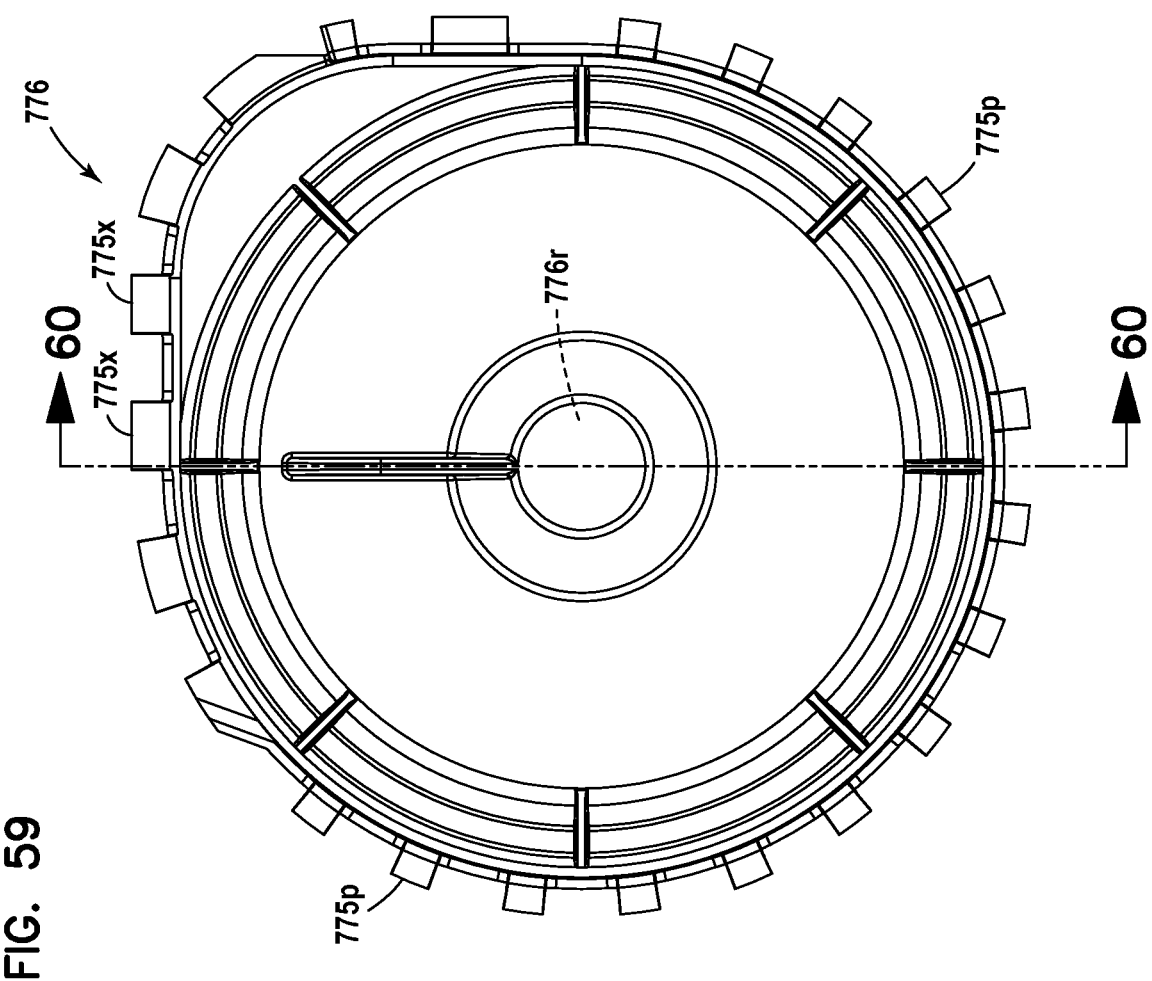

FIG. 59 is a schematic outside plan view of the end cover component of FIG. 57.

Figure 60:
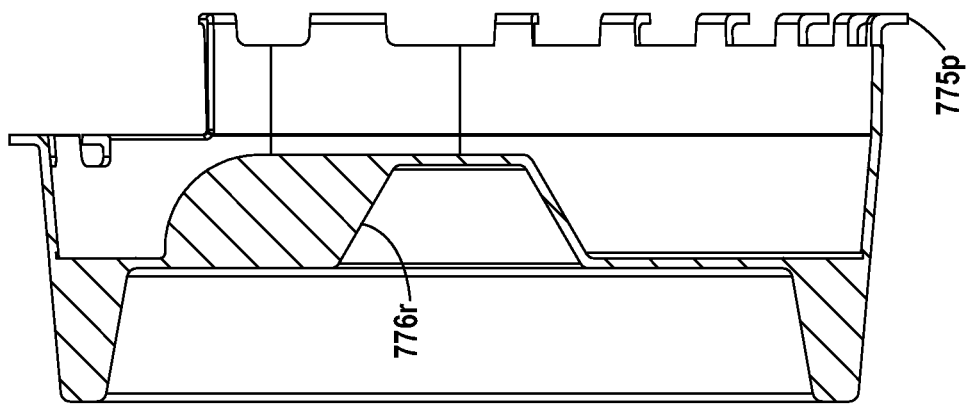

FIG. 60 is a schematic cross-sectional view taken generally along line 60-60, FIG. 59.

Figure 61:
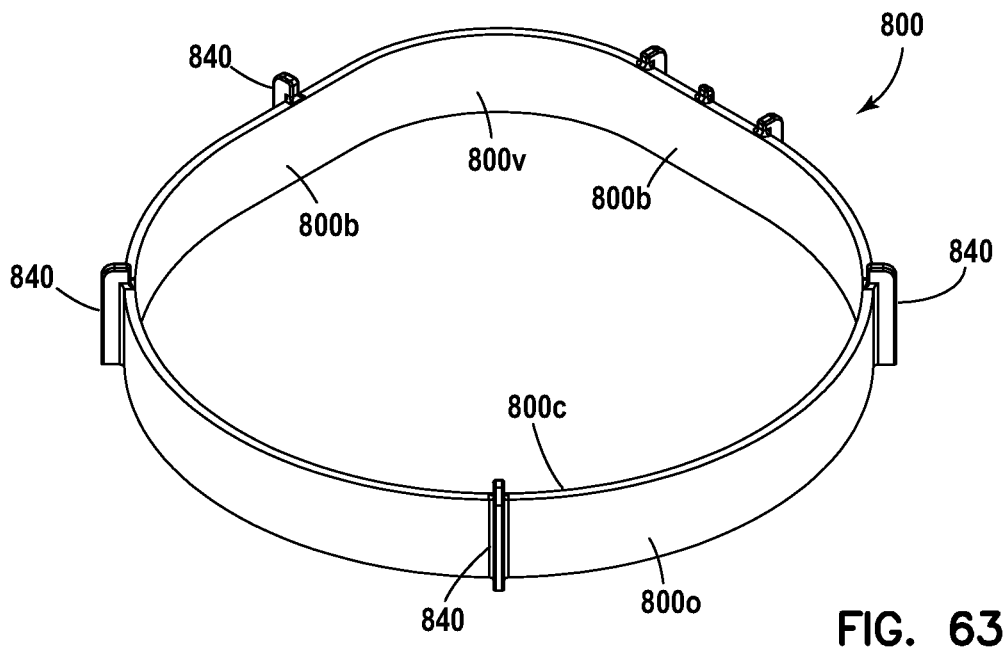

FIG. 61 is a schematic perspective view of a seal support ring component of FIG. 54.

Figure 62:
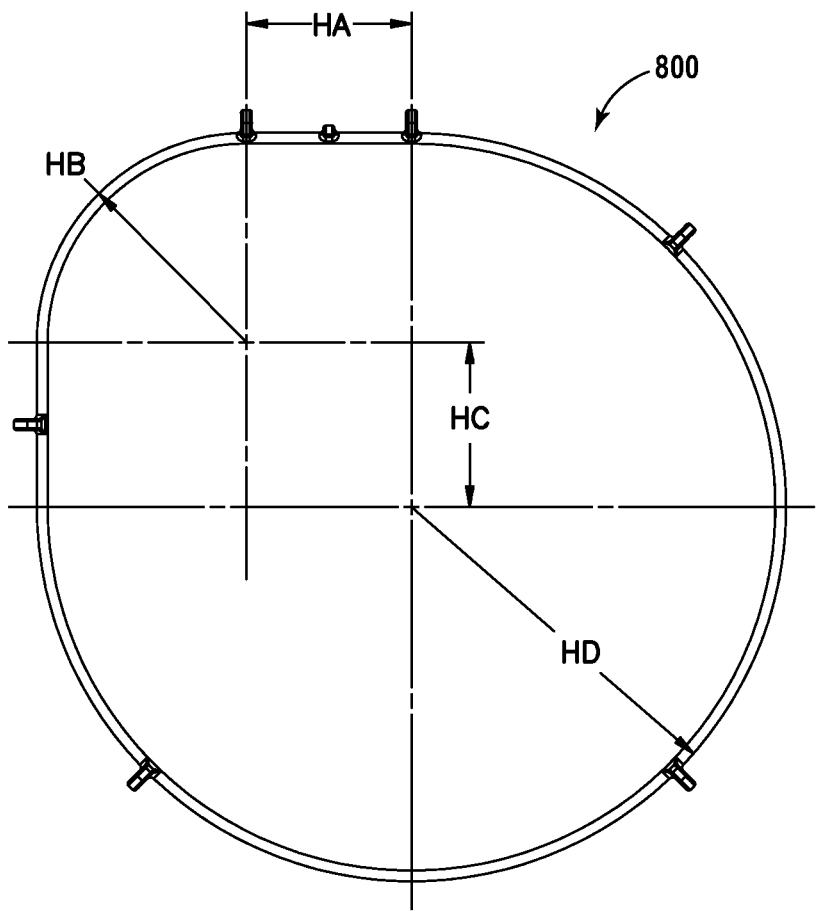

FIG. 62 is a schematic plan view of the component of FIG. 61.

Figure 63:
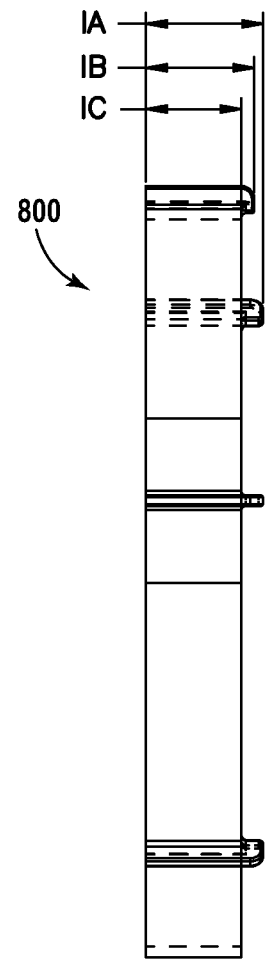

FIG. 63 is a schematic side elevational view of the component of FIG. 62.

Figure 64:
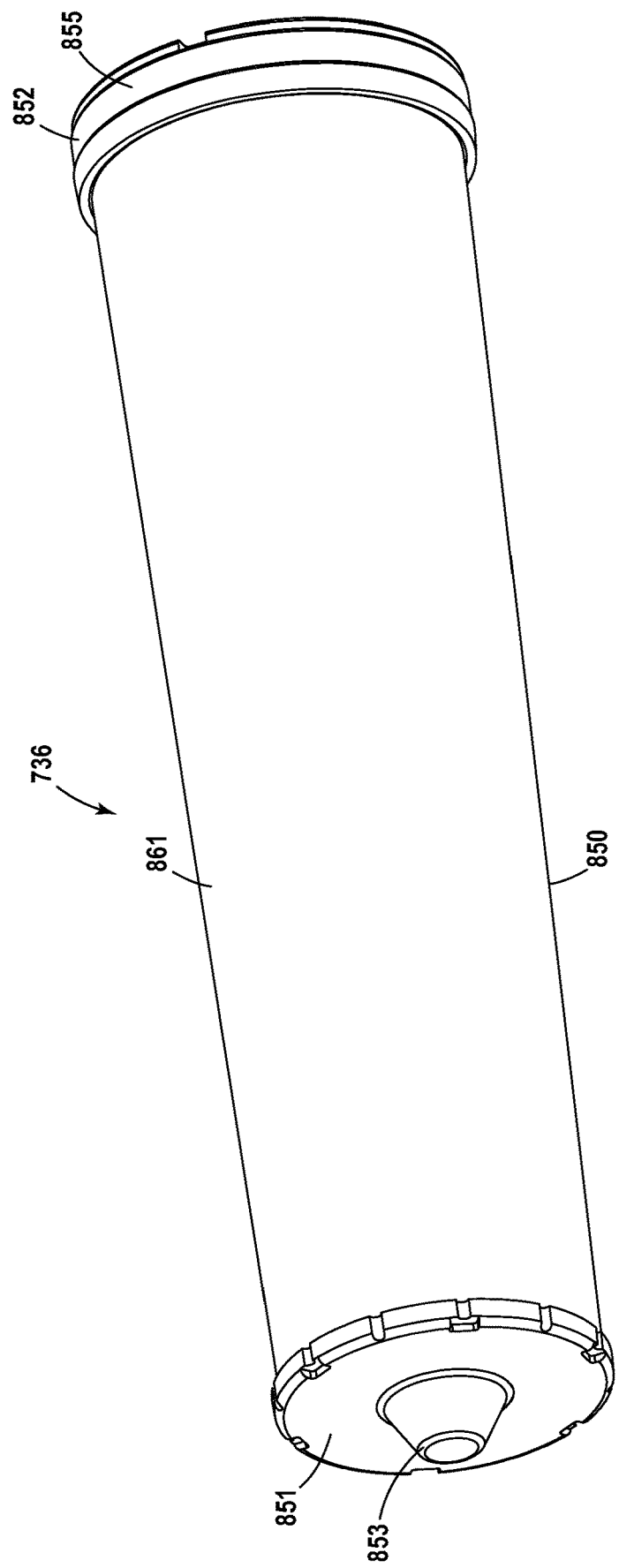

FIG. 64 is a schematic perspective view of a safety secondary filter cartridge of the air cleaner assembly of FIGS. 32-39.

Figure 65:
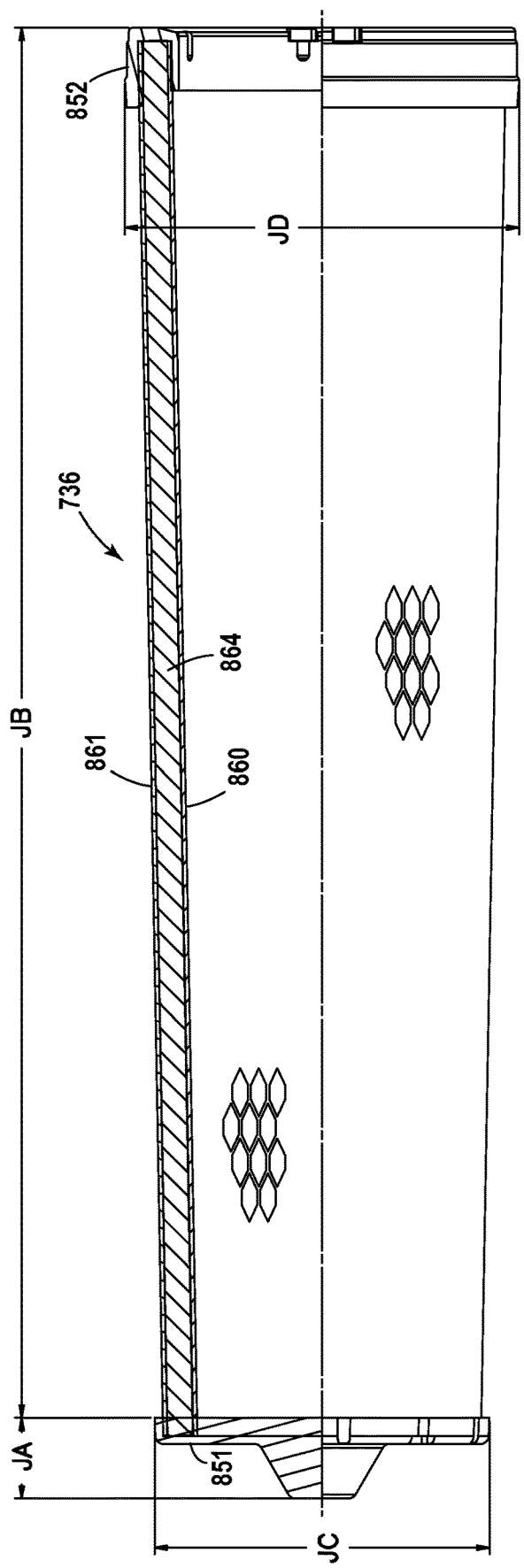

FIG. 65 is a side elevational view of the secondary filter cartridge of FIG. 64, with portions shown in cross-section.

DETAILED DESCRIPTION

I. Z-Filter Media Configurations, Generally

Fluted filter media can be used to provide fluid filter constructions in a variety of manners. One well known manner is characterized herein as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided or used in U.S. Pat. Nos. 5,820,646; 5,772,883; 5,902,364; 5,792,247; 5,895,574; 6,210,469; 6,190,432; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (sometimes corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (sometimes corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (sometimes corrugated) media secured to facing media, are stacked on one another, to create a filter construction. An example of this is described in FIG. 11 of U.S. Pat. No. 5,820,646, incorporated herein by reference.

Herein, strips of material comprising fluted sheet secured to corrugated sheet, which is then assembled into stacks to form media packs, are sometimes referred to as "single facer strips". The term "single facer strip" and variants thereof, is meant to refer to a fact that one face, i.e., a single face of the fluted (sometimes corrugated) sheet, is faced by the facing sheet, in the strip.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

The term "z-filter media construction" and variants thereof as used herein, without more, is meant to refer to any or all of: a web of corrugated or otherwise fluted media secured to (facing) media with appropriate sealing to allow for definition of inlet and outlet flutes or flow faces; or, a media pack constructed or formed from such media into a three dimensional network of inlet and outlet flutes; and/or, a filter cartridge or construction including such a media pack.

Figure 1:
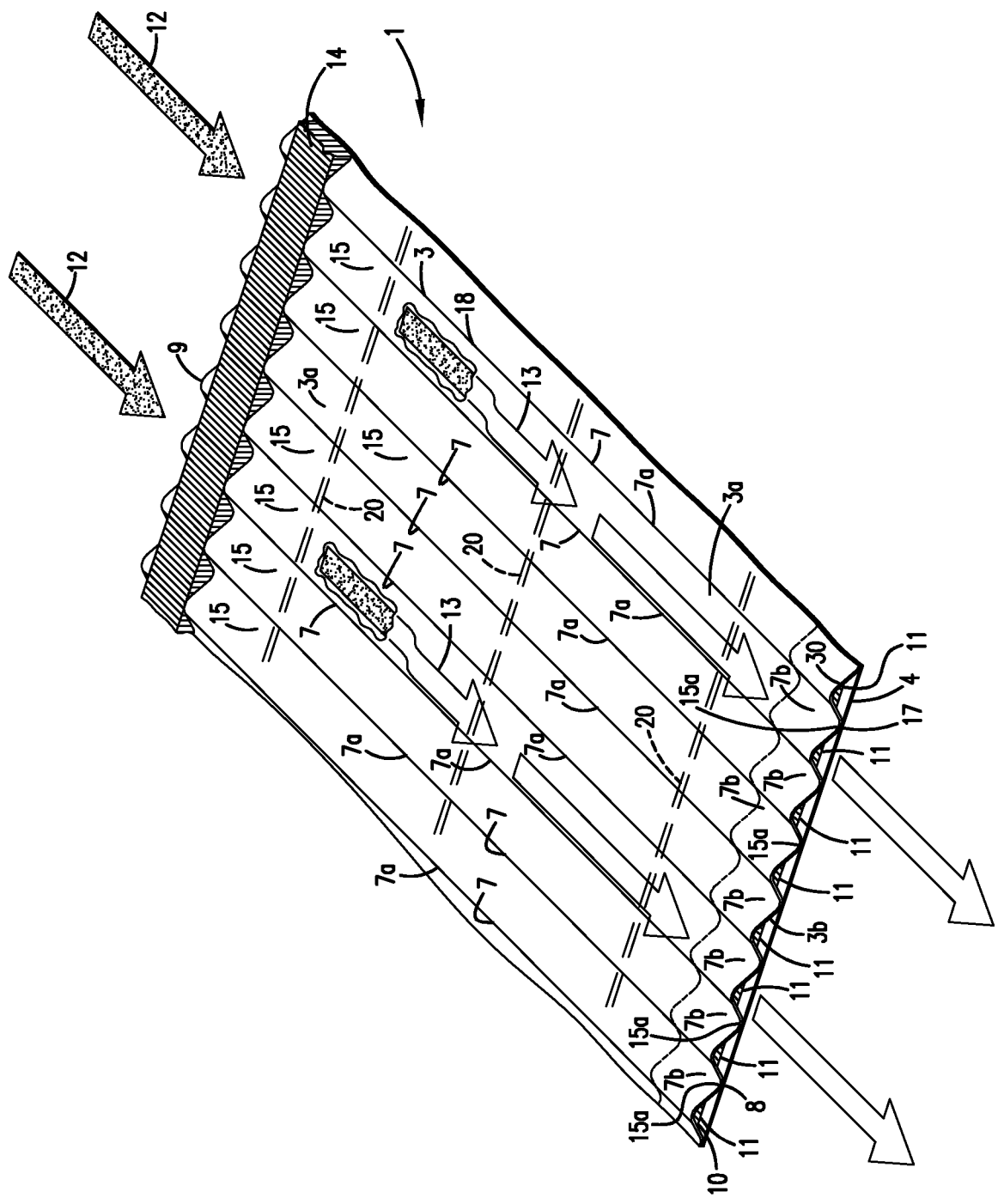
FIG. 1 is a fragmentary, schematic, perspective view of example z-filter media useable in arrangements according to U.S. 61/003,215.

In FIG. 1, an example of media 1 useable in z-filter media is shown. The media 1 is formed from a fluted, in this instance corrugated, sheet 3 and a facing sheet 4. A construction such as media 1 is deferred to herein as a single facer or single facer strip.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as strips of the media 1 are secured to one another during stacking. Thus bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from media 1, not depicted herein, it is referenced as a "winding bead.")

At 20, FIG. 1, tack bead between the fluted sheet 3 and the facing sheet 4 are shown.

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media, for example as shown by arrows 13. It could then exit the media pack, by passage through open ends 15a of the flutes 15, adjacent end 8 of the media pack. Of course operation could be conducted with air flow in the opposite direction.

Herein, a media pack comprising media 1 will sometimes be referred to as having a "straight through" flow construction, since air to be filtered enters and exits media pack via opposite flow faces.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations are critical to proper operation of the media structure that results. The high sealant volume and area, creates issues with respect to this.

Figure 2:
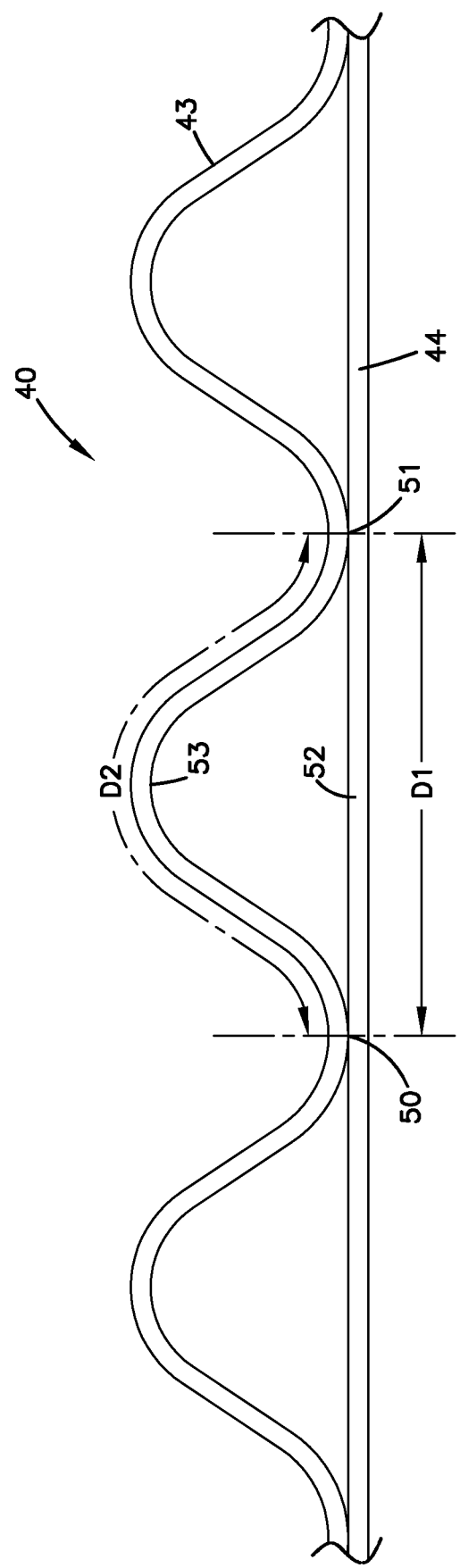
FIG. 2 is an enlarged, schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35× D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
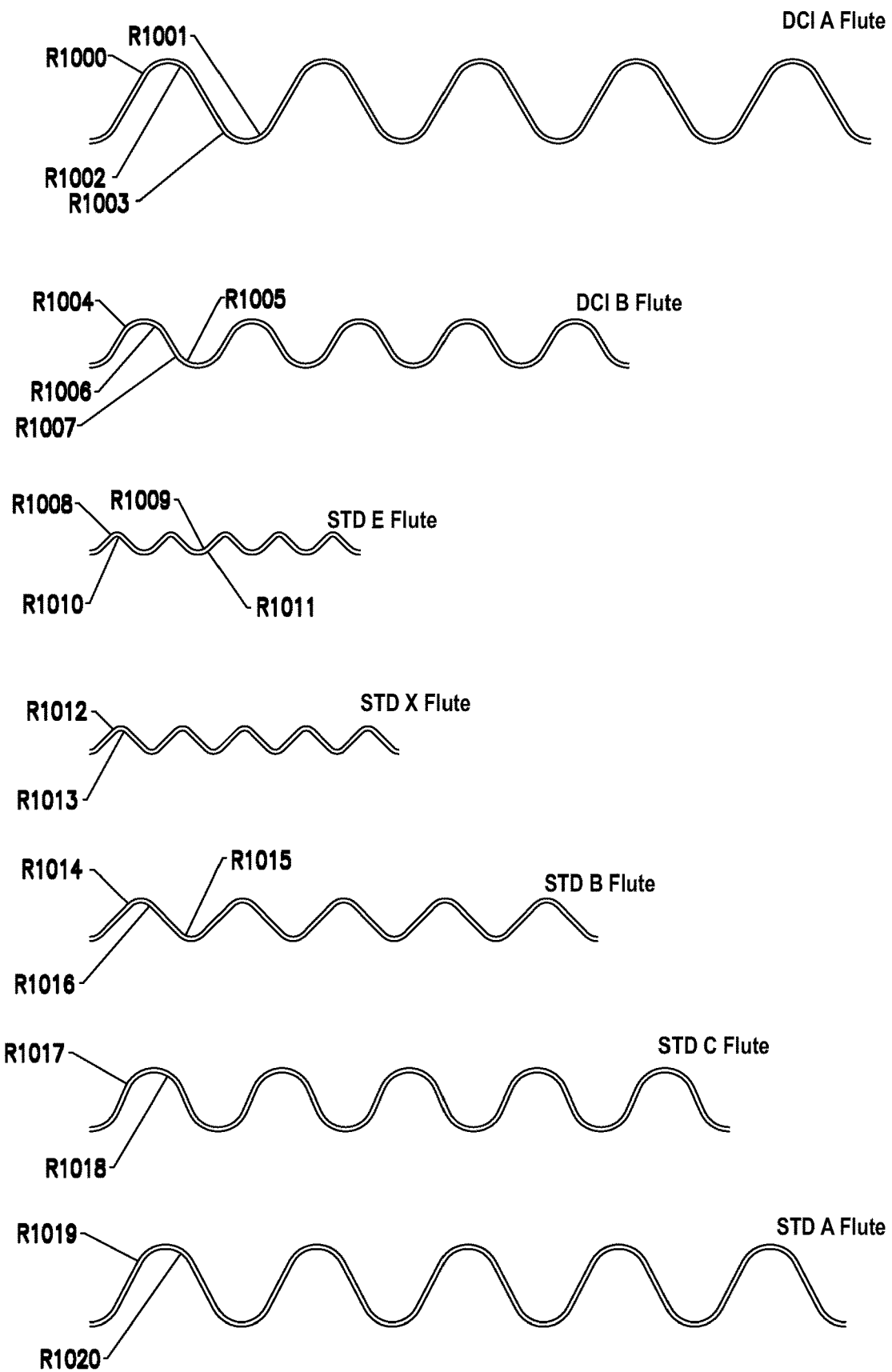
FIG. 3 includes schematic views of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm);<br>R1001 = .0581 inch (1.476 mm);<br>R1002 = .0575 inch (1.461 mm);<br>R1003 = .0681 inch (1.730 mm); |
| DCI B Flute: | Flute/flat = 1.32:1; The Radii (R) are as follows:<br>R1004 = .0600 inch (1.524 mm);<br>R1005 = .0520 inch (1.321 mm);<br>R1006 = .0500 inch (1.270 mm);<br>R1007 = .0620 inch (1.575 mm); |
| Std. E Flute: | Flute/flat = 1.24:1; The Radii (R) are as follows:<br>R1008 = .0200 inch (.508 mm);<br>R1009 = .0300 inch (.762 mm);<br>R1010 = .0100 inch (.254 mm);<br>R1011 = .0400 inch (1.016 mm); |
| Std. X Flute: | Flute/flat = 1.29:1; The Radii (R) are as follows:<br>R1012 = .0250 inch (.635 mm);<br>R1013 = .0150 inch (.381 mm); |
| Std. B Flute: | Flute/flat = 1.29:1; The Radii (R) are as follows:<br>R1014 = .0410 inch (1.041 mm);<br>R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm);<br>R1018 = .0620 inch (1.575 mm); |
| Std. A Flute: | Flute/flat = 1.53:1; The Radii (R) are as follows:<br>R1019 = .0720 inch (1.829 mm);<br>R1020 = .0620 inch (1.575 mm); |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

Alternate flute definitions, such as those described in U.S. Provisional applications: 60/899,311, filed Feb. 2, 2007; and, 60/937,162, filed Jun. 26, 2007 can be utilized in arrangements according to the present disclosure. Each of these two US Provisional applications is incorporated herein, by reference.

II. Manufacture of Stacked Media Configurations Using Fluted Media, Generally

Figure 4:
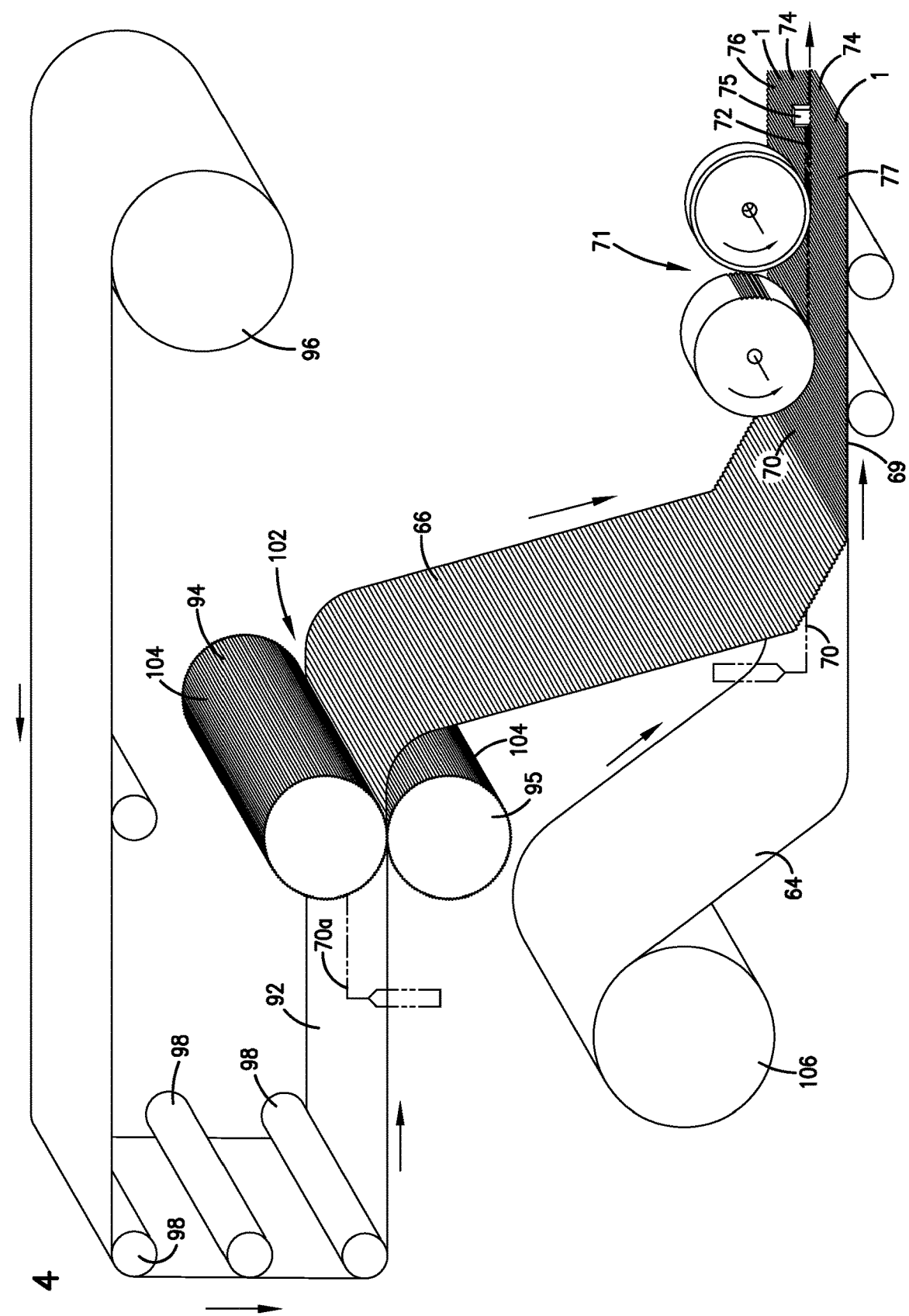
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 14, FIG. 1.

The term "single facer bead" is meant to refer to a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 6.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated (i.e., fluted) media sheet 66 is then secured to facing media sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One typical type of flute pattern will be a regular, typically curved, wave pattern corrugation, of straight flutes, as defined herein above. A typical regular curved wave pattern used, would be one in which the distance D2, as defined above, in a corrugated pattern is at least 1.2 times the distance D1 as defined above. In one typical application, typically D2=1.25-1.35×D1; in another D2=1.4-1.6×D1. In some instances the techniques may be applied with curved wave patterns that are not "regular," including, for example, ones that do not use straight flutes.

Figure 5:
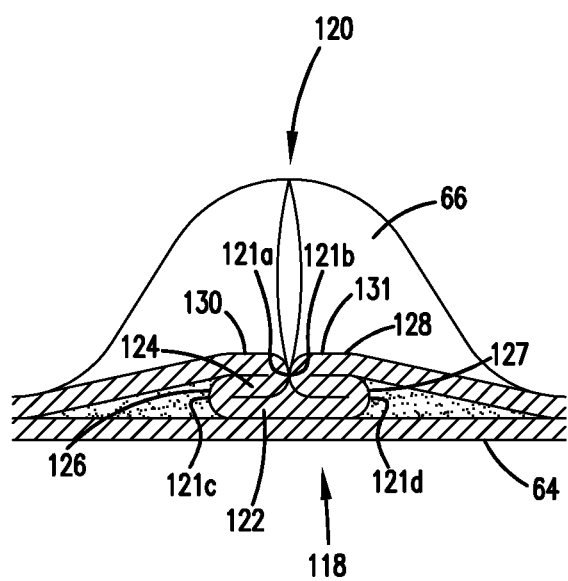
FIG. 5 is a schematic cross-sectional view of an optional end dart for media flutes useable in arrangements described herein.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a an example regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. It is noted that a variety of alternate folded end closures in flutes can be used.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
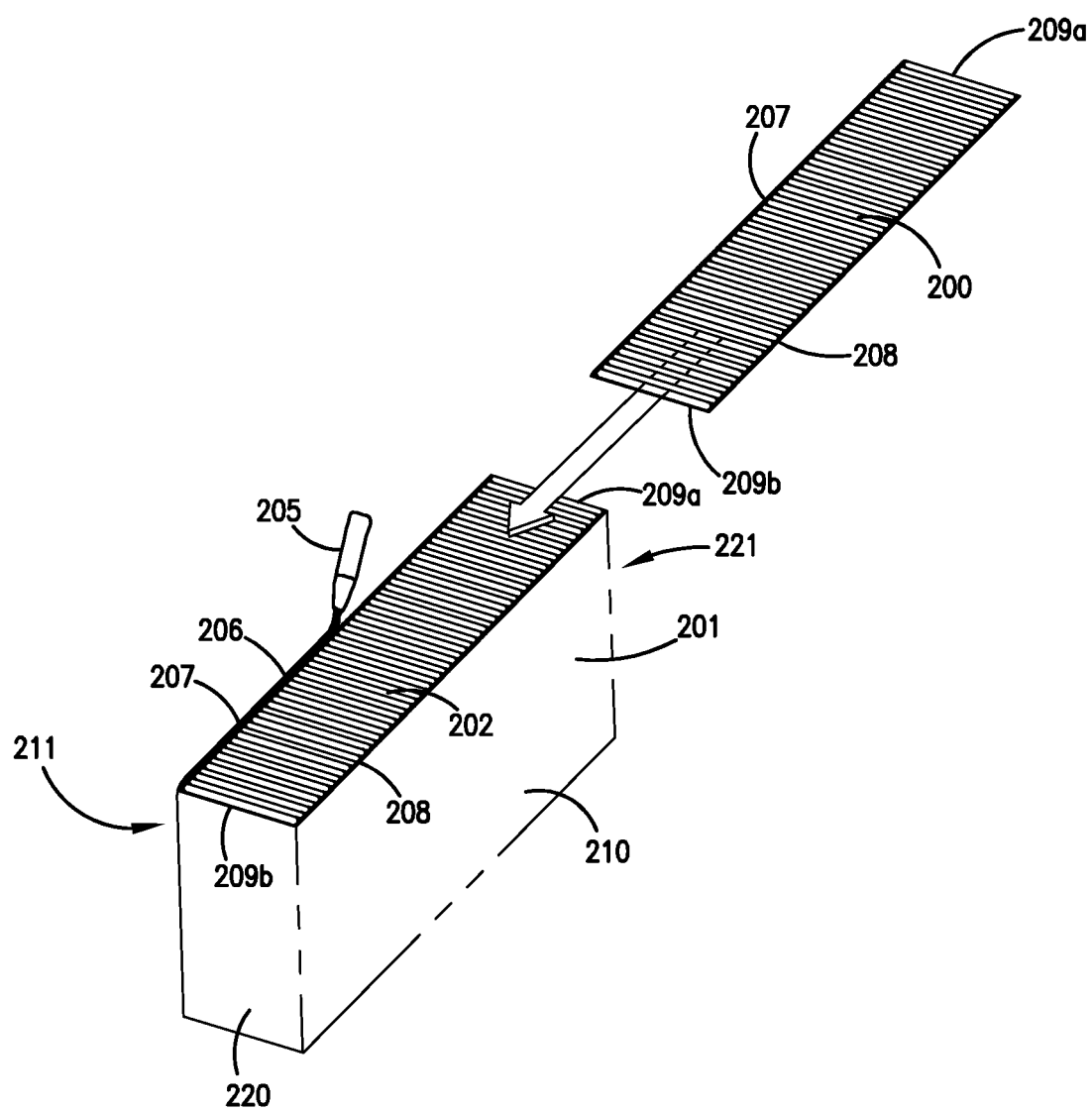
FIG. 6 is a schematic depiction of a step of creating a stacked z-filter media pack.

In FIG. 6, schematically there is shown a step of forming a stacked z-filter media pack from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 6, is sometimes referred to herein as a "blocked" stacked media pack. The term "blocked" in this context, is an indication that the arrangement is formed to a rectangular block in which all faces are 90° relative to all adjoining wall faces. Alternate configurations are possible. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, media pack 201 will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. PCT WO 04/071616, published Aug. 26, 2004; and U.S. Pat. No. 7,282,075. Each of these four latter references is incorporated herein by reference, in it entirety. It is noted that the stacked arrangement shown in U.S. Pat. No. 7,282,075, is a slanted stacked arrangement.

III. Example Air Cleaners and Components

A. A First Example Air Cleaner Described in U.S. 61/003,215, FIGS. 7-21

Figure 7:
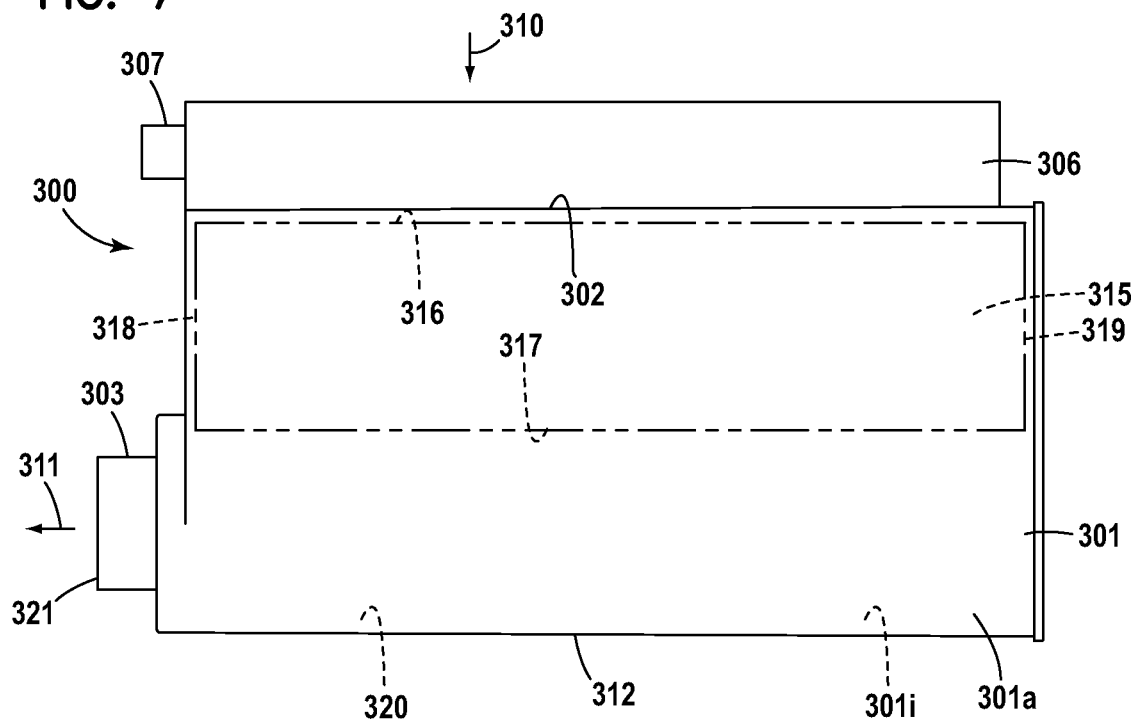
FIG. 7 is a schematic side elevational view of an air cleaner assembly including features according to the present disclosure.

Herein, in FIGS. 7-21, a first example air cleaner assembly and components described herein, and in U.S. 61/003, 215 are depicted schematically. Referring to FIG. 7, air cleaner assembly 300 is depicted in side elevational view. The air cleaner assembly 300 includes housing 301 having an inlet side 302 and outlet end 303.

Positioned over inlet side 302 is precleaner arrangement 306. The precleaner 306 can, for example, include a plurality of preseparator tubes such as cyclonic separator tubes therein, not depicted in FIG. 7. Such a precleaner would typically have a dust flow outlet therein, which either allows for gravity removal of dust separated by the precleaner 306, or attachment of a scavenge hose. An outlet 307 for a scavenge hose is indicated at one optional location.

Air to be filtered generally passes into air cleaner assembly 301 by first passage into (optional) precleaner 306 in the direction of arrow 310. After passage through the precleaner 306, the air enters the air cleaner housing 301, through inlet side 302. Within the housing 301 is positioned an air filter cartridge including a media pack comprising a stack of z-filter strips, generally in accord with previous descriptions. That is, each strip would typically comprise a fluted sheet secured to a facing sheet, with the strips arranged in a stack having appropriate sealing to ensure that air passing into one flow face must pass through the media before it passes through the opposite flow face. Principles discussed above in connection with FIGS. 1-6 can be used for this.

Referring to FIG. 7, a z-filter media pack 315 is depicted, schematically, in phantom lines positioned generally as oriented within an interior of housing 301. The media pack 315 has an inlet flow face 316 and an opposite outlet flow face 317. The media pack 315 has first and opposite sides 318, 319, extending between flow faces 316, 317. Media pack 315, then, can comprise a stack of strips of z-filter media, with flutes extending in a direction between the inlet flow face 316 and outlet flow face 317. As the air exits flow face 317, then, it will have been filtered by the z-filter media pack 315.

After exiting the media pack 315, the air, filtered, enters a portion of clean air region 320 and eventually leaves the cleaner housing 301 via an air cleaner housing outlet arrangement or outlet 321 at outlet end 303. In some instances, an optional safety element or secondary element is provided in region 320, through which the air must pass before it exits outlet 321. Filtered air exiting outlet 321 is generally indicated by arrow 311.

FIG. 7, again, is generally schematic. The figure is intended to provide an overall understanding of an orientation of a arrangement according to the present disclosure.

As it will be apparent from discussions below, media pack 315 is non-removably secured within a filter cartridge housing, discussed below. The air filter cartridge, comprising the combination of the media pack 315 and an air filter cartridge housing, is a service part, removably positioned within an interior 301i, of air cleaner housing 301.

It is noted that the air cleaner 300 is depicted in FIG. 7 in a vertical orientation, with inlet side 302 directed upwardly. An air cleaner using analogous principles could be differently, for example it could be oriented with an inlet end 302 directed toward a side rather than upwardly. Alternate orientations for the assembly 300 may be benefited by alternate locations for dust exit outlet 307 from the optional precleaner 306.

Figure 8:
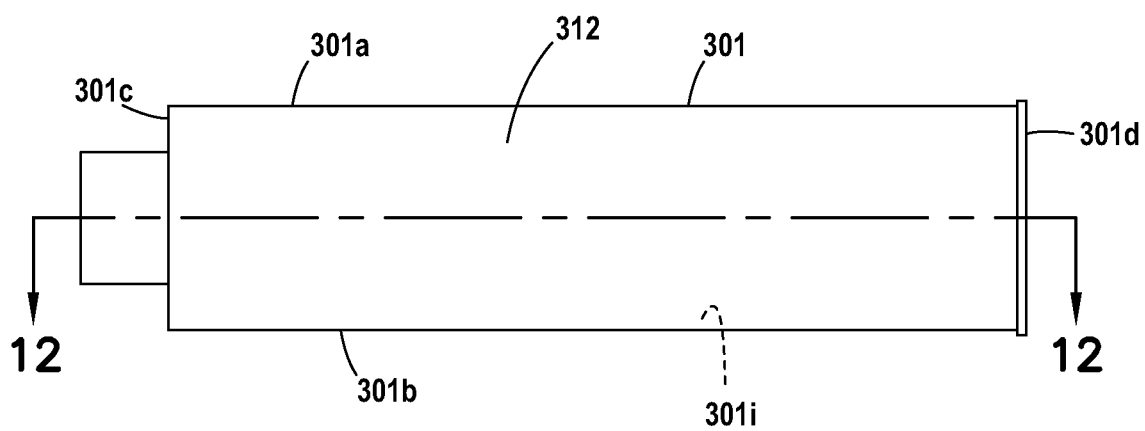
FIG. 8 is a schematic bottom plan view of the air cleaner assembly of FIG. 7.

Attention is directed to FIG. 8, a schematic, bottom plan view generally taken toward end 312 of housing 301, FIG. 7. FIG. 8 is provided in part to orient the cross-sectional view of FIG. 12, discussed below. Referring to FIG. 8, the housing 301 can be seen to have first and second opposite sides 301a, 301b, and first and second opposite ends 301c, 301d. As it will be apparent from discussions below, side 301d comprises a removable access cover, for service access to an interior 301i of housing 301.

Figure 9:
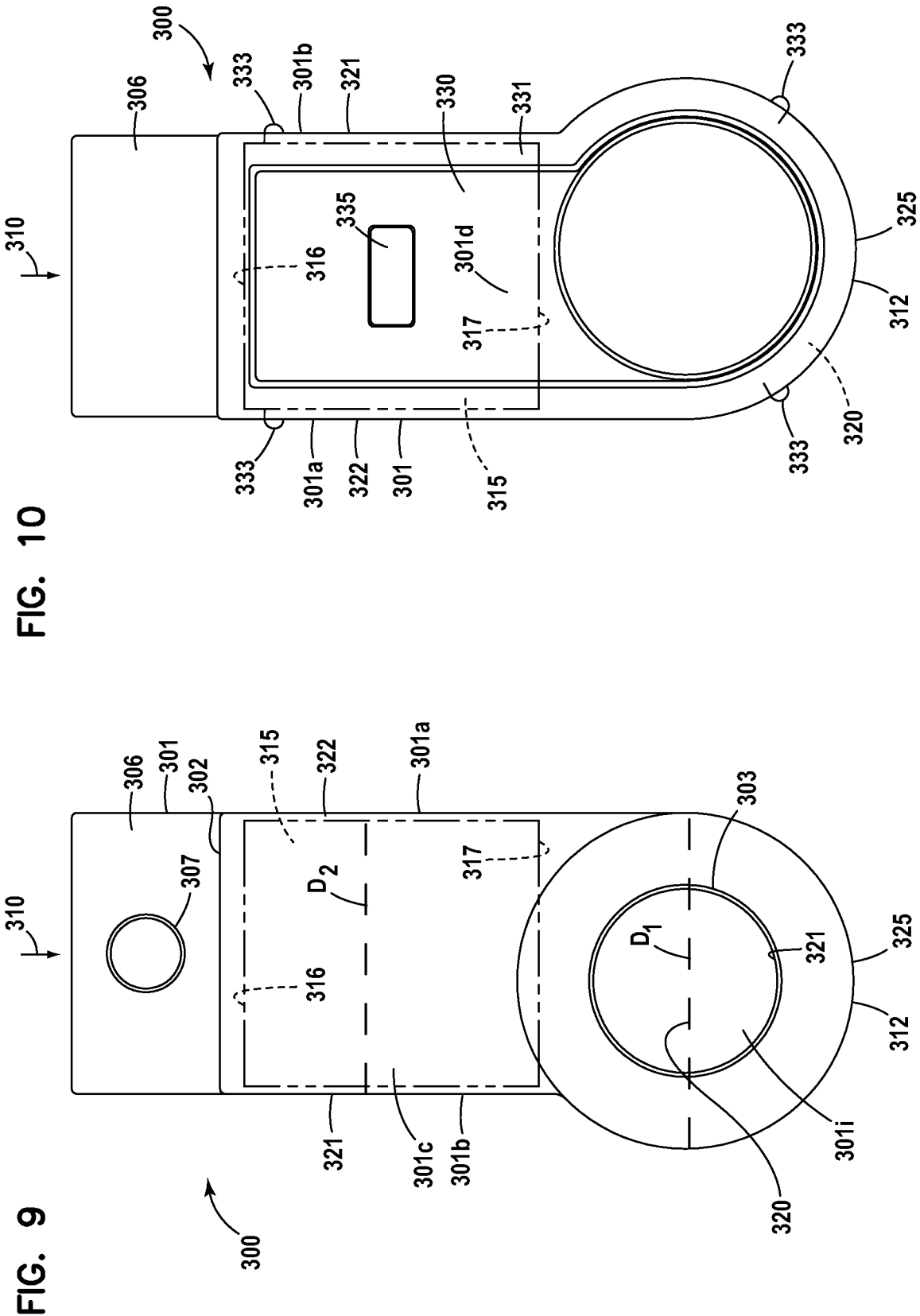
FIG. 9 is a schematic outlet and elevational view of the air cleaner assembly of FIG. 7.

Attention is now directed to FIG. 9. FIG. 9 is an outlet end elevational view generally taken in the direction of outlet end 303, FIG. 7. Referring to FIG. 9, air cleaner outlet 303 is viewable. Also viewable is precleaner 306 positioned over inlet 302 of housing 301. Internally positioned media pack 315, with inlet flow face 316 and opposite outlet flow face 317 is depicted in phantom lines.

Referring still to FIG. 9, it can be seen that the example air cleaner housing 301 generally includes first and second, opposite, side sections 301a, 301b with portions 321, 322, respectively, extending generally parallel to one another, in extension from inlet face 302 toward an air cleaner housing end 312 opposite inlet face 302. For the particular example housing 301 depicted, end 312 is a curved end 325 and has a larger dimension $D_1$ thereacross, than a distance $D_2$ between opposite side sections 321,322. In the example shown, curved end 325 is positioned with side section 322 engaging the curved region 325 generally tangentially. In the example depicted, however, side section 321 does not engage curved end 325 tangentially.

Referring to FIG. 9, it will be understood that clean air region 320, is generally positioned within curved, closed, region 325 of housing 301.

Figure 10:
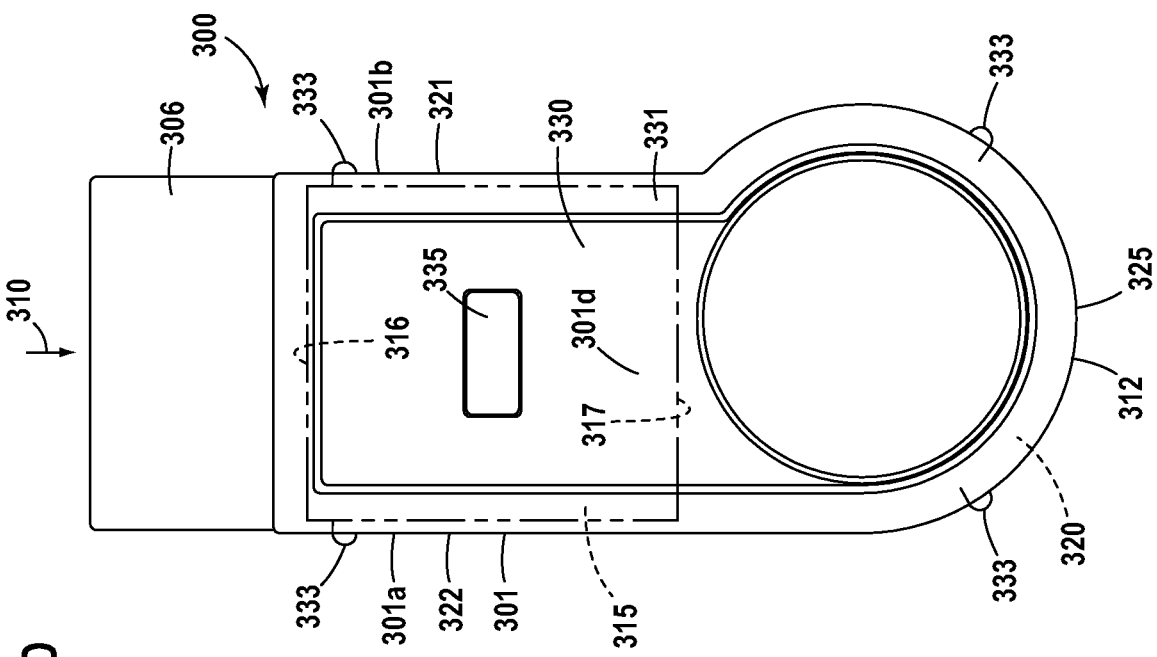
FIG. 10 is a schematic access end elevational view of the air cleaner assembly of FIG. 7; the view of FIG. 10 being toward an opposite end from that of FIG. 9.

Attention is now directed to FIG. 10. In FIG. 10, a side elevational view is provided taken in the general direction of side 301d, FIG. 8. Thus, the side view of FIG. 10 is an opposite side or end 301d from the end 301c viewable in FIG. 9. The end 301d viewable in FIG. 10 is generally referred to as an access end 330. The access end 330 includes a removable air cleaner housing access cover 331 secured thereover. An example method of securement for the access cover would be to use latches, indicated schematically at 333. An alternate, usable, approach to securement is discussed below in connection with the embodiment of FIGS. 22-31.

At 335, a projection region in access cover 331, toward the viewer, is depicted. An opposite side of projection 335 comprises a receiver region or handle recess, for receipt therein of an optional handle portion of a serviceable filter cartridge, as discussed below.

Figure 11:
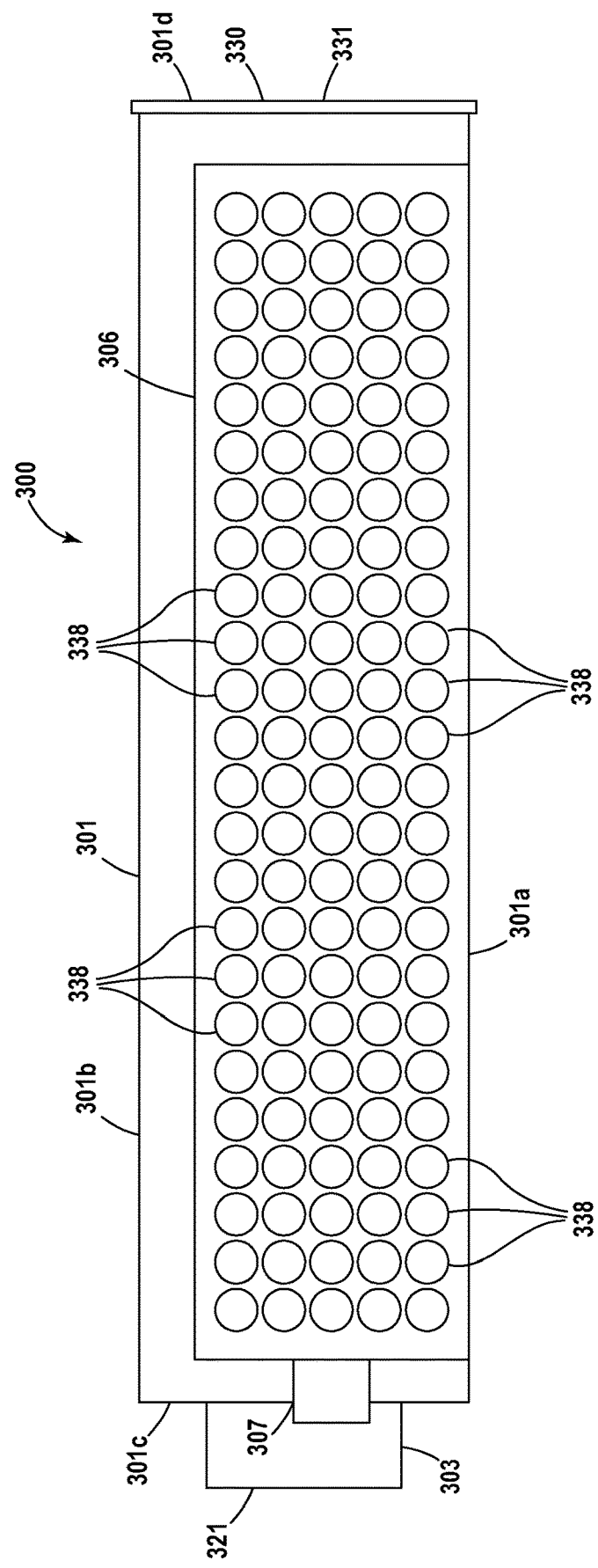
FIG. 11 is a schematic top plan view of the air cleaner assembly of FIG. 7.

In FIG. 11, a top plan view of air cleaner assembly 300 is depicted. The view of FIG. 11 is generally taken toward precleaner 306. Individual cyclonic separator tubes 338 are schematically represented. In operation, as air enters the cyclonic tubes 338 (FIG. 11), a cyclonic flow pattern in each is generated, with some dust being separated and removed through outlet 307. The remaining air is then directed into the air cleaner housing 301 for filtering, by passage through the media pack 315, previously referenced.

Figure 12:
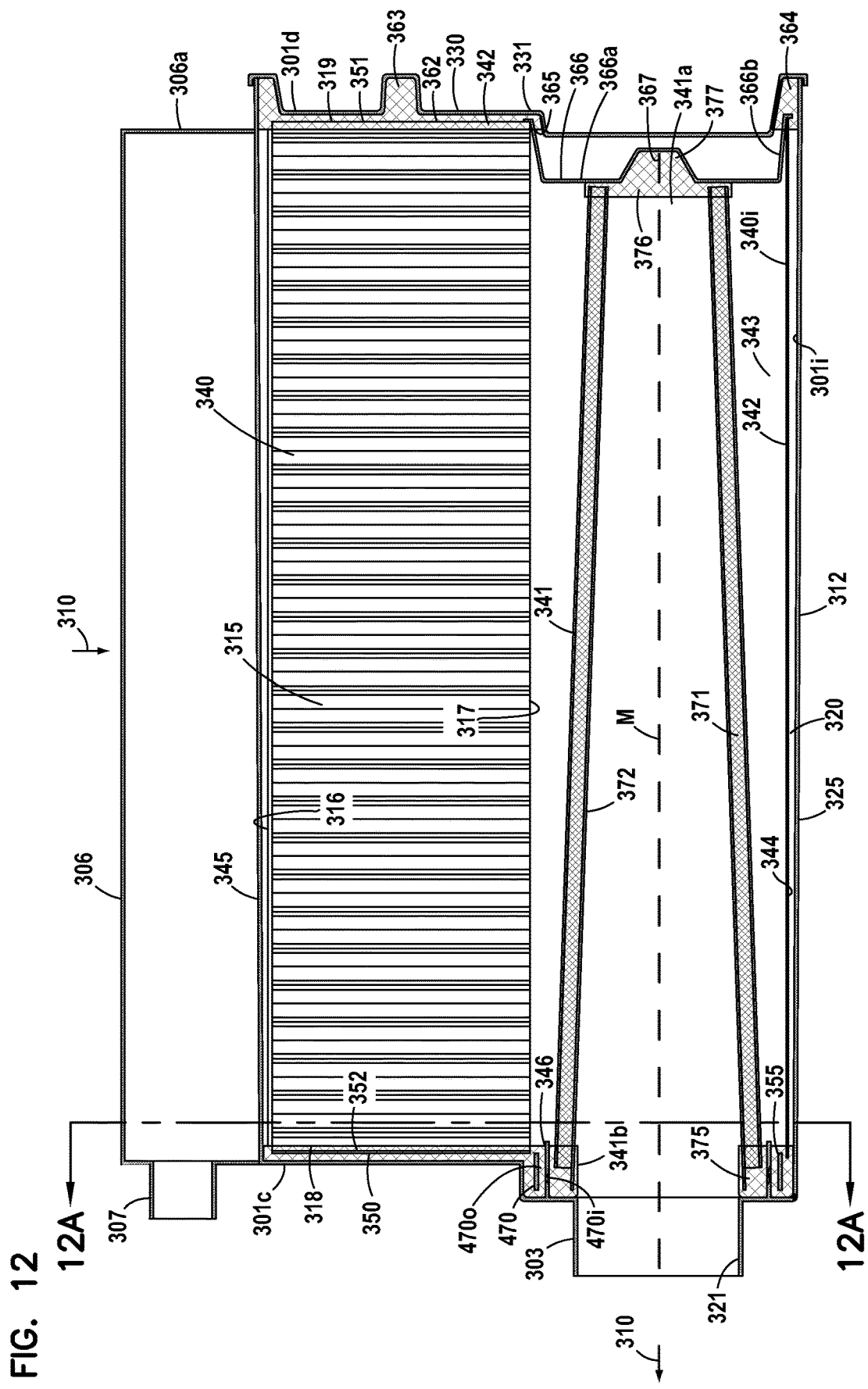
FIG. 12 is a schematic cross-sectional view taken along line 12-12, of FIG. 8.

Interior features of air cleaner assembly 300 can be understood by review of FIG. 12, a cross-sectional view taken generally along line 12-12, FIG. 8.

Referring to FIG. 12, it is noted that precleaner 306 is not depicted with separator tubes 338 therein, for convenience. All that is viewable in FIG. 12 is outer shell or housing 306a of the precleaner 306.

Still referring to FIG. 12, access cover 331 is removable from a remainder of housing 301, for service access to interior 301*i* of the housing 301. Within interior 301*i* are positioned a first or main filter cartridge 340 and an optional safety or secondary filter cartridge 341. The first or main filter cartridge 340 includes an air filter cartridge housing 342 with a media pack 315, having an inlet flow face 316 and an opposite outlet flow face 317, non-removably secured thereto. That is, the main filter cartridge 340, the media pack 315 is non-removably secured within a filter cartridge housing 342.

Although alternatives are possible, for the example assembly depicted, the filter cartridge housing 342 includes an inlet end or face 345 in alignment with the inlet flow face 316 of the media pack 315. By "in alignment" in this context, it is meant that for the example air flow entering filter cartridge housing 342 through inlet end 345 will enter inlet flow 316 of the media pack 315, without turning.

On the other hand, for the example depicted, filter cartridge housing 342 includes an outlet arrangement 346 in the housing 340, oriented such that air exiting the outlet flow face 317 of the cartridge 315 must turn, generally orthogonally to flow through the filter media pack 315 and thus to exit the air cleaner housing 301 though outlet 321. Thus, while the media pack 315 is "straight through", with respect to air flow therethrough; the filter cartridge 340 is not. Rather, in the example filter cartridge 340 is configured so that in passing from the inlet 345 to the outlet 346, after passage through the media pack 315, the air must turn to exit in a general direction orthogonal to flow into the inlet side 345.

Still referring to FIG. 12, in general terms, filter cartridge 340 includes a housing 342 defining an interior 343 in which the media pack 315 is positioned. More specifically, the example filter cartridge housing 342 is defined by a shell member 344 and first and second, opposite, side members 350, 351, respectively. The media pack 315 is non-removably secured within the shell member 344, and thus the filter cartridge housing 342, for example with an adhesive or sealant. The end members 350, 351, as discussed below, are mounted on opposite sides 318, 319 of the media pack 315, sealing and closing the sides 318, 319; and, also, are mounted over opposite sides or ends of the shell 344, as discussed below.

Attention is directed to side member 350. Side member 350 includes a first section 352 which includes a side 318 of the media pack 315 sealed thereby. Side member 350 further includes a section 355 having air flow outlet arrangement (aperture) 346 therein, for outlet flow from the cartridge 340. This is described, further, below, in connection with other figures.

End member 351 includes a section 362 which generally encloses: a side 319 of the media pack 315 opposite the side 318; and, a side of shell member 344. Projection 363, in end member 351 projects in a direction opposite end member 350 comprises an optional handle member, for manipulating cartridge 340. The handle member 363 can have a variety of shapes, and may in some instances include an aperture therethrough or an undercut, to facilitate gripping. For the particular example cartridge 340 depicted, handle 363 is a projection with no apertures therethrough and no undercuts therein.

Still referring to FIG. 12, side member 351 further includes peripheral portion or perimeter 364 discussed further below. Extending across region 365, and thus closing side member 351 is provided a projection arrangement 366. The projection arrangement 366 includes a portion 366*b*, closed by end 366*e*, projecting into interior cartridge 340, as discussed below. The projection arrangement 366 comprises a secondary filter cartridge support, oriented to engage and support an end of optional secondary cartridge 341, as discussed below. The example projection arrangement 366 depicted, includes an axially, outwardly, projecting central receiving access 367 therein, projecting generally away from outlet arrangement 346.

The projection 366 can comprise a preformed member, secured within side member 351, when a remainder of side member 351 is molded or formed, for example, when member 351 is molded-in-place. This too is discussed further below.

Referring to FIG. 12, downstream from first air filter cartridge 340 is provided optional secondary cartridge 341 including media 371, in the example surrounding an open filter interior 372. In general terms, the secondary or safety cartridge 341 is positioned over outlet 321 so that air exiting outlet flow face 317 of the media pack 315 must pass through the media 371 of the optional safety filter 341, before the air can exit outlet aperture 321.

For the particular example arrangement depicted, secondary or safety filter 341 has first, open, end 341*b*; and, second, closed, end 341*a*. The open end 341*b* allows for flow of filtered air from the secondary or safety cartridge 341, outwardly through air flow exit 321 in the air cleaner housing 301. The second closed end 341*a* generally does not permit passage of air therethrough.

For the particular example secondary or safety filter cartridge 341 depicted, the media 371 is provided in a generally conical shape tapering downwardly in extension from end 341*b* to end 341*a*. At the open end 341*b*, is positioned a seal arrangement 375, discussed below. The seal arrangement 375 is oriented to form a seal directed against a portion of housing 301. At end 341*a*, secondary filter cartridge 341 includes end cap 376 with an outward, axial, projection 377 therein, which is received, in a mating and supporting manner, within recess 367. Herein, the term "axial" when used in connection with projection 377, is generally meant to refer to a projection 377 oriented generally aligned with a central axis M through the secondary filter cartridge 341. The term "outward" in connection with the axial projection, is meant to refer to a direction of projection generally away from end member 341*b*.

Still referring to FIG. 12, air cleaner housing 301 includes inwardly directed flange 470. Flange 470 includes an outer surface 470*o* and a inner surface 470*i*. For the particular assembly 300 depicted in FIG. 12, seal member 346 of the filter cartridge housing 342 is configured to engage and seal to outer surface 470*o* of housing flange 470. Also, seal member 375, on secondary or safety filter cartridge 341, is configured to engage and seal against inner surface 470*i* of flange 470. In general, flange 470 can be characterized as sealing flange surrounding outlet 321.

Figure 12A:
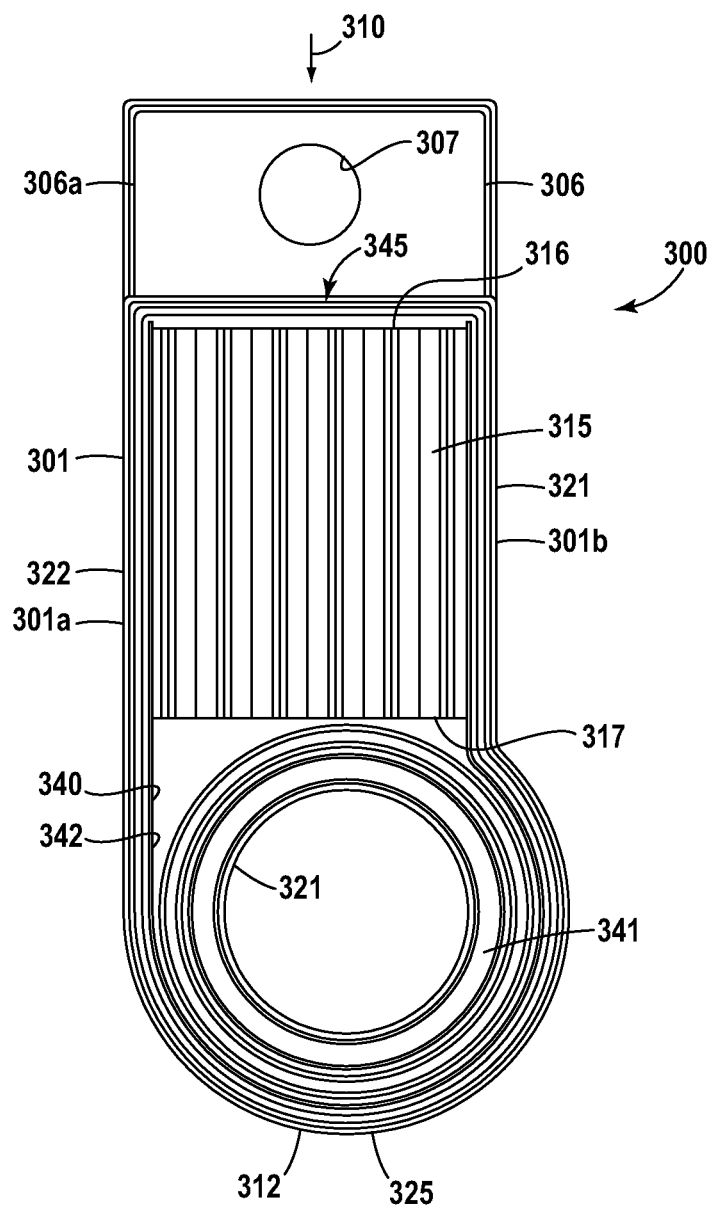
FIG. 12A is a schematic cross-sectional view taken generally along line 12A-12A, of FIG. 12.

Attention is now directed to FIG. 12A, a schematic, cross-sectional view taken along line 12A-12A, FIG. 12. Referring to FIG. 12A, with respect to precleaner 306, internal cyclonic separator tubes are not depicted, but rather merely outer shell 306*a* is depicted. Cartridge 340 is positioned with inlet flow face 345 directed upwardly. Also, media pack 315 is oriented with inlet face 316 directed upwardly, corresponding to (i.e. alignment with) inlet end 345 of cartridge 340. Outlet face 317 of the media pack 320 is shown directed downwardly, i.e. in a direction opposite inlet flow face 316. However, air filter cartridge 340, as discussed previously, does not include an outlet end opposite inlet end 345. Rather, the outlet arrangement for filter cartridge 340, as indicated in FIG. 12 at 346, is a side outlet, and not an outlet in a direction opposite the inlet 345.

Figure 13:
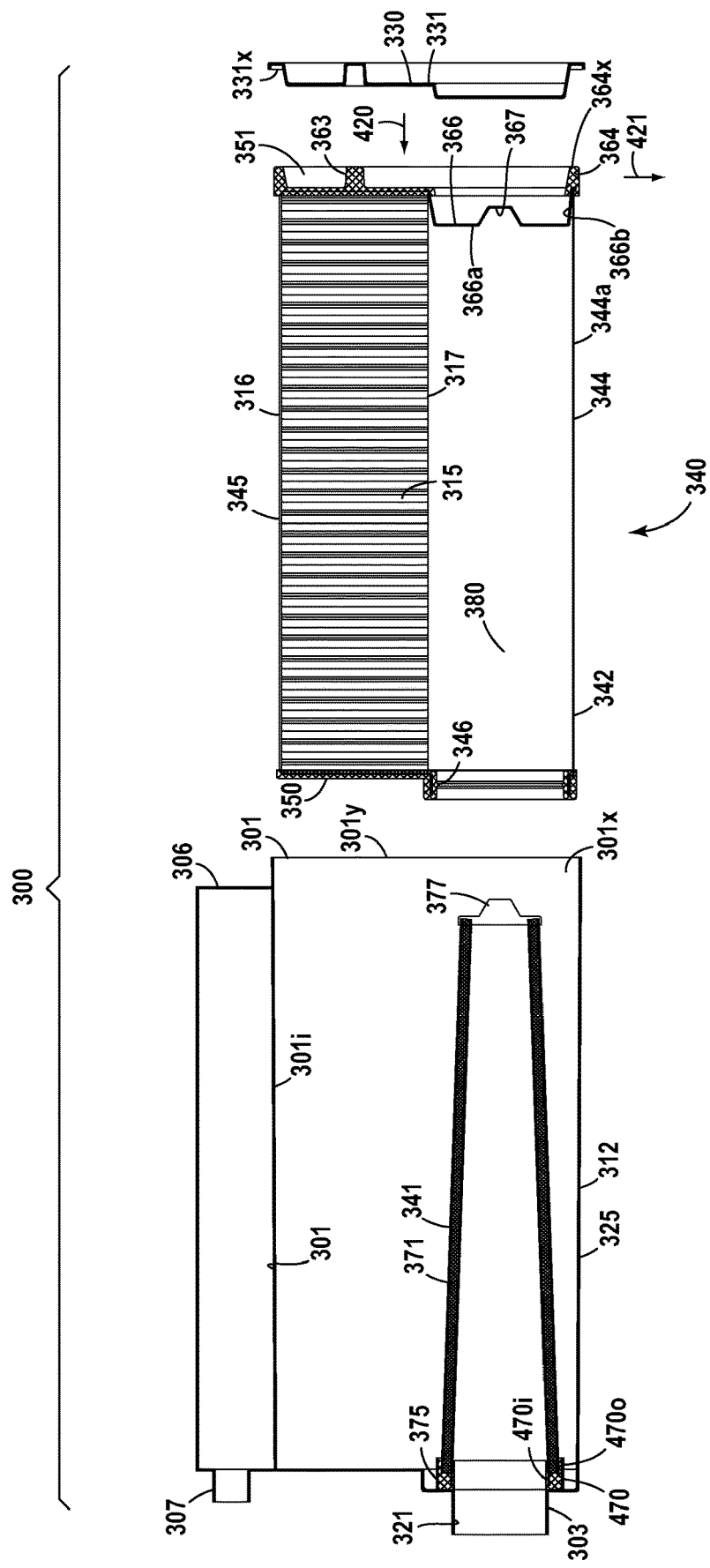
FIG. 13 is a schematic exploded perspective view of the air cleaner assembly of FIG. 7, taken as a cross-section analogous to FIG. 12.

Attention is now directed to FIG. 13, an exploded, schematic view of assembly 300. Here, cartridge 340 including media pack 315 is shown separated from interior 301*i* of housing 300, with safety cartridge 341 retained in place. Referring to cartridge 340, in can be seen that the cartridge inlet flow end 345 and the media pack inlet flow face 316 are generally aligned, in overlap. However, outlet flow face 317 of the media pack 320 is not aligned in overlap with outlet 346 from the cartridge 340. That is, the inlet 345 of the cartridge 340 does not face the outlet 346, in alignment. Rather, the cartridge 340 includes an internal clean air volume 380 therein. The clean air volume 380 is sized to receive, projecting therein, media pack 371 of secondary filter cartridge 341, during installation.

In general terms, and still referring to FIG. 13, the air filter cartridge 340 comprises an air filter cartridge housing 342 with a media pack 315 non-removably secured therein, as previously characterized. Cartridge 340 is further configured to define clean air volume 380 adjacent the outlet flow face 317 of the media pack 320. The space 380 is defined, generally, between the media pack outlet flow face 317 and closed end 344 of shell 342. The space 380 occupies a portion of region 320, FIG. 7, when the cartridge 340 is installed.

Opposite closed end 344, the shell 342 defines open end 345.

Referring to FIG. 13, it can be seen that air which enters flow face 316 (i.e. inlet face 345 of cartridge 340) is filtered by the media pack 315, and exits face 317. The air is then directed by shell 342 to outlet 346. When the cartridge 340 is installed within the housing 301, the outlet 346 is aligned with outlet 321, for air flow passage from the air cleaner assembly 300. Region 380 within shell 342 is sized sufficiently large to receive the optional safety element 341 therein, when used.

Still referring to FIG. 13, it is noted that end member 351 defines perimeter seal member 364. The perimeter seal member 364 is sized to seal against end region 301*x* of housing interior 301*i*, adjacent housing service access opening 301*y*, when the cartridge 340 is operably installed. Compression against surface 301*x* by housing peripheral perimeter seal 364, to accomplish sealing, is provided when access cover 331 is pressed against end member 351 in the general direction of arrow 420, FIG. 13. That is, as perimeter flange 331*x* on the access cover 331 presses against end 364*x* of region 364, member 364 is pressed inwardly, and expands or bulges radially outwardly, in the direction of arrow 421. This will be sufficient to form the seal at region 301*x*, as described.

Figure 14:
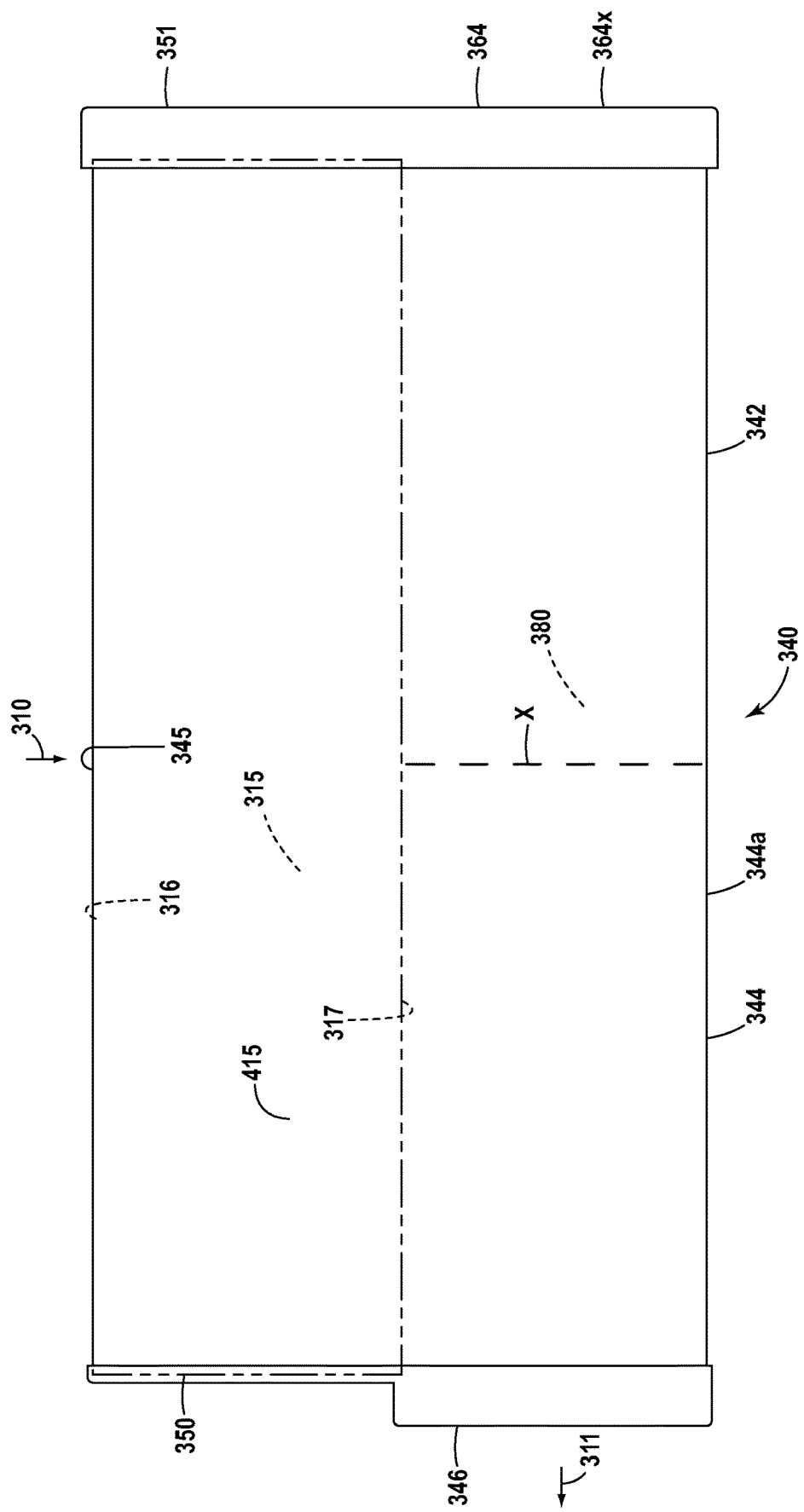
FIG. 14 is a schematic side elevational view of a filter cartridge component of the assembly of FIGS. 7-13.

Attention is now directed to FIG. 14. FIG. 14 is a view of cartridge 340, the orientation being generally analogous to the orientation of the housing 301, FIG. 7. Thus, inlet flow end 345 is shown, with arrow 310 indicating inlet flow. Interiorly received media pack 315 is depicted in phantom lines. Downstream clean air region 380 is depicted interiorly of the filter cartridge housing 342. Exit air flow from the filter cartridge 340, and thus filter cartridge housing 342, is indicated generally at 311.

The cartridge 340 is a service part or replacement part. That is, when the air cleaner 300 is used, in due course media pack 315 will become sufficiently loaded with dust to warrant refurbishment or replacement. This is done by replacing the entire cartridge 340, for the example shown.

Still referring to FIG. 14, the cartridge 340 comprises filter cartridge housing 342 defined by shell member 344 and first and second end members 350, 351.

The shell 344 generally wraps around portion of media pack 315 and region 380, but does not extend across inlet end 345, in the view depicted. Thus, the shell 344 includes closed end section 344*a* extending across, and spaced from, outlet end 317 of the media pack 315. The shell 344 further includes a first side 415 toward the viewer in FIG. 14, and an opposite second side section 416 away from the viewer in FIG. 14. The opposite side section 416 is viewable in FIG. 15.

Figure 15:
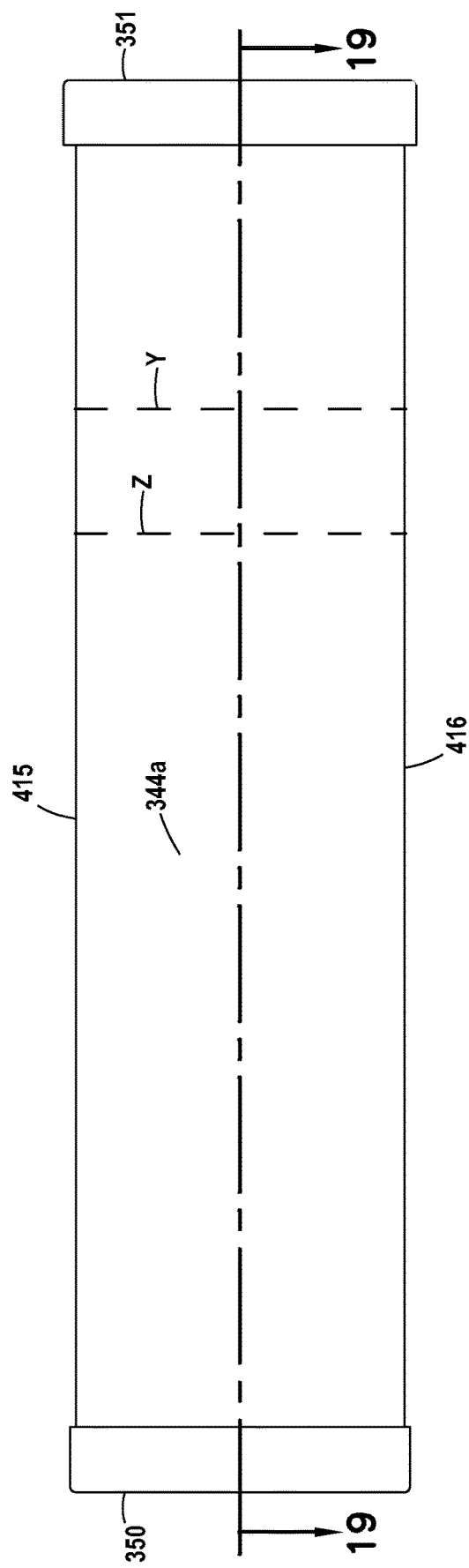
FIG. 15 is a schematic bottom plan view of the filter cartridge of FIG. 14.

Referring to FIG. 15, the view is taken toward closed end section 344*a* of shell 344. Here, opposite sides 415, 416 are indicated.

Figure 16:
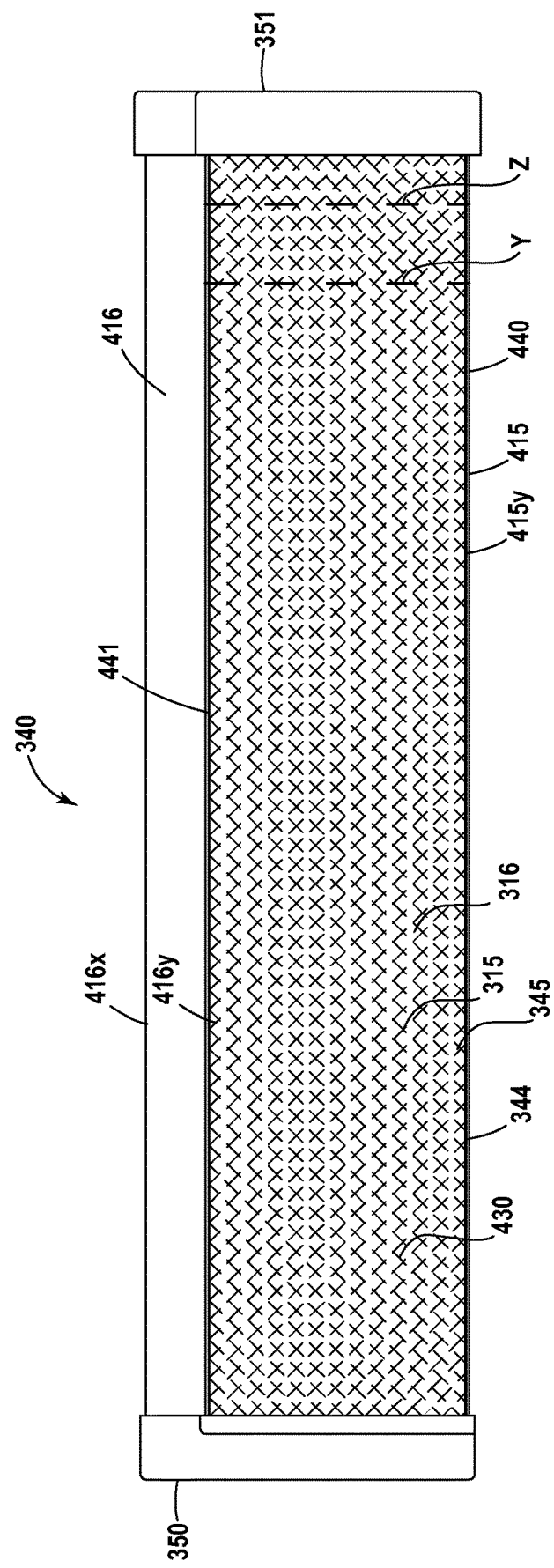
FIG. 16 is a schematic top plan view of the filter cartridge of FIG. 14.

Attention is now directed to FIG. 16, a top plan view of cartridge 340. Here, the media pack 315 is viewable, exposed an inlet end 345 of the cartridge 340. Thus, in FIG. 16, inlet end 316 of the media pack 315 is viewable. The depiction is schematic, and there is no specific effort made to depict individual inlet flutes and outlet flutes of the media pack 320.

It is noted that the cartridge 340 may include a screen extending across cartridge face 345, and media pack face 316; a screen being represented by phantom lines 430. Further, or alternatively, a grid arrangement or other arrangement can be provided at this location.

Still referring to FIG. 16, opposite end members 350, 351 are viewable. It is noted that shell side 416 includes an outer or bottom, projection section 416*x* therein, discussed below.

The media pack 315 will typically be secured to opposite end edges 415*y*, 416*y*, of shell 344, along regions 440, 441 by an adhesive, for example a hot melt sealant or other sealant material. This would ensure against leakage of unfiltered air between the media pack 315 and the shell member 344.

Figure 17:
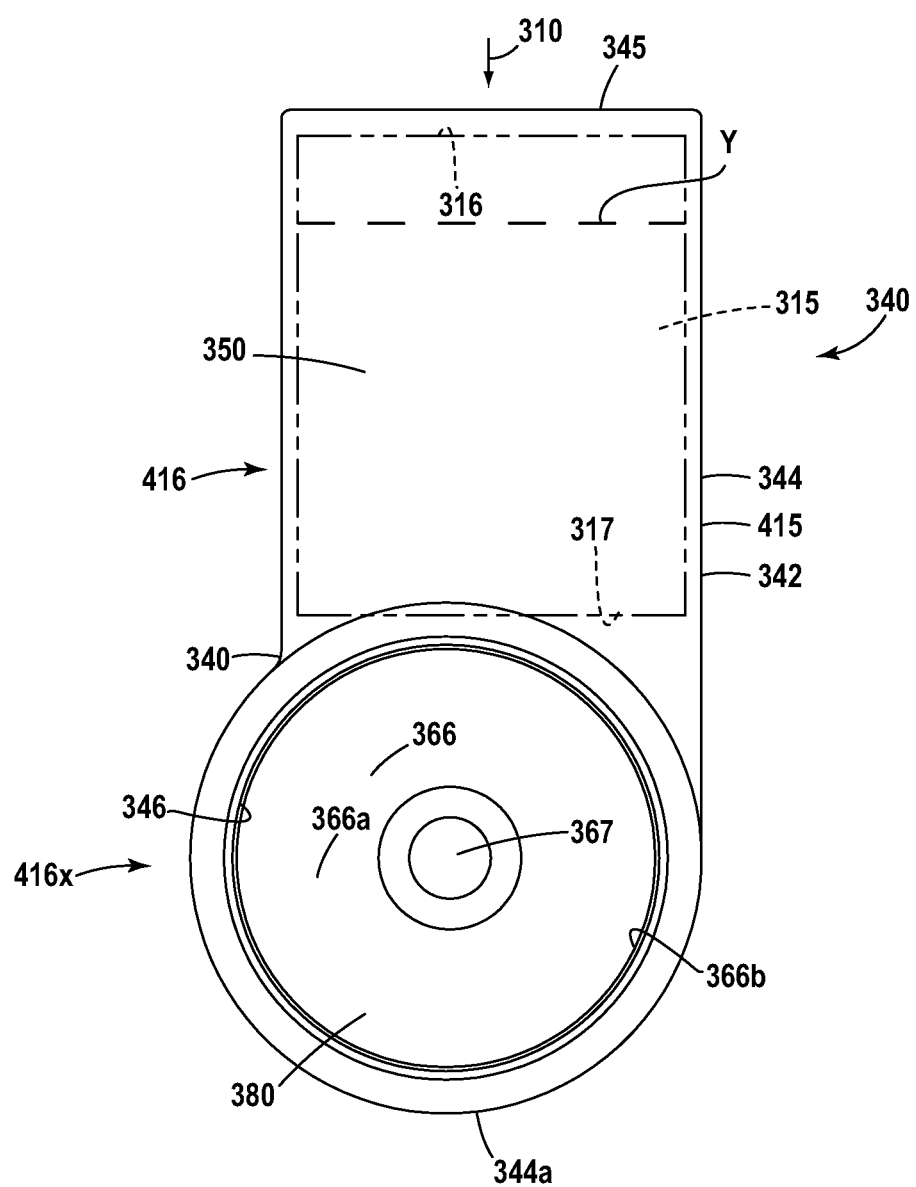
FIG. 17 is a schematic outlet end elevational view of the filter cartridge of FIG. 14.

Attention is now directed to FIG. 17. FIG. 17 is a elevational view of first or main filter cartridge 340 taken generally toward end member 350. The view is generally through outlet aperture 345, to region 380. At 366*a*, the inner, closed surface of projection 366, FIG. 12, is shown. At 367, the axially, outwardly, projecting recess, FIG. 12, is shown.

The media pack is indicated in FIG. 17 at 315, by phantom lines. With respect to the view of FIG. 17, air to be filtered would generally enter the cartridge 340 with the direction of arrow 310 and would exit the cartridge through aperture 316, toward the viewer.

Figure 18:
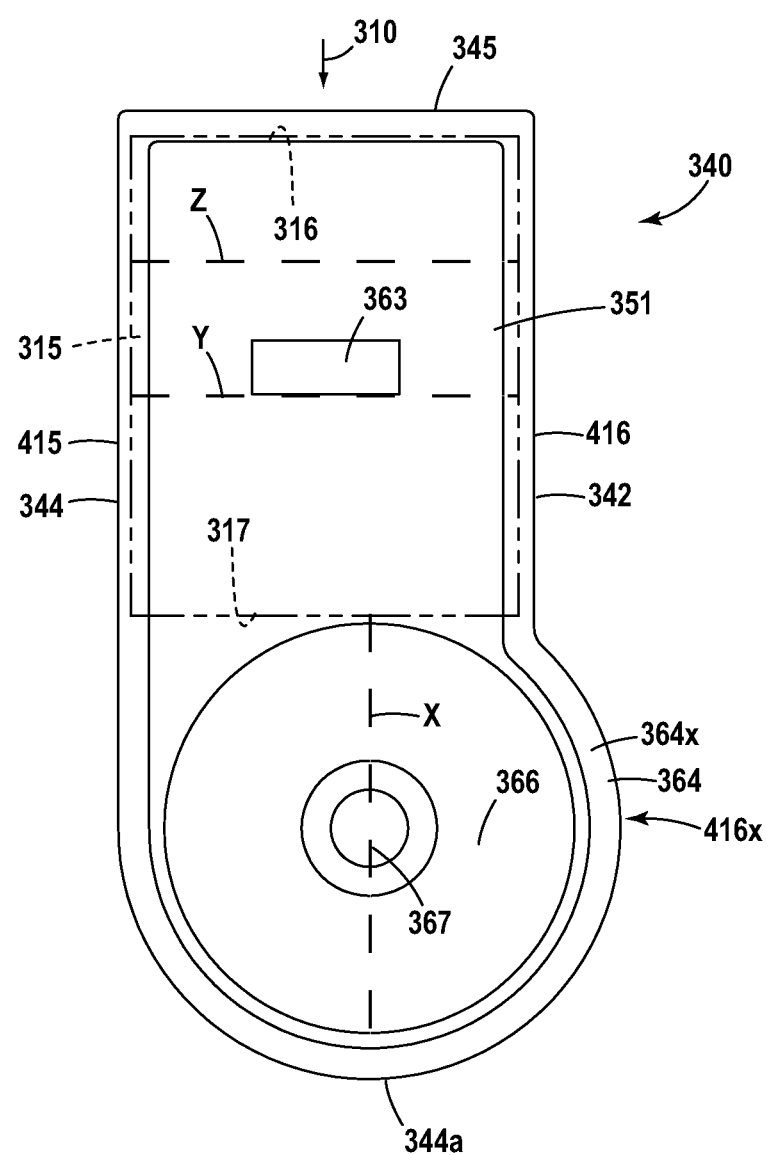
FIG. 18 is a schematic end elevational view taken toward an opposite end of the cartridge of FIG. 14, from the view of FIG. 17.

Attention is now directed to FIG. 18, a side elevational view of cartridge 340, taken generally toward end member 351. Perimeter seal member 364 is shown extending completely around a perimeter of end member 351. Handle 363 is viewable, projecting toward the viewer. At 366, the secondary filter cartridge support is viewable, with recess 367 projecting toward the viewer.

Referring to each of FIGS. 17 and 18, it can be seen that from the side, or in cross-section, the cartridge 340, in particular housing 342 and shell 344, generally has a "d" or "b" shape, depending on which side is viewed. Herein, this shape will sometimes be referred to herein as a "d/b shape," or by similar terms. The term "d/b shape" is intended to be applicable, even though the actual shape, in FIGS. 17 and 18, includes a curved portion 344*a* depending downwardly of an end of a straight side portion. In spite of this, the overall shape is reminiscent of a "d" or "b," and thus the terms are used.

More specifically, and referring to FIG. 18, the shell section 415 engages curved or round rounded end section 344*a*, tangentially. This is not the case for shell section 416, which provides for outwardly curved section 416*x* in transition toward curved end section 344*a*. This provides the referenced "b" and/or "d" shape to the shell 402. Such a shape is useful, in general, when the dimension Y of the media pack 315, in FIG. 18 is smaller than the dimension X needed across region 380 to accommodate optional safety cartridge 341, FIG. 13, or to provide to a desirable sized outlet 346, FIG. 17.

In general terms, herein, the dimension X references a dimension between outlet end 317 of the media pack 315, and a closed end 344*a* of the shell 344 (or filter cartridge housing 342). The dimension Y is a general dimension through the media pack 315 in a direction both: orthogonal to a general air flow direction therethrough; and, through individual layers or strips of media within the media pack.

Herein, the dimension "Z" is used to refer a distance between opposite sides 415, 416 of the filter cartridge 342 (or shell 344). Typically, the dimension Z will be approximately the same as the dimension Y.

In a typical application, the dimension X is at least 50% of each of the dimensions Y and Z; usually at least 75% and often at least 90%. In many instances, the dimension X will equal to or greater than the dimensions Y and Z; thus, often the ratios X/Y or X/Z will be at least 1.0, usually each ratio (X/Y and X/Z) is within the range of 1.0-1.7, inclusive; typically 1.0-1.5, inclusive.

Figure 19:
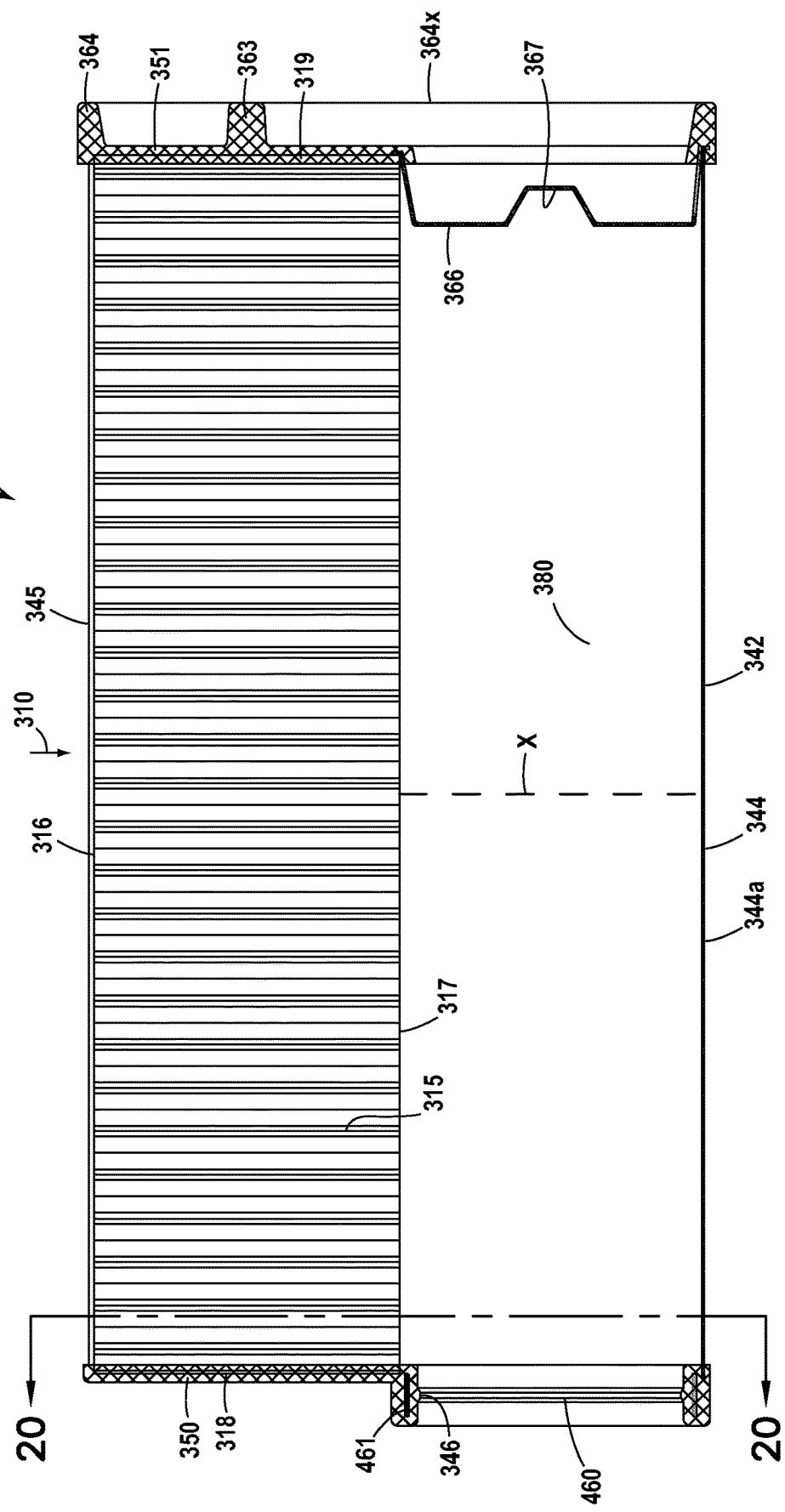
FIG. 19 is a schematic cross-sectional view to the filter cartridge of FIG. 14, taken in the general orientation corresponding to the cross-sectional view of FIG. 12 and generally along line 19-19, FIG. 15.

Attention is now directed to FIG. 19, a sectional view of cartridge 340, taken generally along line 19-19, FIG. 15. The cross-sectional view of cartridge 340, FIG. 19, is generally analogous to the cross-sectional view of FIG. 12.

In FIG. 19, then, internally secured media pack 315, with inlet face 316 and outlet face 317 is viewable, secured within the filter cartridge housing 342. The inlet face 316 is shown aligned with inlet face 345 of the cartridge 340. Clean air region 380 is viewable, defined under shell 344 in particular by shell end section 344*a*. Opposite end pieces 350, 351 are shown molded-in-place. End piece 350 defines aperture 346, in seal arrangement 460. The seal arrangement 460 is supported by seal support ring 461, to form an inwardly directed radial seal. This seal is sized and configured to form a seal to, and around, an outer surface 470*o* of flange 470 in the housing, FIG. 12.

Still referring to FIG. 19, end piece 351 is closed, with: outer seal perimeter 364, handle 363 and projection 366, with recess 367 projecting axially away from outlet 346.

Figure 20:
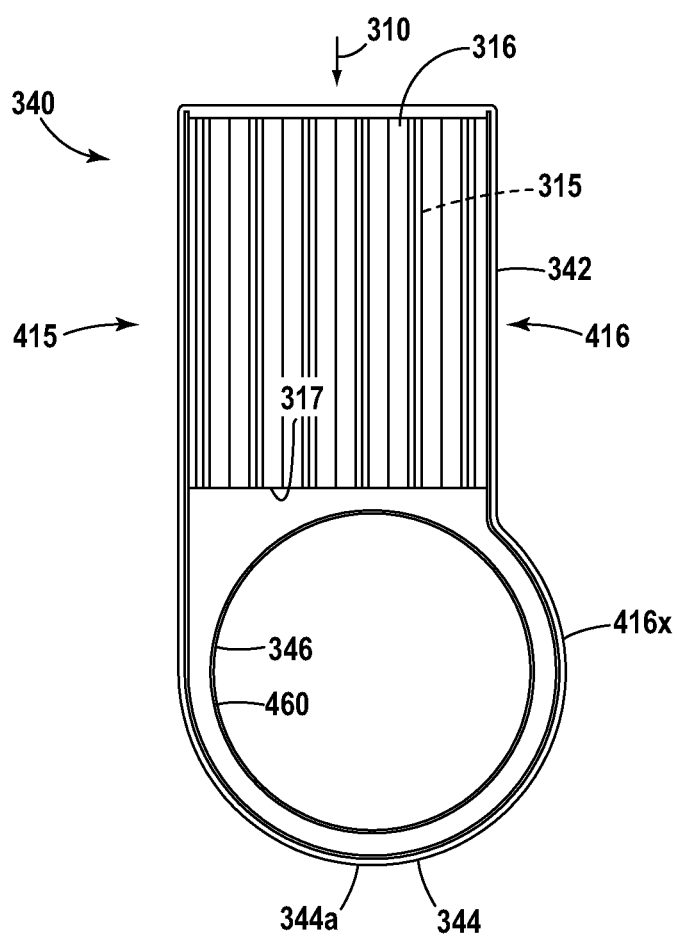
FIG. 20 is a schematic cross-sectional view taken generally along line 20-20, of FIG. 19.

Attention is now directed to FIG. 20, a schematic, cross-sectional view taken generally in the direction of line 20-20, FIG. 19. Here, the cross-sectional view is taken through the housing 342, and thus sections 415, 416 can be directly examined, as well projection 416*x* adjacent end section 344*a*, of shell 344.

Figure 21:
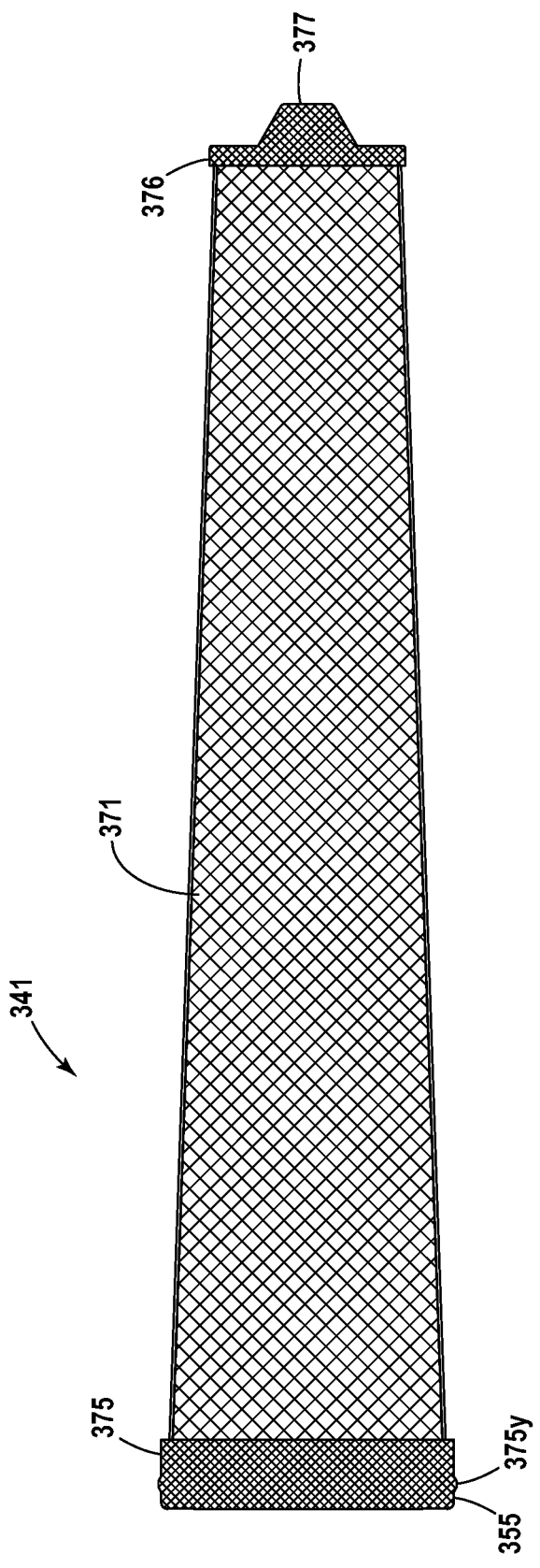
FIG. 21 is a schematic side elevational view of a safety or secondary filter cartridge usable in the air cleaner assembly of FIGS. 7-13.

In FIG. 21, an enlarged, side elevational view of safety cartridge 341, FIG. 12 is provided. The cartridge 341, FIG. 21, includes media 341 extending between end pieces 375, 376. End piece 375 includes an outer surface 375*y* with seal region 355 thereon, which will form a seal when pushed into an interior surface of flange 470, FIG. 12. End region 376 includes projection 377 thereon, which is sized to be engaged by, and supported by, support 366 in cartridge 350.

B. A Second Example Embodiment from U.S. 61/003,215, FIGS. 22-31

Figure 22:
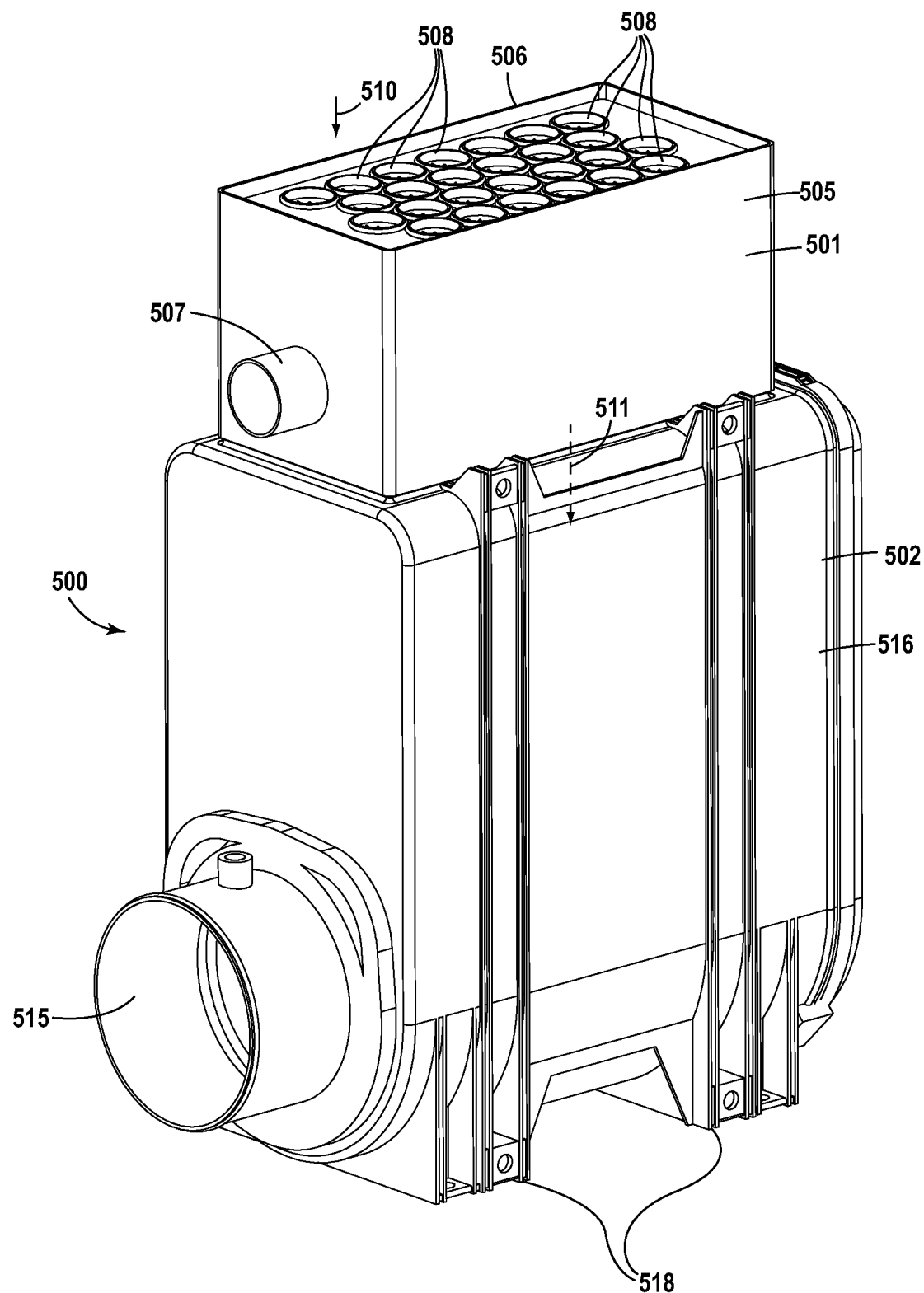
FIG. 22 is a schematic, top, outlet end perspective view of a second embodiment of an air cleaner assembly according to U.S. 61/003,215.

The reference 500, FIG. 22, depicts a second embodiment of an air cleaner assembly according to the present disclosure. The air cleaner assembly 500 includes a pre-cleaner 501 and a main air cleaner assembly 502.

In FIG. 22, the air cleaner assembly 500 is depicted in an orientation as would be typical for use. However it is noted in the principles described could be applied with an air cleaner assembly in a different orientation, for example on its side.

Referring to FIG. 22, the pre-cleaner 501 includes a housing 505 defining an inlet end 506, and a dust ejector outlet 507. The dust ejector outlet 507 in the example depicted is not oriented directed downwardly, and thus would typically be attached to a vacuum dust scavenge system for drawing collected dust out of the pre-cleaner assembly 501.

Still referring to FIG. 22, the pre-cleaner 501 includes a plurality of cyclonic separator tubes 508. The tubes may be as conventional for use in pre-cleaner assemblies. Air would typically enter the assembly 500 in the direction of arrow 510. This would direct the air into inlet end 506 of the pre-cleaner 501. In particular the air would enter the cyclonic tubes 508, and the pre-cleaner 501. Cyclonic tubes 508 would separate out a portion of the dust, which would exit pre-cleaner 501 through outlet 507. The air, after passage through the optional pre-cleaner, would then move into the main air cleaner assembly 502 in the general direction of arrow 511. Within the main air cleaner assembly 502, the air is passed through a main filter cartridge, with filtering. Air is then optionally passed through a secondary or safety filter cartridge. The filtered air is generally directed outwardly from the main air cleaner assembly 502 through outlet 515.

In general terms, the main air cleaner assembly 502 includes a housing 516. For the examples shown, the housing 516 is provided with a mounting pad arrangement 518, by which the air cleaner assembly 500 could be mounted in a vehicle or other equipment.

Still referring to FIG. 22, the view oriented is generally a top (inlet) and an outlet side, as a perspective view.

Figure 23:
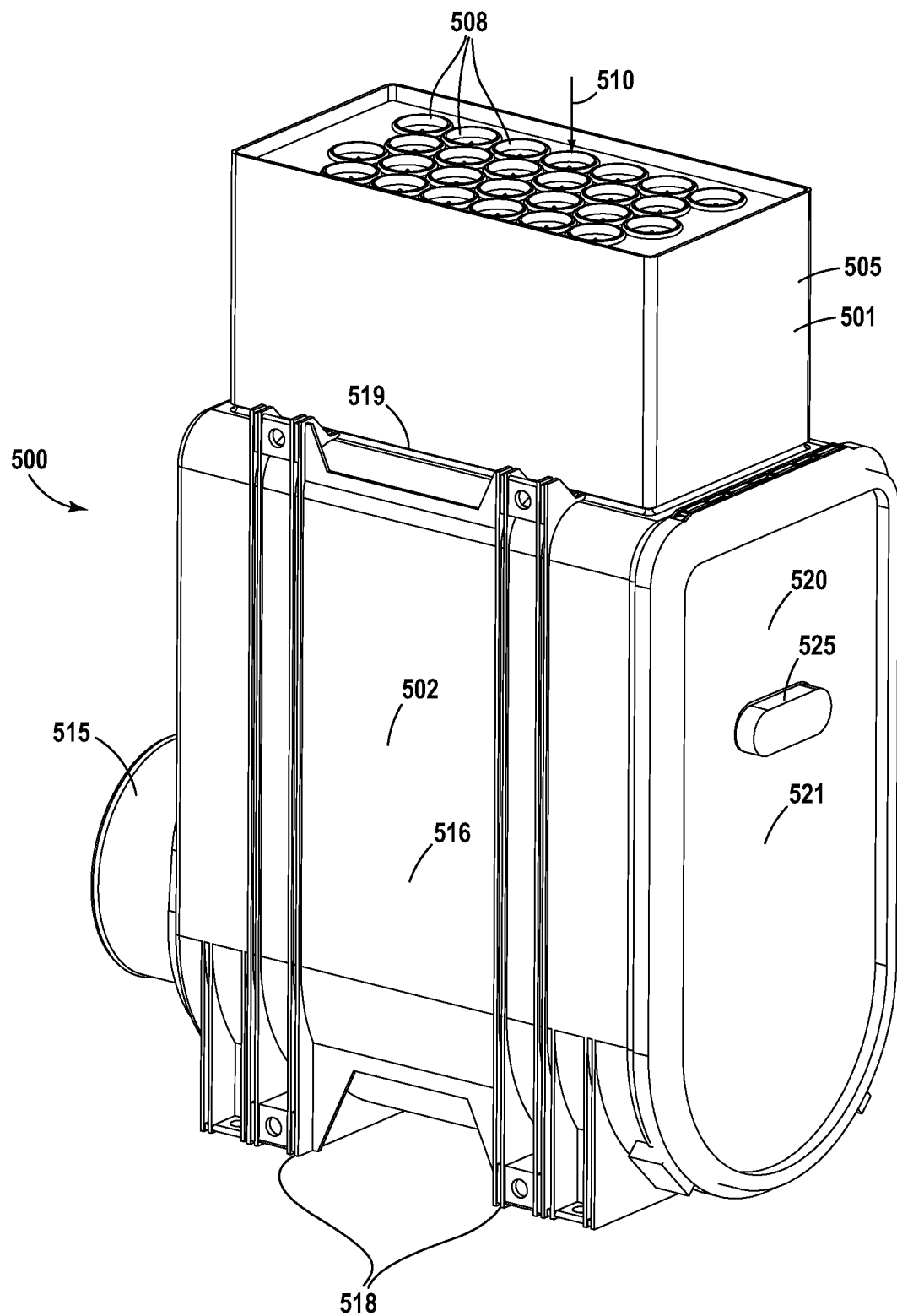
FIG. 23 is a schematic, top, access cover end perspective view of the air cleaner assembly of FIG. 22.

Attention is now directed to FIG. 23, a second top perspective view of the assembly 500. Here the view is taken toward a side 520 opposite the outlet 515. In particular, the view is taken toward side 520 which includes a removable service or access cover 521 thereon.

Thus, access cover 521 is removable to allow service access to an internally received filter cartridge.

The access cover 521 is shown with a handle receiver 525 therein. The handle receiver 525 includes a recess on the inside surface of the access cover 520, for receiving, projecting therein, a handle member of a internally received filter cartridge, in use.

Figure 24:
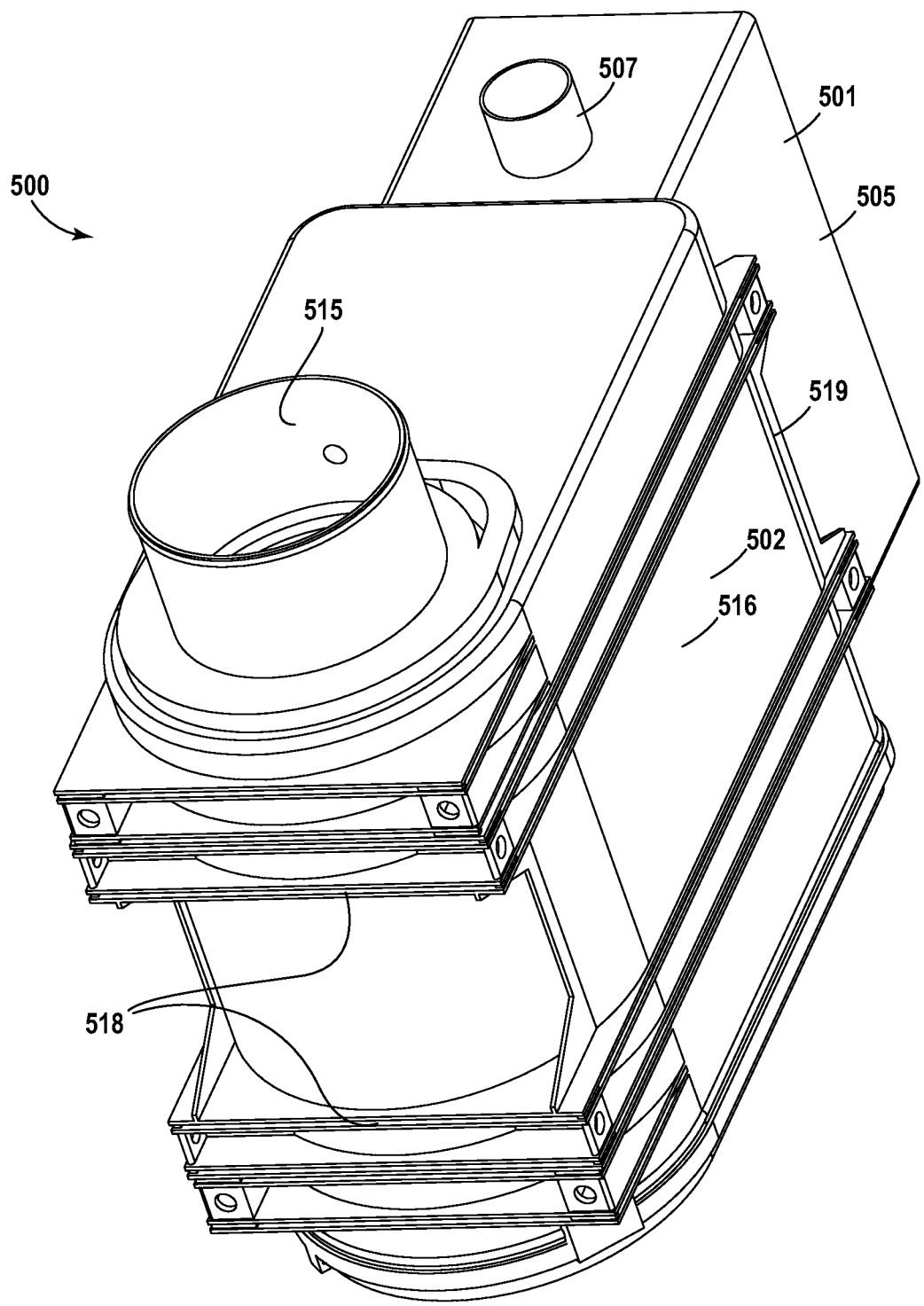
FIG. 24 is a schematic, bottom, outlet end perspective view of the air cleaner assembly of FIG. 22.

Attention is now directed to FIG. 24, a bottom plan view of assembly 500. Again, pre-cleaner 501 is viewable mounted on main air cleaner 502, and in particular on an inlet end 519 of the housing 516. Outlet 515 is viewable, for filtered air exit from the air cleaner assembly 500.

Figure 25:
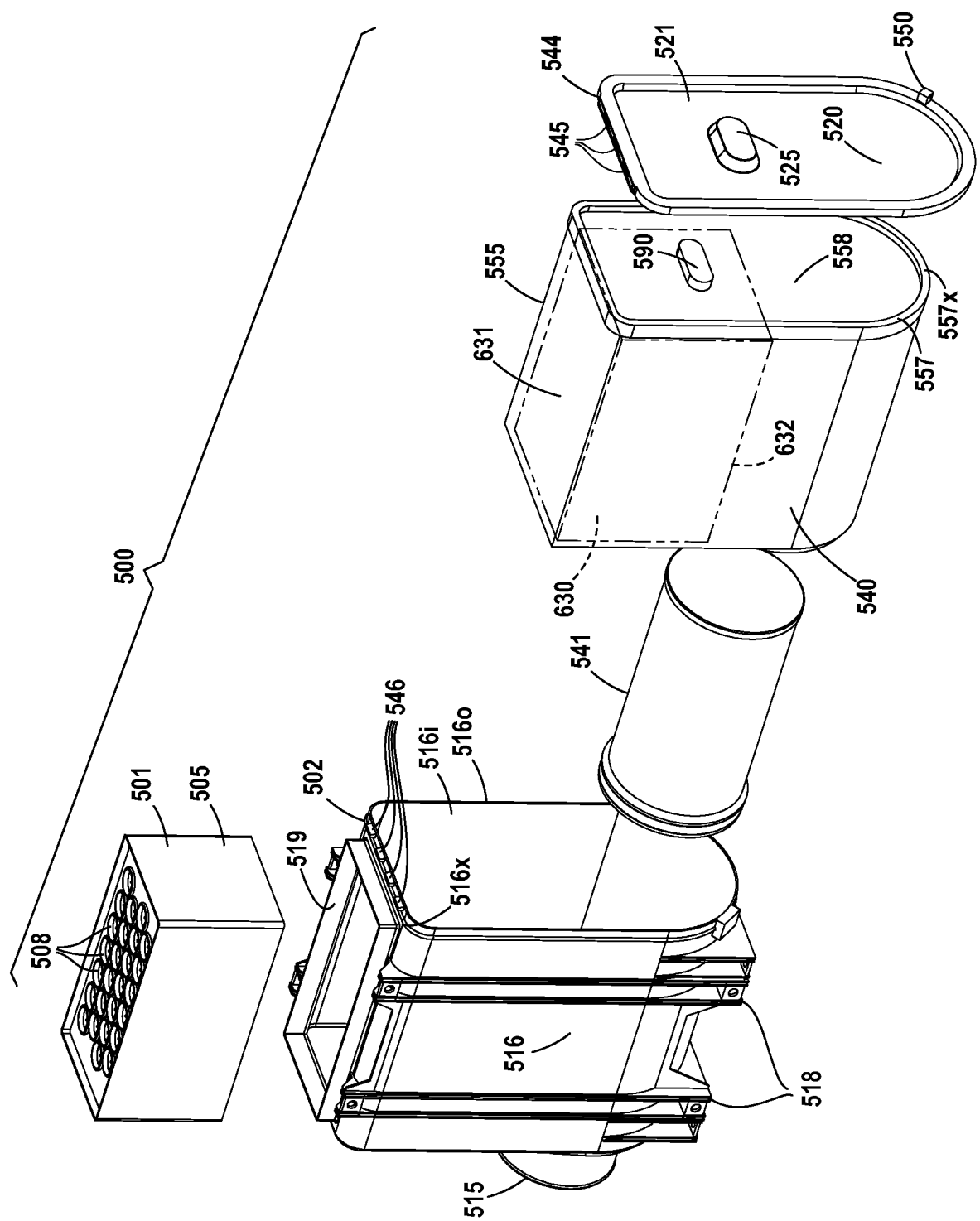
FIG. 25 is a schematic, exploded, top, access cover perspective view of the air cleaner assembly of FIG. 22.

Attention is now directed to FIG. 25, exploded perspective view of the air cleaner assembly 500, FIGS. 22-24. The view of FIG. 25 is generally analogous in orientation, to the view of FIG. 23. It can be seen that pre-cleaner 501 comprises a shell 505 generally mountable over inlet 519 of housing 516. It is noted that for the particular housing 516 depicted, the inlet 519 is oriented so that air flow therethrough, is generally orthogonal the outlet flow through outlet 515.

Referring to FIG. 25, air cleaner housing 516 generally defines interior 516*i*, in which is received at least a main filter cartridge assembly 540, and in some instances an optional safety cartridge assembly 541, through access opening 516o. For the particular assembly depicted, access cover 521 is shown.

The access cover 521 is shown with an upper end 544 having a plurality of apertures 545 therethrough. The apertures 545 are aligned to position over the projections 546, along upper edge 516x housing 516. Thus, the access cover 521 can be hung by the engagement between projections 546 and receivers 544. Latching closed can then be accomplished with latch member 550.

Main filter cartridge 540 is a service part, i.e., cartridge 540 is configured to be removed from assembly 500 and be replaced, or be refurbished, in due course. In particular, the main filter cartridge 540 includes a filter media therein, which would become loaded with contaminant, in time. Sufficiently loaded, the cartridge 540 is removed and is either refurbished or is replaced. Typically it is replaced with a new, but analogous, filter cartridge 540.

Still referring to FIG. 25, in general, main filter cartridge 540 includes a media pack therein, indicated generally at 630 having an inlet flow face 631 and an opposite outlet flow face 632. The media pack 630 may be, in general, analogous to media pack 515, as previously discussed.

Referring still to FIG. 25, the cartridge 540 includes an inlet end 555. The inlet end 555 is a side of cartridge 540 into which inlet air is directed, for filtering. Positioned within cartridge 540, to receive inlet air through inlet 555 is the filter media pack 630, discussed below. The media pack would typically be permanently (i.e. non-removably) secured within an outer main filter cartridge housing 600 of cartridge 540, discussed below.

Still referring to FIG. 25, the main filter cartridge 540 includes a perimeter housing seal member 557 around a closed side 558 thereof, positioned to seal against interior 516i the housing 516, when installed, adjacent air cleaner access opening 516o. Compression of the access cover 521 against edge 557x of the seal member 557 will facilitate this. This is discussed further below.

Figure 26:
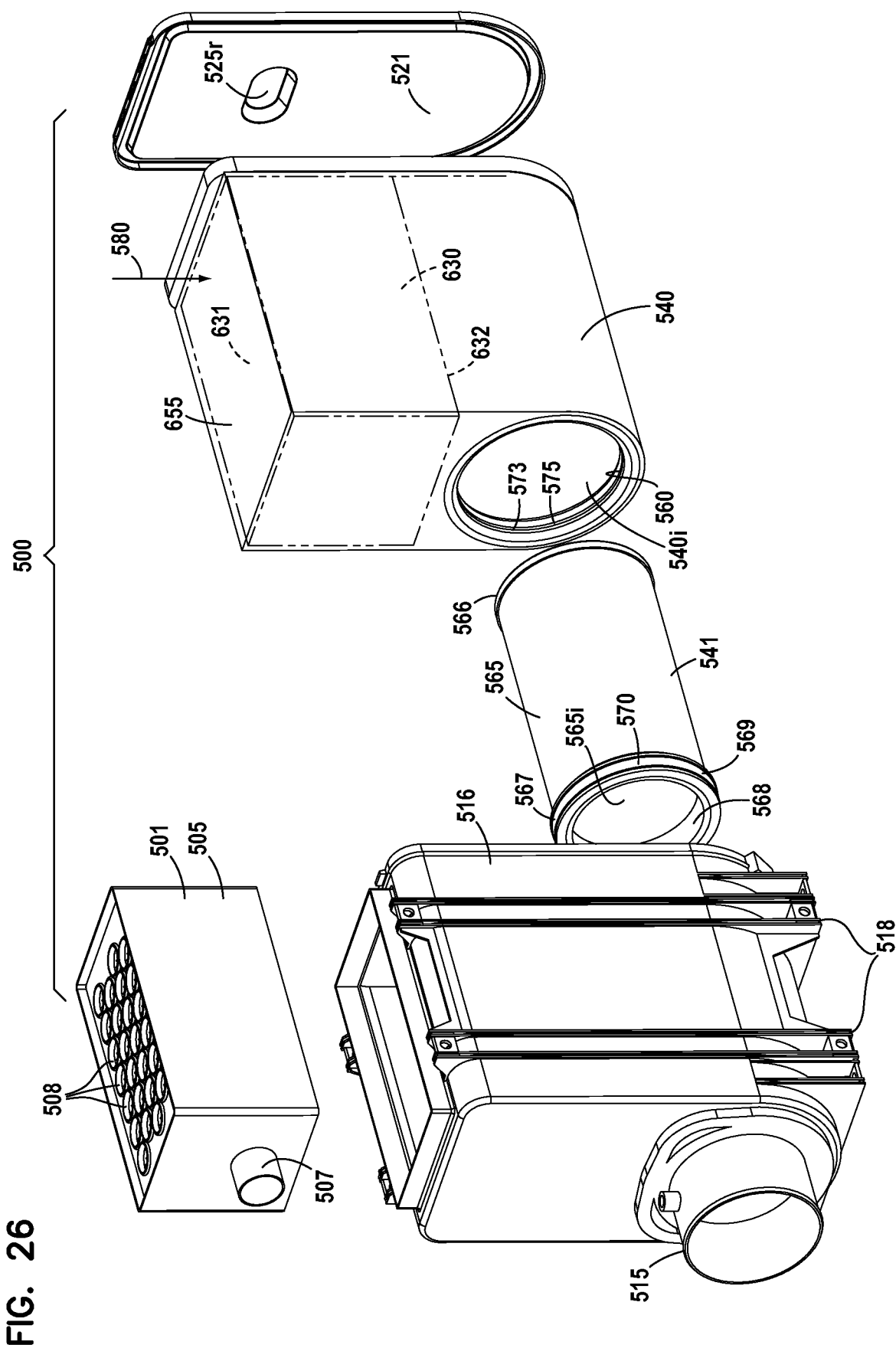
FIG. 26 is a schematic, exploded, top, outlet end perspective view of the air cleaner assembly of FIG. 22.

Attention is now directed to FIG. 26, a second top perspective exploded view of the assembly 500, in this instance the orientation generally corresponding to that of FIG. 22. FIG. 26, cartridge 540 is viewable with inlet end 555. Also, outlet 560 for filtered air from filter cartridge 540 is depicted. It can be seen that within the example filter cartridge 540 the air enters through end 555 and exits through a second location 560 generally orthogonal to the entrance. This is discussed further below.

Also viewable in FIG. 26, is optional secondary or safety cartridge 541 comprising media 565 extending between opposite end caps 566, 567. In the example depicted, end cap 566 is closed, i.e. it includes no aperture therethrough. End cap 567, however, is open and defines an opening 568 therethrough, in gas flow communication with an interior 565i surrounded by media 565. The end cap 567 includes an outer perimeter 569 configured to form a housing seal arrangement 570, positioned to engage a portion of the housing 516 and seal there against, in use, as discussed below.

Analogously and as discussed below, aperture 560 in the main filter cartridge 540 is an interior surface 573 configured to define a housing seal 575. The seal 575 is configured to engage and seal against portion of the housing 516, in use.

In a typical operation, air will enter filter cartridge 540 in the general direction of arrow 580. Within the cartridge 540, the air will pass through, and be filtered by a media pack 630 using media of the type previously discussed, and generally as shown and discussed below. Filtered air will then exit the main filter element 540 through the aperture 560. When the main cartridge 540 is installed within the housing 516, and when optional cartridge 541 is present, the cartridge 541 will generally project into an interior 540i of the main cartridge 540 at a location downstream from media pack 630. When this is the case, before the air exits aperture 560, it passes through media 565 into open interior 565i. Then, as the air passes outwardly through aperture 560 it also passes through aperture 568, to leave housing 516 through outlet 515.

Still referring to FIG. 26, recess 525r defined by projection 525, FIG. 23, is viewable. The recess 525r is sized and shaped to receive projecting therein a filter cartridge handle member 590, not viewable in FIG. 26. The handle member 590 is viewable in FIG. 25.

Figure 27:
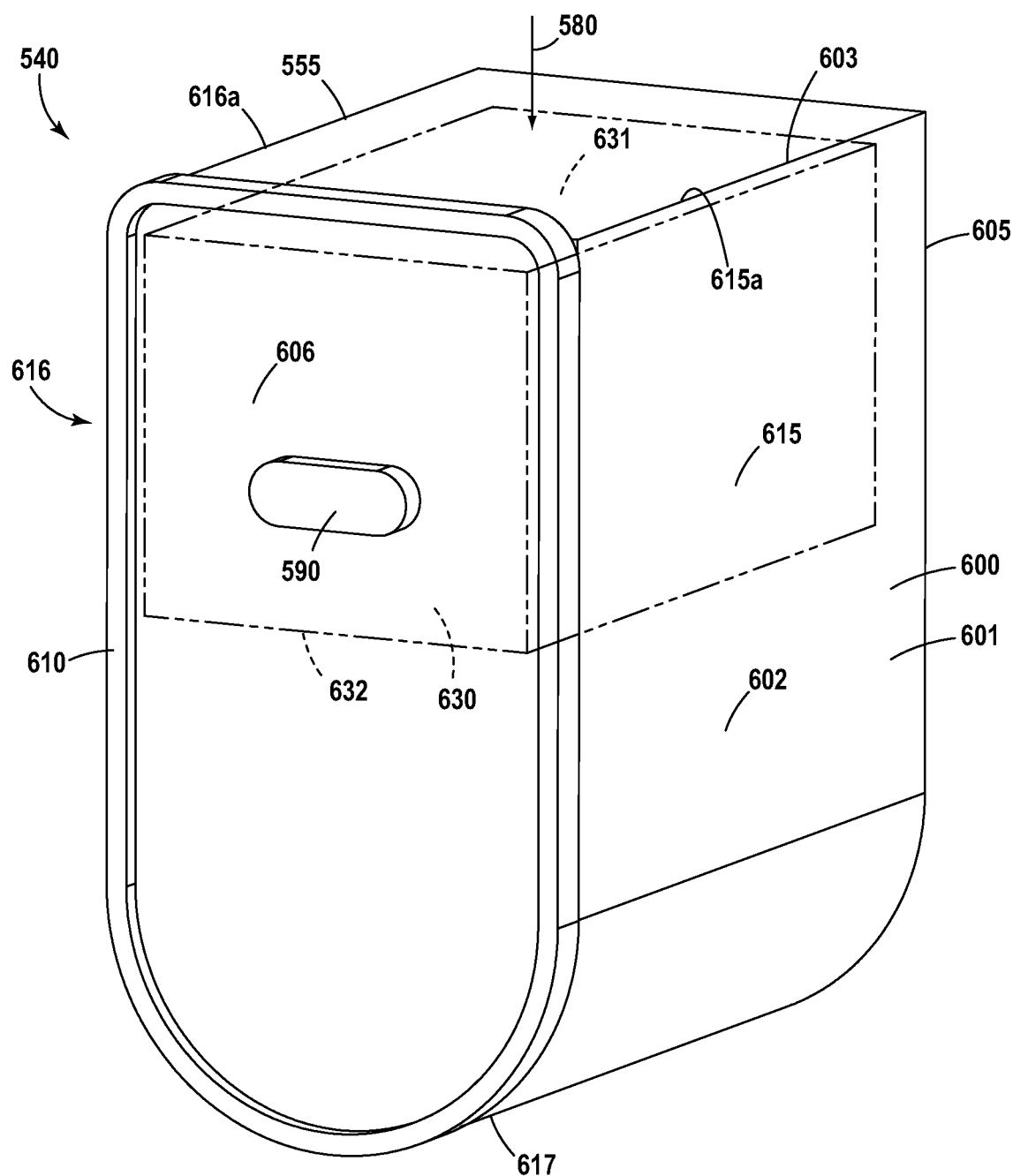
FIG. 27 is a schematic, top, closed end perspective view of a filter cartridge usable in the air cleaner assembly of FIGS. 22-26.

Attention is now directed to FIG. 27. In FIG. 27, cartridge 540 is viewable. The cartridge 540 generally comprises a main filter cartridge housing 600 having a sidewall 601 defined by a shell 602. Shell 602 defines an open end 603 corresponding to open end 555 of cartridge 540 and to inlet face 631 of media pack 630. Housing 600 includes first and second end members 605, 606. In FIG. 27, end member 606 can be viewed as having optional handle member 550 thereon. End member 606 also includes peripheral housing seal member 610 thereon.

The shell 602 generally has first and second, opposite, sides 615, 616 and a closed end section 617. In FIG. 27, media pack 630 is schematically depicted within housing 600, i.e. shell 602. The media pack 630 is depicted within an inlet flow face 631 and an opposite outlet flow face 632. Typically, the media pack 630 will be adhesively secured, and typically sealed, to opposite side sections 615, 616 of shell 602, along edges 615a, 616a, respectively. Thus, the media pack 630 is typically non-removably secured within filter cartridge housing 600.

Figure 28:
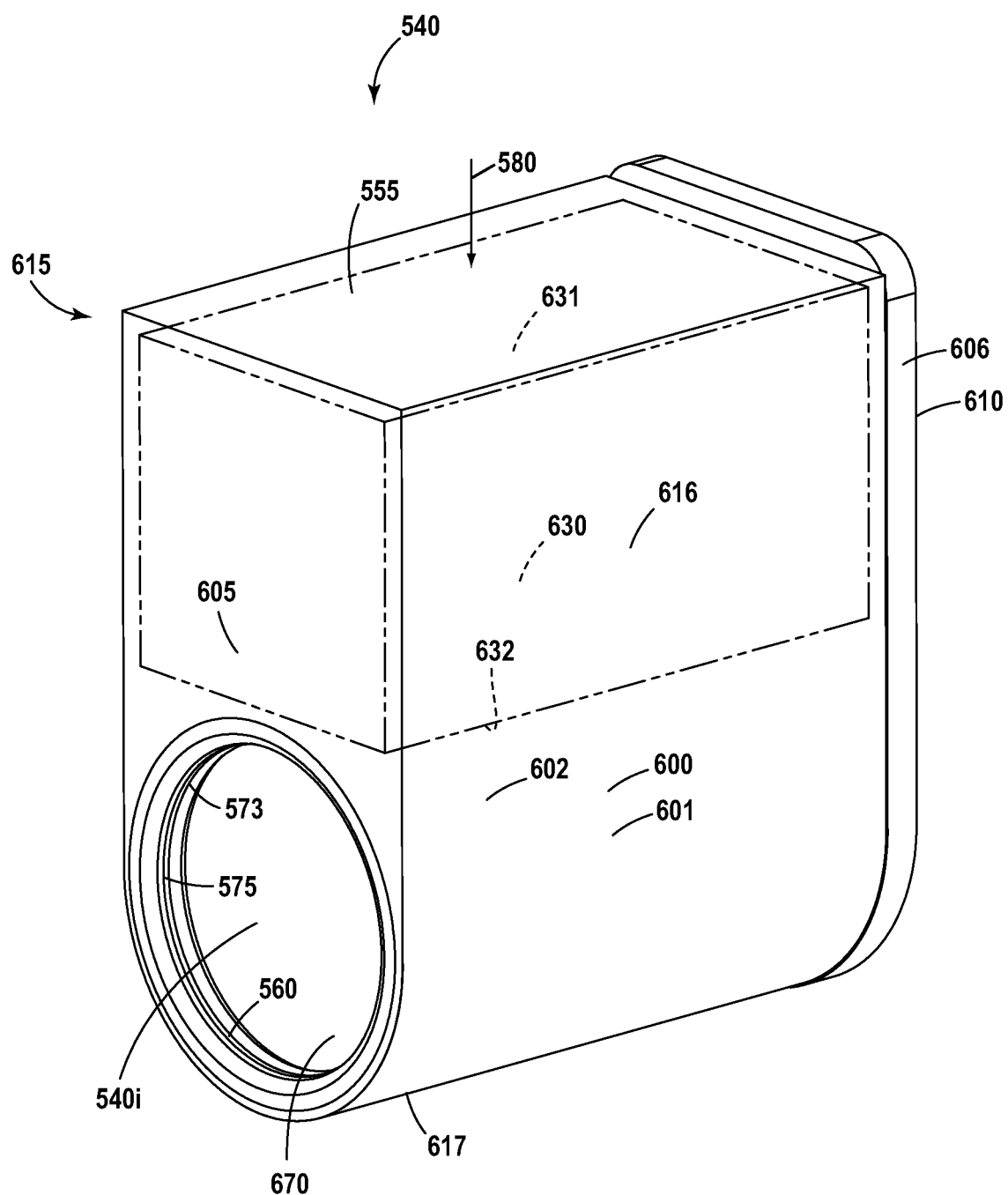
FIG. 28 is a schematic, top, outlet end perspective view of the filter cartridge of FIG. 27.

Attention is now directed to FIG. 28. Here cartridge 540 is again viewable, the view being taken generally toward end 605 of housing 600. The end 605 can be a molded-in-place member. The end 605 can comprise, for example, a molded-in-place foamed polyurethane member.

Referring to FIG. 28, end 605 is viewed as having therein, aperture 560 defining interior surface 573 with housing seal arrangement 575 thereon. Interior 540i of main cartridge 540 is designated. At region 670, a clean air region within interior 540i is designated. The clean air region 670 is generally oriented between inlet flow face 632 of media 630, and shell 602, in particular closed end 617 of shell 602.

Figure 29:
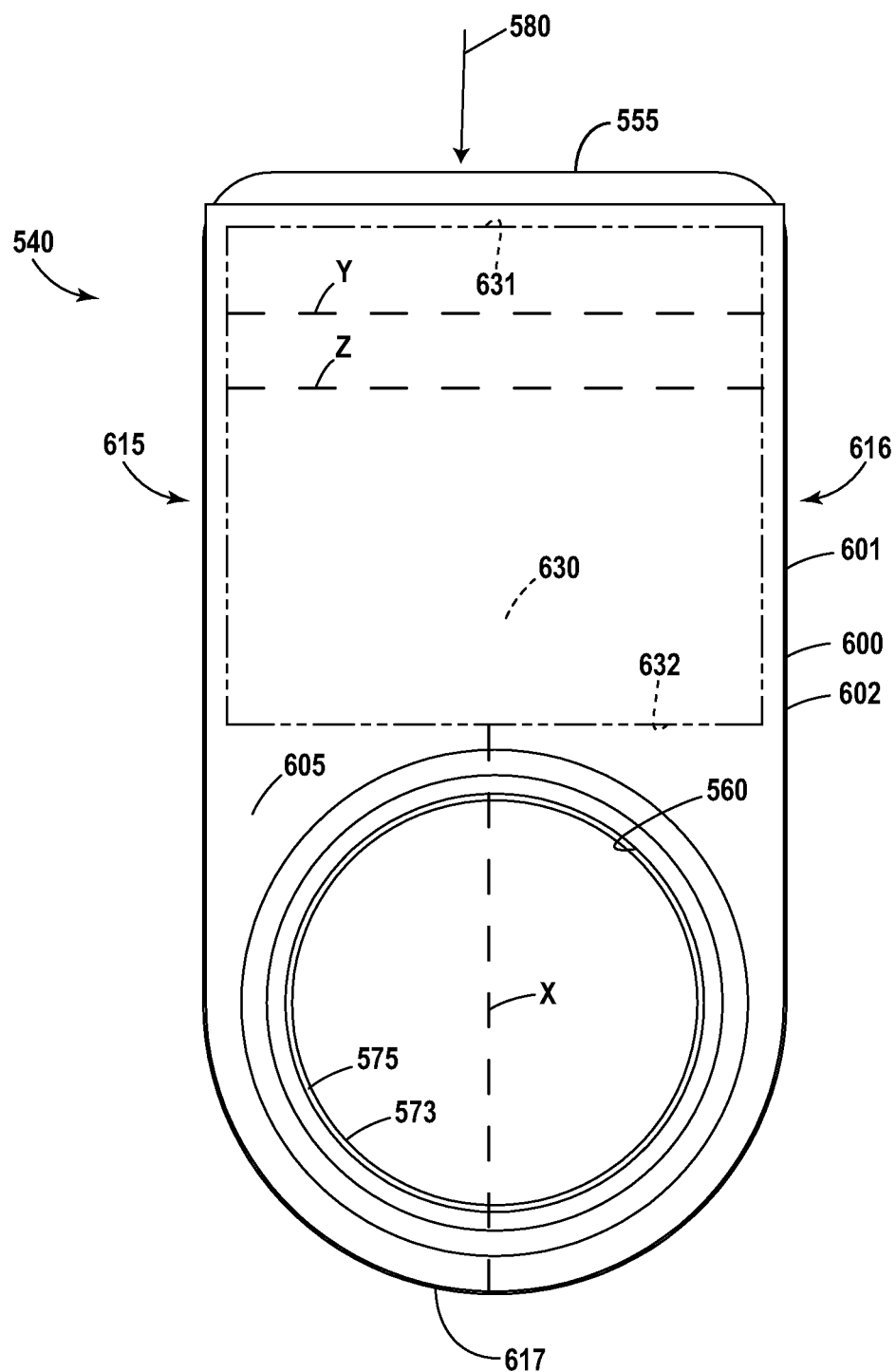
FIG. 29 is a schematic outlet end elevational view of the filter cartridge of FIGS. 27-28.

Attention is now directed to FIG. 29, an end elevational view taken toward end member 605, FIG. 28. By examination of FIG. 29, it can be seen that shell member 602, defined by opposite side pieces 615, 616 and closed end 617, for the example shown, generally defines a "u"-shape. The media pack 630 is positioned between opposite side sections 615, 615, typically secured thereto with a adhesive, for example a sealant. End member 605 can be a molded-in-place end member, closing a side end of the media pack and a side of the end shell 602, but for passage of aperture 560 therethrough, into clean air region 670.

Dimensions X, Y and Z can be as generally previously defined, for the previously described embodiments.

Figure 30:
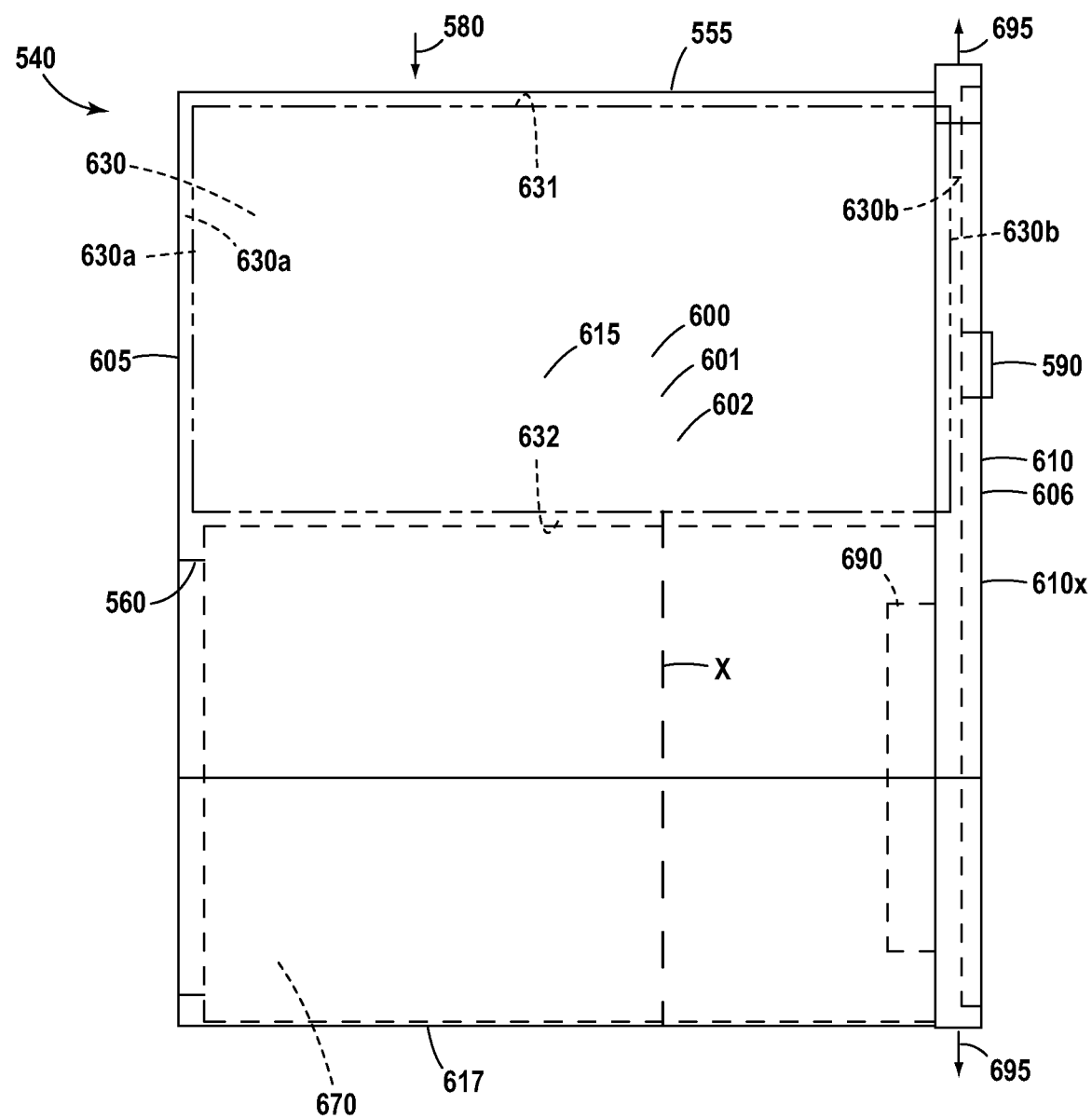
FIG. 30 is a schematic side elevational view of the filter cartridge of FIGS. 27-28, with phantom lines indicating some internal detail.

In FIG. 30, a side elevational view of cartridge 540 is depicted. The view be taken generally toward side 615 of shell 602. Dimension X, extending across clean air region 670 between outlet flow face 632 of interiorly received cartridge 630 and closed end 617 of shell 602 is shown, schematically.

Referring to FIG. 30, end member 606 is depicted having an internal projection shown in phantom lines, at 690.

Internal projection 690 projects into clean air region 670, from a remainder of end member 606. The projection 690 can be molded into the end member 606, or can comprise a preform made, and then put in place in end member 606, when end member 606 is molded-in-place. End member 606 can comprise foamed polyurethane, molded-in-place; and, projection 690 can comprise, in some instances, a preform, for example, a plastic member embedded within a remainder member 606 when formed. The projection 690, generally comprises a secondary cartridge support member, and will engage, FIG. 26, end 566 secondary cartridge 541, during installation, to support end 566. This can be conducted, for example, by projection 690 extending around end 566, or by projection 590 being sized to project into a recess formed in end 566.

In general terms, side member 605, FIG. 30 will be referred to as "open" due to aperture 560 extending therethrough as a filter cartridge outlet flow aperture. On the other hand, end member 606 will be generally be characterized as a "closed" member, as it has no apertures therethrough.

When end members 605, 606 are molded-in-place, they would typically include embedded therein, respectively, opposite sides 630a, 630b of media pack 630. Thus, end members 605, 605 seal closed sides 630a, 630b of media pack 630.

Still referring to FIG. 30, peripheral seal member 610 includes an outer end surface 610x. When the access cover 521, FIG. 26, is pushed in place, surface 610 is engaged and will compress, bulging region 610 radially, outwardly, in the general direction shown at arrow 695. This will facilitate sealing against inner surface 516i; of housing 516, FIG. 25, in a manner analogous to that previously discussed for a previously described embodiment.

Figure 31:
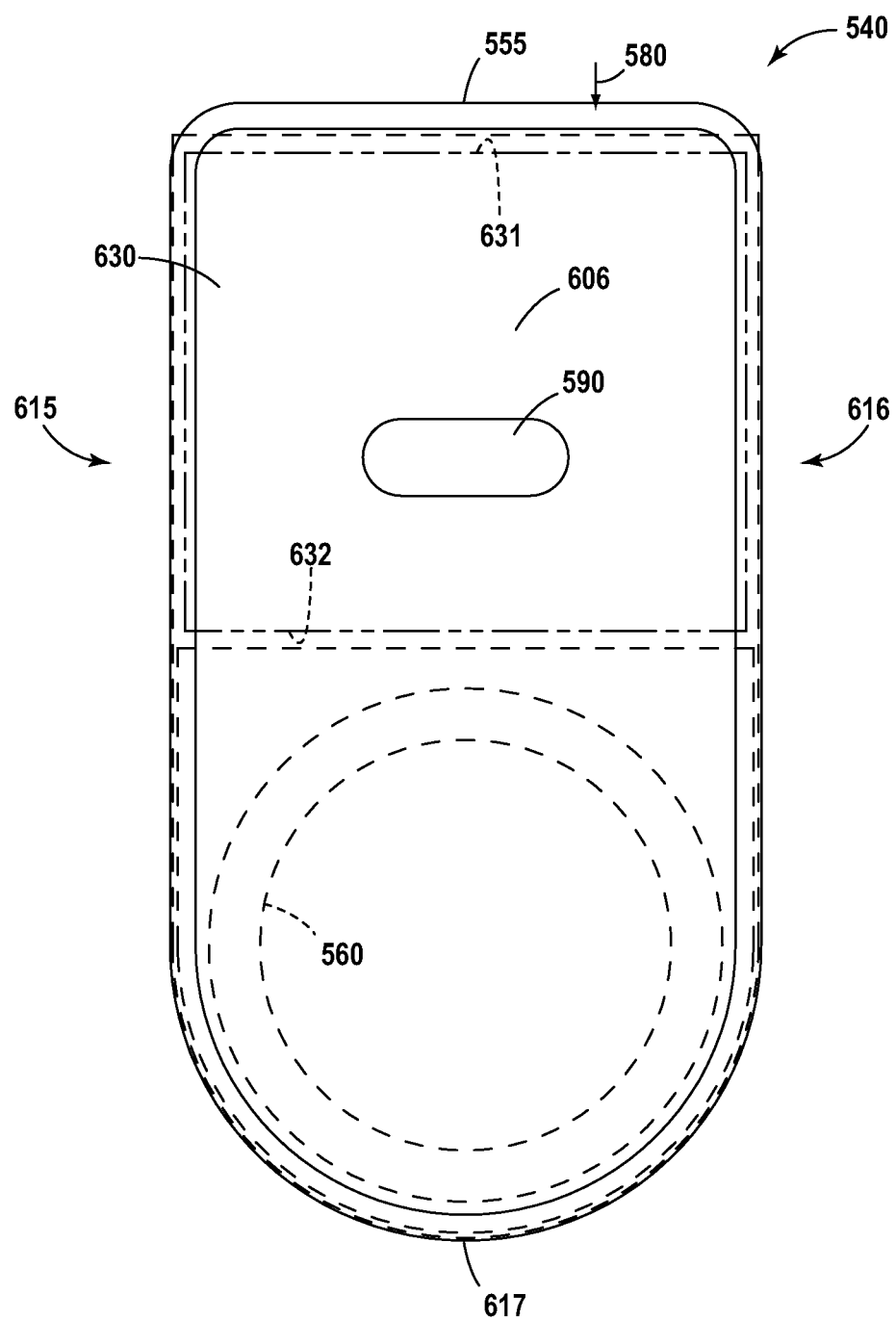
FIG. 31 schematic is a closed end elevational view of the filter cartridge of FIGS. 27-30, with phantom lines generally indicating internal detail.

In FIG. 31, a view taken toward end member 606 is depicted.

Assembly cartridge 540, for example, would be analogous to that of cartridge 340, as follows. Media pack 630 would be preformed. Shell 602 would be provided in the selected shape, for example u-shape, and media pack 630 would be positioned between side sections 615, 616, typically sealed thereto with an adhesive. There resulting combination would then be used in a molding process, to form opposite side member 605, 606. Either one of the side members 605, 606 could be formed first.

A usable foamed polyurethane, for molded-in-place portions of members 605, 606 (and analogous members in the previously described embodiment) can comprise a material formed with as molded density of not greater than 30 lbs/cu.ft. (0.46 g/cc), typically not greater than 15 lbs/cu.ft (0.24 g/cc), and sometimes no greater than 10 lbs/cu.ft (0.16 g/cc). The overall resulting material would typically be formed with a hardness, shore A, of no greater than 30, typically no greater than 25 and often within the range of 12-20. It is noted that in some applications alternate densities and hardnesses can be used. However, the ranges stated will be typical, for many applications.

IV. An Improved Embodiment, FIGS. 32-65

The reference numeral 700, FIG. 32 generally designates an improved air cleaner assembly according to the present disclosure. The air cleaner assembly 700 generally comprises a housing 701. The housing 701 includes: first and second, opposite, sides 702, 703; an access cover end 704; and, an opposite, not viewable in FIG. 32, outlet end 705. The housing surface includes a inlet (top) end 706, normally directed generally upwardly when housing 700 is installed; and, a closed (bottom) end opposite inlet end 706, the closed end generally being indicated at 707. Typically, the closed end 707 will be directed downwardly or substantially downwardly in installation.

Still referring to FIG. 32, it is noted that the particular air cleaner assembly 700, depicted does not include a precleaner positioned over inlet end 706. In some applications and techniques described with respect to air cleaner assembly 700, a precleaner can be used. The precleaner can be in accord with the precleaner previously discussed herein, although alternatives are possible.

As will be understood from further drawings and description below, the air cleaner assembly 700 can be in general accord with air cleaner assemblies previously described herein.

Still referring to FIG. 32, access cover end 704 is typically provided with a removable access cover 710 thereon that, when removed, provides for service access to an interior of housing 701. The particular access cover 710 depicted, is secured in place by a latch arrangement, in the example depicted comprising a plurality of latches 711, although alternatives are possible. Also, the particular access cover 710 depicted, is completely removable from a remainder of housing 701, during servicing, although alternatives are possible.

Still referring to FIG. 32, it is noted that when oriented with inlet 706 depicted upwardly and opposite closed end 707 directed downwardly, when viewed from the side, the housing 701 generally has a b/d-shape, (or b/d-shaped). For the particular example housing 701 depicted, when viewed from the access cover end 704, the shape is generally a "d-shape." Of course alternative shapes, including, for example, u-shapes, are possible.

Attention is now directed to FIG. 33, in which a side elevational view of air cleaner assembly 700 is taken at an end opposite that viewable in FIG. 32. Thus, in FIG. 33, the view is taken toward outlet end 705. Being directed toward an end opposite from FIG. 32, for the particular example assembly 700 depicted, the end view of FIG. 33 shows a generally "b-shape" for the housing 701.

In FIG. 33, some example dimensions are provided as follows: AA=164.4 mm; AB=116.1 mm; AC=350 mm; AD=61 mm; and, AE=200 mm.

It is noted that throughout the description of the embodiment of FIGS. 32-65, some example dimensions will be provided, corresponding to the unit depicted. It is also noted that alternate dimensions and configurations could be used with the principles described herein.

Still referring to FIG. 33, outlet end 705 includes an air flow outlet 720 thereat, for filtered air to leave air cleaner assembly 700, and to be directed to downstream equipment, such as, eventually, an air intake for an internal combustion engine.

Comparing FIGS. 32 and 33, it can be seen that bottom end 707 includes a central lower projection 707p thereon. It will be understood from further description below, that the central projection 707p generally extends across housing 701 between ends 704, 705, and provides a lower trough in the housing 701. Comparing FIGS. 32 and 33, it can be seen that it is reasonable to characterize the housing shape as a "d/b-shape", in spite of the presence of the of the projection 707p; and the term "d/b-shape" and variants thereof, as used herein, is meant to include within its scope a configuration such as that shown in FIGS. 32 and 33.

In FIG. 34, a side elevational view of air cleaner assembly 700 is provided, the view being taken generally toward side 703, with portions of side 703 being broken away to depict internal detail.

Referring to FIG. 34, mounting pad arrangement 725 usable for mounting the air cleaner assembly 700 in position in equipment with which it used, is shown. Typically, housing 701 will be a molded plastic component, and thus strengthening ribs 726 are shown in the housing 701.

Still referring to FIG. 34, at top inlet end 706 is provided air flow inlet 730, for air to be filtered entering housing 701. As previously indicated, air cleaner assembly 700 is depicted with no precleaner associated therewith. If a precleaner were used, it would typically be positioned over air flow inlet 730, analogously to previously described embodiments.

Referring to the internal detail depicted in FIG. 34, frame member 732 over interior portion of outlet 720 is viewable. A portion of internally positioned main air filter cartridge 735 is also viewable, as is a portion of internally received safety filter cartridge 736.

In general terms, frame member 732 projects inwardly to housing 700, from outlet 720. Frame member 732 comprises a plurality spaced support 732a, tapering at narrow end 732b, in extension from outlet 720 inwardly of housing 701. Frame member 732 can assist in centering the open end of a safety element 736 or a main filter cartridge 735 inserted into air cleaner housing 701 through end 704, when access cover 710 is removed.

In FIG. 34, some example dimensions are indicated as follows: BA=513.7 mm; BB=350 mm; BC=299.9 mm; BD=25 mm; BE=415.9 mm; BF=114.3 mm; BG=40 mm; BH=225 mm; BI=450 mm; and, BJ=639.2 mm.

Attention is now directed to FIG. 35, a view of air cleaner assembly 700 taken generally toward top, inlet, end 706.

Referring to FIG. 35, the view is generally taken through inlet 730 to an interior 701i of housing 701. The view is schematic and at inlet end features for an internally received filter cartridge 735 are not detailed, inside inlet 730. However, the reference numeral 735 is used to indicate the general location of the internally received filter cartridge.

Attention is now directed to FIG. 36, a bottom plan view of air cleaner assembly 700; the view of FIG. 36 generally be taken from a direction opposite of that of FIG. 35. Referring to FIG. 36, it is noted that housing 701 includes a bottom section 739, comprising projection 707p with a drain aperture arrangement 740 therein. For the particular example housing 701 depicted, the drain aperture arrangement 740 comprises first and second spaced drain apertures 741, although an alternate number of drain apertures and location of drain apertures can be used.

In general, the drain aperture arrangement 740 comprises one or more drain apertures 741 through bottom 739 of housing 701. Should water collect within an interior 701i of housing 701, it will generally drain toward projection 707p, along an interior of bottom 739, and outwardly through drain aperture arrangement 740. The apertures 741 depicted, are positioned at approximate opposite ends of bottom 739 so that if the housing 701 is slanted toward one side or other, of the sides 704, 705, the water will still drain.

In FIG. 37, a second view analogous to FIG. 34 is provided, free of dimension lines for easier inspection. Features previously identified are indicated by the same reference numerals.

In FIG. 38, air cleaner assembly 700 is depicted in a top perspective view, generally directed toward access end 704. Features previously identified are indicated by like reference numerals.

In FIG. 39, a schematic exploded perspective view of air cleaner assembly 700 is taken, generally toward upper inlet 706 and toward and also toward access end 704. Individual componentry depicted in FIG. 39 includes housing 701 (indicated as a remainder of the housing minus the access cover 710); access cover 710; main filter cartridge 735; and, safety or secondary filter cartridge 736.

In FIG. 40, a cross-sectional view of air cleaner assembly 700 is depicted.

Referring to FIG. 40, as in previously described embodiments, main filter cartridge 735 can be seen to comprise a cartridge housing 744 including a media pack 745 having an inlet flow face or end 746 and an opposite flow face outlet end 747. In general, the cartridge housing 744 comprises: opposite end members 748, 749; and, outer shell 750. In general, the cartridge housing 744 defines an interior volume 744i in which the media pack 745 is positioned; and, the outlet end interior space 751 sized and positioned to receive safety cartridge 736 projecting therein. This is analogous to previously described embodiments. (The media pack 745 can be a stacked, blocked, media pack as previously described).

Referring to FIG. 40, example dimensions are indicated as follows: CA=513.7 mm; CB=350 mm; CC=299.9 m; CD=25 mm; CE=415.9 mm; CF=114.3 mm; CG=40 mm; CH=225 mm; CI=450; and, CJ=639.2 mm.

Still referring to FIG. 40, in general, air to be filtered will be directed into inlet face 746 of media pack 745. The media pack 745 can, in general, comprise a stacked media pack of z-filter strips, as previously described. The air will be filtered as it flow through flutes extending between faces 746, 747, since the flutes (media pack) will be sealed appropriately to cause the air to need to pass through the media, to exit outlet flow face 747. The air exiting outlet flow face 747, will then be directed into an interior 736i of safety cartridge 736, by passage through media 755 of secondary or safety cartridge 736. The air is then directed in the general direction of arrow 759 outwardly through cartridge housing outlet 760 and through air cleaner housing outlet 720. It is noted that this air flow direction is also through support member 732.

As indicated, outlet flow from air cleaner assembly 700, also involves outlet flow though outlet end 760 of the cartridge housing 744 of main filter cartridge 735; and, through outlet end 761 of secondary or safety cartridge 736. These features will be described further below. Still referring to FIG. 40, it is noted that when access cover 710 is removed, by release of latches 711, closed end 749 of main filter cartridge 735 will be viewable. By grasping handle member 765, cartridge 735 can be removed from interior 701i of housing 701. This will leave safety cartridge 736 in place, during servicing, if desired. Of course safety cartridge 736 can also be removed from housing 701 if desired.

It is noted that cover 710 includes a handle recess 765r therein, for projection therein of cartridge handle 765.

Still referring to FIG. 40, it is noted that when access cover 704 is removed, housing 701 defines an outlet end 767, which provides a service access end for installation or removal of cartridge 735 and secondary cartridge 736. It is also noted that, as discussed below, at closed end 749, main filter cartridge 735 includes a peripheral seal member 770 which, under compression from access cover 710, by latches 711, will press against housing access cover 710 and housing end 767, forming a seal thereat, inhibiting air and outer leakage to housing interior 701i, during use.

In FIG. 40, a housing seal flange 705, or flange arrangement, in housing 701, in particular in end 705, for sealing cartridges 735, 736 thereto, is viewable in cross-section.

Such features were previously described herein, for an earlier described embodiment.

Attention is now directed to FIG. 41, a cross-sectional view taken generally along line 41-41, FIG. 40. It is noted that in FIG. 41, a cross-sectional line indicating the cross-section of FIG. 40, (i.e. line 40-40) is depicted.

Referring to FIG. 41, shell 750 of housing 744 of main filter cartridge 735 is viewable. Shell 750 (and thus housing 744) can be seen to have opposite sides 775, 776, and a curved or arcuate end 777. (The end 777 will be considered arcuate, even if it comprises short straight sections arranged in an arc). Further shell 775 defines an open access end 778 opposite curved end 777, allowing for air flow entry into inlet face 746 of media pack 745. The curved end 777 can be seen to be arcuate, and to have a bottom 777b and upwardly curved opposite sides or side portions 777c.

Analogously to previously described embodiments, and referring to FIG. 41, dimension $D_6$ generally corresponds to a dimension X across a closed end section 751 of the shell member 744, downstream from the media pack 745. The dimension $D_5$ generally corresponds to a dimension Z between an opposite side section 775, 776 of the shell member 750, where the shell member engages the media pack 745, thus it also corresponds to a dimension Y through the media pack 745 in a direction perpendicular to gas flow therethrough and also perpendicular to the strips of media. This was previously described arrangement, the dimension X (corresponding to $D_6$, FIG. 41) in a typical arrangement is at least 50% of a dimension $D_5$ (corresponding to dimensions Y or Z as previously described). Usually the ratio of X/Y or X/Z is at least 0.5, usually at least 0.75, and typically at least 0.9. In typically arrangements X/Z will be at least 1.0 and not greater than 1.7; and, usually an amount within the range of 1-1.5, although are alternatives are possible. For the particular example shell 750, FIG. 41, the dimension X/Z (i.e. $D_6/D_5$ is approximately 1.3).

For the particular example shell 750 depicted, side 775 is generally tangential to curved end 777, however side 776 is not tangential to curved end 777. This results in the "b-shape" or "d-shape" (i.e. d/b-shape or b/d-shape) to a side view of the shell 750; i.e. an end of the cartridge 735 or cartridge housing 744.

Still referring to FIG. 41, it is noted that in open region 751 of shell 750, which is a clean air region downstream from outlet face 747 of media pack 745, a portion of safety cartridge 736 is shown in cross-section.

Also referring to FIG. 41, bottom end 739 in which drain arrangement 740, FIG. 36 is depicted, can be seen as a lowermost, dropped, section or trough 707p.

In FIG. 41, some example dimensions are provided as follows: DA=164.4 mm; DB=116.1 mm; DC=350 mm; DD=61 mm; and, DE=200 mm.

Attention is now directed to FIG. 42, in which an end elevational depiction of main air filter cartridge 735 is depicted. The view of FIG. 42 is generally toward closed end 749. Closed end 749 includes an overmold (molded-in-place) portion 775 and a pre-form closed portion 776. The overmold portion 775 will typically be molded-in-place, for example from a material such as a foamed polyurethane. When overmold portion 775 is molded-in-place, in general it will seal a end of an enclosed media pack, and close an end of the shell, while securing pre-form end closure portion 776 in place. The polyurethane used for overmold portion 775 will generally comprise a foamed polyurethane as previously characterized herein for member 605. 606, of cartridge 540.

Still referring to FIG. 42, end member 749 includes an outwardly directed handle portion 765 thereon, projecting outwardly toward the viewer in the view of FIG. 42. Further overmold portion 775 include peripheral rim region 778, adjacent end 749.

General features of cartridge 735, FIG. 42, are as follows: the cartridge 735 includes a cartridge housing 744 having an inlet end 780, and an opposite (bottom) end 781, a first side 782, and a second, opposite, side 783. End 780 corresponds to an inlet into which air is directed during entry into cartridge 735. Outlet flow from cartridge 735 is through end member 748 opposite end member 749.

It is noted, referring to FIG. 42, that the main filter cartridge 735 has a general shape, when viewed from an end, corresponding b/d (or d/b)-shape. It is noted alternate shapes, for example a u-shape, can be used.

Attention is now directed to FIG. 43, a view directed toward filter cartridge 735, and housing cartridge 744, from an end 748 opposite end 749. End 748 includes a overmold (molded-in-place) portion 785. The overmold portion 785 closes an end of the media pack 745 adjacent thereto, closes an end of the shell 750 adjacent thereto and defines outlet flow aperture 760. In particular outlet flow aperture 760 is surrounded by seal member 790, which forms housing seal member on cartridge 735. The housing seal member 790, generally, forms a seal with housing 701, around cartridge outlet flow aperture 760, when cartridge 735 is properly installed in housing 701.

Referring to FIG. 43, the particular housing seal member 790 depicted, is configured to form an inwardly directed seal, against inwardly directed radial seal surface 791 of portion 790. Further, surface 791 does not simply define a circular perimeter, but rather a perimeter, seal surface shape that includes an arcuate section 791c, on one side, with an opposite side 791d including a central vertex 791v opposite a center of arcuate section 791c and engaged with arcuate section 791c by two, straight, tangential side sections 791, 791b extending at approximately right angles to one another, away from central vertex 791v.

This shape for seal surface 791, and region 790 generally comprising: one arcuate side and an opposite side having central vertex with two straight sections engaging the arcuate side, provides for a relatively large outlet flow aperture 760, for escape of filtered air from interior 735i of cartridge 735.

Still referring to FIGS. 42 and 43, it is noted that side 782 extends generally tangentially, with the curved bottom section 795 of the cartridge 735 (and hosing 744); and, the side 783 does not engage curved bottom section 795 tangentially. Of course, alternate possibilities can be used, including for example, a u-shape as discussed above.

Attention is now directed to FIG. 44, a top plan view of filter cartridge 735 of main cartridge housing 744. The view, then, is generally directed toward top end or inlet 781. Positioned within inlet end 781, would be provided media pack 745, FIG. 40. In particular, the surface viewable would be inlet flow face or inlet end 746 of media pack 745; detailed features of media pack 745 not being drawn in the schematic of FIG. 44. Generally, the media pack 745 would comprise strips of single facer material extending between, and with opposite sides sealed by, opposite end members 748, 749.

In FIG. 44, a portion of shell 750, for cartridge 735, is depicted, extending between end members 748, 749.

In FIG. 45, a bottom plan view of cartridge 735 and main cartridge housing 744 is shown.

Here, a portion of shell 750 is also seen extending between end members 748, 749. The portion of shell member 750 generally corresponds to a curved bottom 795, adjacent bottom 781 of cartridge 735.

Still referring to FIG. 45, it is noted that curved bottom 795 includes an aperture arrangement 796 therethrough, the aperture arrangement 796 depicted comprising apertures 796. It is noted that aperture arrangement 796 comprises a first arrangement 796a positioned generally adjacent, to and spaced from, end member 748; and, a second arrangement 796b positioned adjacent to, and spaced from, end 749.

In general, the aperture arrangement 796 is configured to allow drainage of water that may collect within an interior of shell 750, outwardly therefrom. It is noted that the apertures 796 extend through shell 750 at an interior region corresponding to a clean air region of cartridge 735, downstream of media pack 745.

Still referring to FIG. 45, it is noted that each of the arrangements 796a and 796b includes a bottom most aperture, aperture 796x, 796y respectively; and, each of arrangements 795a, 795b includes additional apertures 795c positioned in portions (i.e. curved side portions 777c, FIG. 41) of shell 750 curved upwardly from bottom 795. The additional apertures 795c provide ensures that drainage will occur, even if the cartridge 735 is tilted from an actual vertical orientation, FIGS. 42 and 43. The bottom central apertures 796x, 796y will ensure the drainage occurs when the cartridge 735 is oriented vertically as shown in FIGS. 42 and 43. Positioning aperture arrangements adjacent, but spaced from, opposite end member 748, 749, ensures that drainage will occur even if the cartridge 735 is tipped downwardly toward end 748, or tipped downwardly toward end 749.

In FIG. 46, a side elevational view of cartridge 735 is provided. A portion of shell 750 can be seen extending between end members 748, 749. Apertures 796c can be seen. The view of FIG. 46 is generally toward side 783, FIG. 43.

In FIG. 47, a side elevational view of cartridge 735 taken toward side 782, i.e. the side opposite side 783, is viewed. Apertures 796c are viewable.

In FIG. 48A, a cross-sectional view of cartridge 735 is viewable. Here media pack 745, having inlet end 746 and outlet end 747 is viewable, positioned within shell 750, of main filter cartridge 744, and extending between sides 748, 749.

Referring to FIG. 48A, seal surface 791 can be seen to be tapered, having a central step or rib feature 791r which will provide for maximum compression, when pushed over an outlet tube of housing 701. It also noted that embedded within housing seal 790 is provided support ring 800. The support ring 800 will form a pressure backing, for seal surface 791, when pushed around an outlet tube.

Still referring to FIG. 48A, it can be seen that member 748, comprising overmold 785, can be continuous in forming section 804 closing end 745x of media pack 745; and, housing seal portion 790, defining an outlet for clean air from interior 735i of cartridge 735 (or interior 744i of cartridge housing 744).

Also referring to FIG. 48A, end member 749 can be seen to comprise overmold 775 defining outer perimeter seal 778 and handle member 765, while also securing in place preform 776.

Referring to FIG. 48A, attention is now directed to preform 776. Preform 776 comprises a secondary support projection including an outer sidewall 776s (or inwardly projecting peripheral ring) projecting into interior 735i of cartridge 735, in particular into clean air volume 750i defined by curved end 795 of shell 750. The central interior portion of preform 776 is a closed end of the support projection, directed toward the air filter outlet 760, includes a central recess therein forming an axially outwardly directed receiver 776r surrounded by sidewall 776s and directed away from outlet 780. The receiver 776r is positioned to receive, projecting therein, a projection portion on a safety or secondary cartridge when installed within region 776x, as discussed below.

In FIG. 48A, some example dimensions are provides as follows: EA=593.8 mm; EB=533.8 mm; EC=175 mm; ED=86.9 mm.

Attention is now directed to FIG. 48B, an enlarged fragmentary view of a selected portion of FIG. 48A. Here, seal support ring 800 is shown embedded with region 790. It is also shown that support ring 800 engages an end or side edge portion 750e of shell 750, creating an axial bearing of ring 800 against shell 750, at ends thereof.

Attention is now directed to FIG. 49, a cross-sectional view of cartridge 735, taken generally along line 49-49, FIG. 48A. Here outlet flow aperture 760 is viewable, having a shape with a curved or arcuate side 791c, and an opposite side with a central vertex 791v, and (straight) side sections 791a, 791c. The sides 791a, 791c generally engaging, tangentially, arcuate side 791c. Alternately phrased, the view of FIG. 49 is of outlet aperture 760 from an interior 735i of cartridge 730.

Still referring to FIG. 49, shell 750 can be seen as having opposite sides corresponding to cartridge sides 782, 783; side 782 engaging curved bottom 795 of shell 750 tangentially; and, side 783 non-engaging curved bottom 795 tangentially, but extending generally parallel to side 782. Again, alternate shapes are possible.

Still referring to FIG. 49, media pack 745 having inlet flow face or end 746 and outlet flow face or end 747, opposite end 746, is viewable positioned within interior 735i of cartridge 735 (or interior 744i of main cartridge housing 744). It is noted that adjacent surface 746, at regions indicating generally at 805, the media pack 745 would typically be potted to, or i.e. sealed to, sides 782, 783 of shell 750. Of course at the opposite ends, the media pack 745 would generally be embedded within molded-in-place portions of end members 748, 749.

Attention is now directed to FIG. 50, a side elevational view of cartridge 735 generally directed toward end 748. Here, the cross-section line 48A-48A, for FIG. 48A is indicated.

In FIG. 50, example dimensions indicated are as follows: FA=137.5 mm; and, FB=377.5 mm.

FIG. 51, cartridge 735 is viewable in a perspective, generally toward side 749 and top or inlet end 780. Preform 776 is viewable within overmold 775. The preform 776 can be seen to have an outwardly directed cone 810, which defines an interior receiver 776r, FIG. 48A. Flange 811 is provided extending toward handle 765 from projection 18. Flange 811 generally provides for indexing during a manufacture step.

Still referring to FIG. 51, it is noted that handle member 765 is shown with apertures 765a therein.

Still referring to FIG. 51, shell 750 (and main cartridge housing 744) can be viewed as having opposite sides corresponding to sides 782, 783 of cartridge 735, and lower curved section 795, corresponding to bottom 781.

Attention is now directed to FIG. 52, a view of cartridge 735 taken generally toward inlet 780 and outlet end 748. Outlet aperture 760 can be seen in end member 748, allowing a view of portion of interior 735i. Selected apertures of aperture arrangement 796 are also viewable in shell 750.

Referring to interior 735i, media section 820 is shown positioned within interior 735i, and in particular in shell 750 along an interior 750i thereof, in a position overlapping apertures 796 (A second, analogous, media strip would be positioned adjacent end 749). The media 820 will close aperture 796 to flow of unfiltered air therethrough, into interior 735i, from an exterior environment. The media 820 can be viewed as a media patch, secured within interior 750i of shell 750, at an appropriate location. The media patch 820 can be made from media similar to that used for media pack 745, but typically not corrugated, fluted or folded. A single layer strip 821, for example, can be secured in place by sonic welding, hot melt adhesive or other means. In FIG. 53, an enlarged fragmentary view of a portion of FIG. 50, is viewable allowing further inspection of media 820 in the form of strip 821.

Referring back to FIG. 52, it is noted that the outlet shape for outlet 760, having curved side 791c, and vertex 791v, with sides 791a, 791b extending therefrom at right angles, is viewable. Also viewable in FIG. 52 is recess 830, positioned in side 781a directed toward end 780. Recess 830 provides a notch relating to indexing the support ring 800.

In FIG. 54, an exploded view of cartridge 735 is viewable. Media pack 745 can be seen having inlet face 746 opposite outlet face 747 and side end 785x, 785y which are embedded and molded-in-place pieces 748, 749, respectively, for sealing. It is also noted that the media pack 745 includes opposite side surfaces 745a, 746b, extending between sides 745x, 745y, and end surfaces 746, 747. The sides 745a, 745b are engaged by the shell 750, when cartridge 735 is installed. Typically as previously discussed, a potting or sealing material is positioned between sides 745a, 745b, and shell 750, usually adjacent inlet face 746, when media pack 745 is positioned in shell 750.

Still referring to FIG. 54, shell 750 can be seen to have sides 782, 783, and curved bottom 795. The curved bottom 795 can be seen to have the aperture arrangement 791 therethrough, covered, in an interior surface 750i by media patch 820.

Still referring to FIG. 54, it can be seen that overmold 748 will secure support ring 800 in place. End member 748 will also seal closed side 745x and an end 750x of shell 750. Of course, end member 748 will provide seal member 790, and flow apertures 760. Also viewable in FIG. 54, is preform 776, which will be positioned within end 750y of shell 750 before overmold 749 is positioned. Overmold 749 will close end 750y of shell 750, and seal closed end 745y of media pack 745, once installed.

In FIG. 55, a side (end) elevational view of shell 750 is viewable. Example dimensions are provided in FIG. 55, as follows: GA=137.5 mm; GB=2.2 mm; GC=271.4 mm; and, GD=175.5 mm.

In FIG. 56, a side elevational view of shell 750 is provided. The dimension GE indicated is 565.8 mm.

It is noted that typically shell member 750 will be manufactured from cellulose fiber sheet material, metal or plastic, as previously described for other embodiments. However, a variety of alternate materials can be used for the shell 750.

In FIG. 57, an outside perspective view of preform 776. It is noted that adjacent outer edge 776o, preform 776 includes outwardly directed radial projection 775p. Projections 775p are oriented to engage shell 750, when preform 776a is positioned in place, along those portions of preform 776 which engage the shell 750. Also provided are projections 775x, which are oriented to become embedded within the overmold 749, and to overlap the media pack 745.

In FIG. 58, a perspective view directed toward an inside of preform 776 is provided.

In FIG. 59, a plan view of an exterior of preform 776 is provided.

In FIG. 60, a cross-sectional view taken along line 60-60, FIG. 59 is viewable. Here, recess 776r is readily viewable.

Attention is now directed to FIG. 61, in which support ring 800 is depicted in perspective view. The support ring 800 can be seen to comprise a curved section 800c, comprising a side opposite a vertex 800v. The support 800 also includes side sections 800a, 800b, extending outwardly from central vertex 800b at approximate right angles, and generally engaging curved side 800c tangentially. Thus, support 800 is configured to surround aperture 760, FIG. 43 and to provide support for seal 791, having a similar shape. It is noted that support ring 800 includes an outer surface 800o with a plurality of outwardly flanges 840 thereon, which are positioned to overlap and abut shell 750.

In FIG. 62, a plan view of support 800 is depicted. In FIG. 62, the indicated dimensions are as follows: HA=38.2 mm; HB=48.5 mm radius; HC=38.2 mm; and, HD=86.6 mm radius.

In FIG. 63, a side elevational view of support 800 is depicted. In FIG. 63, the indicated dimensions are as follows: IA=27 mm; IB=25 mm; and, IC=22 mm.

In FIG. 64, safety cartridge 736 is depicted. The cartridge 736 comprises a media pack 850 extending between opposite ends 851, 852. End 851 is generally formed from a hard, molded-in-place polymer, such as a hard polyurethane, with central outwardly directed, conical projection 853. Projection 853 is sized to be received in and supported by receiver 776r, FIG. 60. This is shown for example in the cross-section of FIG. 40. End cap 842 is typically molded-in-place from a polyurethane that is soft and compressible, for example analogous to that used for seal member 750 Seal 852 includes an outer seal surface 855, configured to form a radial seal with housing 701 FIG. 40.

Comparing the safety filter 736, FIG. 64 and the main filter cartridge 735, FIG. 43, it will be understood that the seal surface 855 of the safety cartridge 736 is defined in a generally circular perimeter, whereas the seal surface 791 of the main filter cartridge 735 defines a pattern previously described of a arcuate side 791c and an opposite side having a central vertex 791v and side sections 791, 791b extending outwardly therefrom. Thus, two seal surfaces 790, 855 cannot be sealed, completely, along opposite sides of a single seal flange. Referring to FIG. 40, an assembly in cross-sectional view, attention is directed to housing seal flange 858. In the particular cross-section depicted, seal member 790 and seal member 855 are shown sealed at opposite sides of flange 858. In some portions, flange 858 would be expected to have a circular portion for seal surface 855, and a non-circular portion for the central vertex and sides of seal 790.

Referring back to FIG. 64, it is noted that media pack 850 has generally a conical shape, decreasing in cross-sectional diameter from end member 852 to end member 851. The media pack 850 will typically comprise media positioned between an inner support liner 860 and an outer support liner 861. Mesh or expanded materials can be used for liners 860, 861.

In FIG. 65, cartridge 736 is shown in side elevational view, with a portion shown in cross-section. Here, members 860, 861 can be seen in opposite sides of the media 864. In FIG. 65, example dimensions are indicated as follows: JA=31 mm; JB=531.8 mm; JC=128 mm; and, JD=150.9 mm.

It is noted that assembly in accord with FIGS. 32-65 can be provided with some of the features characterized herein above, with respect to previously described embodiments; and, the previously described embodiments can be provided with some of the features characterized herein of the embodiment of FIGS. 32-65. Further, terminology used in describing various embodiments, for analogous features and operations, can be applied to the other embodiments depicted as well.

It is noted that there is no specific requirement that an assembly include all of the features of assembly 700, or components thereof, in order to obtain some benefit according to the present disclosure.

V. Some Concluding Comments

According to an aspect of the present disclosure, a first or main air filter cartridge is provided, usable as a service part in an air cleaner assembly. The filter air filter cartridge generally includes a media pack non-removably positioned (secured) within a filter cartridge housing. Although alternatives are possible, media pack typically comprises a stack of media strips of media defining an inlet flow face and an opposite outlet flow face. Such a media pack defines a plurality of flutes extending in a direction generally between the inlet and outlet flow faces; and, the media pack is closed (sealed) to passage of unfiltered air there-through, without passage through media within the media pack. The media pack includes first and second, opposite, sides extending between the inlet and outlet flow faces. In a typical arrangement, the media strips comprise a strip of fluted media secured to a strip of facing media.

The filter cartridge housing includes a shell member. The shell member includes the media pack secured therein, and includes a closed end portion defining a clean air volume adjacent the outlet flow face of the media pack. Example shell members are described, each of which have first and second opposite side sections, and a closed end portion. Typically, the closed end section has a bottom and opposite curved sides. In some examples, the shell member has a d/b-shape. In another example the shell member has a u-shape.

The closed end portion or section of the shell member can include a drain aperture arrangement therein. Typically, a filter media arrangement will be positioned over the drain aperture arrangement, to ensure that unfiltered air does not move into the clean air volume defined in the closed end portion of the shell member. The drain aperture arrangement can include a first aperture arrangement positioned adjacent to and spaced from a first end or end member of the shell member of filter cartridge; and, a second aperture arrangement positioned adjacent to, and spaced from, a second end member of the shell member or filter cartridge. Typically, the closed end portion of the filter cartridge comprises a bottom portion with opposite curved sides. The drain aperture arrangement would typically include at least one aperture in the bottom portion, and in an example described herein, at least one aperture in at each one of the opposite, curved, sides of the closed end portion.

The filter cartridge housing includes a first end member positioned along the media pack first side, enclosing a side of the shell member. Typically, the first end member is molded-in-place and includes a first side of the media pack embedded therein, and sealed thereby.

The first end member includes an air flow outlet arrangement therethrough, in communication with a cartridge clean air volume defined between the outlet flow face of the media pack and the closed end of the shell member. Typically, the first end member is molded-in-place and includes a first side of the media pack embedded therein, and sealed thereby.

The second end member extends along the media pack second side and a side of the shell member opposite the first end member. The second end member is typically closed to passage of air therethrough. Typically, the second end member is molded-in-place, with the second side of the media pack embedded therein and sealed thereby.

In a typical arrangement, the first end member of the air filter cartridge housing includes a first air cleaner housing seal arrangement thereon, oriented surrounding the flow outlet arrangement. An example housing seal arrangement comprises an inwardly directed radial seal. An example inwardly directed radial seal is described and depicted, which includes a seal support therein. In a typical arrangement, the first end member is a molded-in-place end member, with the first air cleaner housing seal arrangement molded integral therewith. In an example, the first end member comprises foamed polyurethane molded-in-place with a seal support ring embedded therein, surrounding the housing seal arrangement.

The inwardly directed radial seal or radial seal surface of the housing seal arrangement can define a generally circular perimeter. In an alternate example described herein, a seal surface shape or perimeter is defined which as one arcuate side and a second side with a central vertex, having two opposite side sections extending therefrom.

In examples described, the air filter cartridge housing second end member also includes a peripheral housing seal member thereon. The peripheral housing seal member is oriented to engage, and to seal against, a portion of an air cleaner housing, when the air filter cartridge is installed for use. The second end member can comprise a molded-in-place end member, for example a polyurethane foam member.

In one example, the molded-in-place second end member includes a secondary filter cartridge support projection extending into the clean air volume. In a specific example described, the projection has a generally circular outer periphery and a closed inner end, the inner end including central axially outwardly directed recess therein. The recess is oriented to engage and support an end of a secondary filter cartridge, when the air filter cartridge is installed in an air cleaner assembly (for use), which also includes a secondary filter cartridge.

In another example, the projection of the second end member includes an inwardly projected peripheral ring sized and shaped to engage and support a safety or secondary filter cartridge.

In an example described, the secondary filter cartridge support projection comprises a preform piece, i.e. piece formed separately, and then secured to second end member by being molded-in-place.

In example arrangements depicted, the closed end section of the shell member is generally arcuate. The closed end section of the shell member defines a filter cartridge clean air volume having a dimension X thereacross, from the media pack outlet flow face to the closed end section of the shell, corresponding to at least 50% of a dimension Y through the media pack in a direction perpendicular to gas flow therethrough and perpendicular to the strips of media. Alternately stated the dimension X in a typical arrangement is at least 50% of a dimension Z between opposite side sections of the shell member. Typically the dimension Y and dimension Z are approximately the same.

Usually a ratio of X/Y or X/Z is at least 0.5, usually at least 0.75; and, typically at least 0.9. In typical arrangements the ratio X/Z will be at least 1.0 and not greater than 1.7, usually an amount within the range of 1-1.5, although alternatives are possible.

In a typical arrangement, the media pack is blocked, stacked, media pack, although alternatives are possible. Also typically a shell member is selected from the group consisting essentially of: cellulose fiber sheet (board) material; plastic; and, metal, although alternatives are possible.

The second end member of the filter cartridge housing can be provided with an outer surface having a handle projection thereon, to facilitate grasping of the filter cartridge.

There is no specific requirement that an air filter cartridge include all of the features characterized herein, in order to obtain some benefit in accord with the present disclosure.

In a second characterization of a first or main air filter cartridge according to the present disclosure, a media pack is again non-removably secured within a filter cartridge housing comprising a shell member having first and second opposite side sections and a first closed end section. Although alternatives are possible, the media pack typically comprises a stack of strips as previously described and is non-removably secured within the shell member at a position between the first and second side sections; and, the shell member defines a clean air volume between the shell member closed end section and the media pack, the air clean air volume having a dimension X thereacross responding to at least 50% of a dimension Z between the shell member first and second opposite side sections. Typically the dimension X is as previously characterized, relative to the dimension Z.

In this second characterization, the filter cartridge housing includes a first end member closing a first side of the media pack and the shell member. The first end member includes an air flow aperture therethrough in flow communication with the clean air volume; and, the first end member defines a housing outlet seal member thereon, around the air flow aperture.

In this second characterization, the filter cartridge housing includes a second end member mounted opposite the first end member and closing the second side of the media pack and shell member. The second end member is typically closed to air flow therethrough.

Arrangements according to the second characterization can include various features and modifications as discussed above.

Also according to the present disclosure an air cleaner assembly is provided. The air cleaner assembly generally comprises a housing having a side wall defining an interior and including: an air flow inlet side; and, an air flow outlet arrangement. In an example depicted, the air flow outlet arrangement is oriented in the housing side wall to provide an outlet flow direction generally orthogonal to an air flow inlet direction. The housing includes an access opening with a removable access cover thereover, along a side of the housing side wall opposite the air flow outlet arrangement.

In an example air cleaner assembly described herein, the air cleaner assembly housing includes a bottom with a drain arrangement therethrough, for water collected within the housing during use.

A removable and replaceable first air filter cartridge is positioned in the housing interior. The first air filter cartridge can be generally configured as previously described, and is sized to pass through the access opening, when the access cover is removed. The first air filter cartridge is oriented with: an inlet flow face of the media pack oriented toward an air flow inlet side of the air cleaner housing; the air flow outlet arrangement of the first end member of the filter cartridge directed toward, and in air flow alignment with, the air flow outlet arrangement of the air cleaner housing; and, the second end member of the first air filter cartridge directed toward the access cover of the air cleaner housing.

In a typical arrangement, a secondary filter cartridge that is separable from each of the air cleaner housing and the first air filter cartridge is provided. The secondary filter cartridge can comprise media surrounding an open air volume. The secondary filter cartridge is removably mounted on the air clean air housing over the housing air flow outlet arrangement and projecting through the first end member of the first filter cartridge into the first air filter cartridge cleaner volume.

The secondary filter cartridge typically has a closed end remote from the air flow outlet arrangement. The second end member of the first filter cartridge can include an internal projection thereon in supporting engagement with a closed end of the secondary filter cartridge.

In an example arrangement described, the closed end of the secondary filter cartridge includes the central axial projection directed toward a closed member of the first filter cartridge, when installed. The closed end member of the first filter cartridge includes a recess therein sized and shaped to receive the central axial projection on the closed end of the secondary filter cartridge projecting therein.

Several example secondary filter cartridges are described. In one, a generally conical shape is provided, with a larger, open, end engaging the fluid flow arrangement of the air cleaner housing. In a second, a generally cylindrical shape is shown, with an open end engaging the outlet arrangement of the air cleaner housing.

In a typical arrangement, the air flow outlet arrangement of the air cleaner housing is surrounded by a seal flange having an inner surface and an outer surface. The first end member of the first filter cartridge includes a housing seal member surrounding the air flow outlet arrangement therein, the housing seal member of the first air filter cartridge being removably sealed to the outer surface of the seal flange. Typically the secondary filter cartridge includes an open end with an outer surface having a seal member thereon, which is removably sealed to the inner surface of the housing seal flange.

In an example arrangement described, the first air filter cartridge includes a peripheral housing perimeter seal member on the second end member. The first air filter cartridge is positioned within the cleaner housing with the peripheral housing perimeter seal member sealed to the air cleaner housing at a location adjacent to the housing access opening. The sealing can be accomplished, for example, by forming a peripheral housing perimeter seal member from a soft compressible molded-in-place material, such as a foamed polyurethane, and compressing the peripheral seal member with an access cover of the air cleaner housing, causing the seal member to bulge outwardly to engage the housing seal surface.

In an example arrangement described, the first air filter cartridge includes a handle member thereon, positioned on the second end member and projecting in a direction away from the first end member. The housing access cover includes a handle member recess thereon, into which the handle member on the first air filter cartridge projects.

In an arrangement described herein, the filter housing outlet aperture includes a projection arrangement extending into the housing therefrom. The projection arrangement can be used as a guide, for positioning the main filter cartridge and safety filter cartridge, during installation.

Also according to the present disclosure, methods of formation of an air filter cartridge and use are described. The methods of formation generally involve attaching a shell member as previously described to a media pack as previously described, typically by securing the media pack non-removably to the shell member, for example with a an adhesive extending therebetween. First and second end members are positioned over open ends of the shell member, to form the filter cartridge. Either one of the two end members can be positioned first.

The shell member is generally chosen to define a clean air volume between a closed end thereof, across, and spaced from, the outlet flow face of the media pack. The clean air volume can be sized as previously described.

When the first end member is secured in position, it is configured with an air flow aperture therethrough, in communication with the clean air volume. The first end member may be molded-in-place and include a molded integral housing seal member thereon, surrounding the outlet flow arrangement.

The second end member is typically closed, and may include a peripheral housing seal arrangement thereon. The second member may further include a handle member thereon, projecting in a direction away from the first end member.

A method of use of the filter cartridge, generally involves installing the filter cartridge in an air cleaner housing as previously described; and, directing air to be filtered into the air cleaner housing through the housing inlet, and through the media pack of the filter cartridge. The air will then exit the media pack and enter the clean air volume of the filter cartridge. It is then turned and directed outwardly through the air flow outlet arrangement in the first end member. In some instances, the method may be practiced with a secondary filter cartridge projecting into the clean air volume of the first clean air filter cartridge, as previously discussed.

There is no specific requirement that an air cleaner assembly, components thereof, methods of assembly or use include all of the detailed features described herein in order to obtain some benefit to the present disclosure.

What is claimed is:

1. An air filter cartridge removably installable in a housing of an air cleaner; the air filter cartridge comprising:
(a) a media pack comprising filter media and defining opposite inlet and outlet flow faces;
   (i) the media pack being closed to passage of air therethrough without filtering passage through media therein;
(b) a member on the media pack defining a filter cartridge clean air volume adjacent the outlet flow face of the media pack, the member on the media pack including:
   (i) a first side having an air flow outlet therethrough in communication with the filter cartridge clean air volume, wherein the air flow outlet is a side outlet and is not in a direction opposite the inlet and outlet flow faces;
   (ii) a second side opposite the first side, wherein the second side includes a portion projecting into the filter cartridge clean air volume; and,
(c) a housing radial seal located at the air flow outlet of the first side.

2. An air filter cartridge according to claim 1 wherein:
(a) the housing radial seal comprises a radially inwardly directed housing radial seal.

3. An air filter cartridge according to claim 2 wherein:
(a) the housing radial seal defines a non-circular shape around an axis surrounded by the housing radial seal.

4. An air filter cartridge according to claim 1 wherein:
(a) the second side including, within the portion projecting into the filter cartridge clean air volume, an outwardly directed receiver projecting away from the air flow outlet.

5. An air filter cartridge according to claim 4 wherein:
(a) the member on the media pack and defining a filter cartridge clean air volume is non-removably secured to the media pack.

6. An air filter cartridge according to claim 4 wherein:
(a) the media pack comprises a stack of alternating fluted media and facing media.

7. An air filter cartridge according to claim 4 wherein:
(a) a distance X across the filter cartridge clean air volume, in a direction away from the outlet flow face, is at least 50% of Y; Y being a distance across the media pack in a direction perpendicular to a direction of air flow through the media pack.

8. An air filter cartridge according to claim 4 wherein:
(a) a distance X across the filter cartridge clean air volume, in a direction away from the outlet flow face, is at least 75% of Y; Y being a distance across the media pack in a direction perpendicular to a direction of air flow through the media pack.

9. An air filter cartridge according to claim 1 wherein:
(a) the housing radial seal defines a non-circular shape around an axis surrounded by the housing radial seal.

10. An air filter cartridge according to claim 1 wherein:
(a) the member on the media pack includes a closed end section and opposite sides, wherein the closed end section and the opposite sides extend from the first side to the second side.

11. An air filter cartridge according to claim 4 wherein:
(a) the outwardly directed receiver projecting away from the air flow outlet comprises a secondary filter cartridge support.

12. An air filter cartridge according to claim 1 wherein:
(a) the portion projecting into the filter cartridge clean air volume is constructed to receive a projection from a portion of an air cleaner.

13. An air filter cartridge according to claim 12 wherein:
(a) the portion of an air cleaner that includes a projection comprises an access cover.

14. An air cleaner assembly comprising:
(a) an air cleaner housing having a sidewall defining an interior; the housing including: a housing air flow inlet arrangement and a housing air flow outlet arrangement;
   (i) the housing including an access opening with a removable access cover therewith, at a location opposite the housing air flow outlet arrangement; and,
(b) a removable and replaceable first air filter cartridge positioned within the housing interior;

(i) the first air filter cartridge being sized to for installation and removal when the access cover is removed;
(ii) the first air filter cartridge including:
  (A) a media pack comprising filter media and defining opposite inlet and outlet flow faces;
    (1) the media pack being closed to passage of air therethrough without filtering passage through media therein;
  (B) a member on the media pack defining a filter cartridge clean air volume adjacent the outlet flow face of the media pack, the member on the media pack including:
    (1) a first side having an air flow outlet therethrough in communication with the filter cartridge clean air volume, wherein the air flow outlet is a side outlet and is not in a direction opposite the housing air flow inlet arrangement;
    (2) a second side opposite the first side, wherein the second side includes a portion projecting into the filter cartridge clean air volume; and,
  (C) a housing radial seal located at the air flow outlet of the first side.

15. An air cleaner assembly according to claim 14 including:
  (a) a pre-cleaner comprising a plurality of separator tubes, the precleaner being positioned in air flow upstream of the inlet flow face of the media pack.

16. An air cleaner assembly according to claim 14 including:
  (a) a second filter cartridge that is separable from the air cleaner housing and the first air filter cartridge;
    (i) the second filter cartridge being removably mounted in the air cleaner housing and projecting into the filter cartridge clean air volume of the first filter cartridge.

17. An air cleaner assembly according to claim 14 wherein:
  (a) the housing radial seal of the first filter cartridge comprises a radially inwardly directed housing radial seal.

18. An air cleaner assembly according to claim 14 wherein:
  (a) the housing radial seal of the first filter cartridge defines a non-circular shape around an axis surrounded by the housing radial seal.

* * * * *